Dec. 12, 1961 G. GOERTZEL ET AL 3,012,723

ELECTRONIC COMPUTER SYSTEM

Filed Jan. 12, 1955 34 Sheets-Sheet 1

INVENTORS
GERALD GOERTZEL
JOHN H. GREIG

BY

ATTORNEY

INVENTORS
GERALD GOERTZEL
JOHN H. GREIG
BY J. B. Burke
ATTORNEY

INVENTORS
GERALD GOERTZEL
JOHN H. GREIG
BY J. B. Burke
ATTORNEY

INVENTORS
GERALD GOERTZEL
JOHN H. GREIG
BY J. B. Burke
ATTORNEY

ELECTRONIC COMPUTER SYSTEM

Filed Jan. 12, 1955 34 Sheets-Sheet 5

INVENTORS
GERALD GOERTZEL
JOHN H. GREIG
BY J. B. Burke
ATTORNEY

INVENTORS
GERALD GOERTZEL
JOHN H. GREIG
BY J. B. Burke
ATTORNEY

ELECTRONIC COMPUTER SYSTEM

INVENTORS
GERALD GOERTZEL
JOHN H. GREIG
BY J. B. Burke
ATTORNEY

INVENTORS
GERALD GOERTZEL
JOHN H. GREIG
BY J. B. Burke
ATTORNEY

Dec. 12, 1961 G. GOERTZEL ET AL 3,012,723

ELECTRONIC COMPUTER SYSTEM

Filed Jan. 12, 1955 34 Sheets-Sheet 9

INVENTORS
GERALD GOERTZEL
JOHN H. GREIG
BY J. B. Burke
ATTORNEY br

INVENTORS
JOHN H. GREIG
GERALD GOERTZEL
BY J. B. Burke
ATTORNEY

INVENTORS
GERALD GOERTZEL
JOHN H. GREIG
BY J. B. Burke
ATTORNEY

INVENTORS
GERALD GOERTZEL
JOHN H. GREIG
BY J. B. Burke
ATTORNEY

INVENTORS
GERALD GOERTZEL
JOHN H. GREIG
BY J. B. Burke
ATTORNEY si

INVENTORS
GERALD GOERTZEL
JOHN H. GREIG
BY J. B. Burke
ATTORNEY

ELECTRONIC COMPUTER SYSTEM

Filed Jan. 12, 1955 34 Sheets-Sheet 15

INVENTORS
GERALD GOERTZEL
JOHN H. GREIG
BY J. B. Burke
ATTORNEY

OS

INVENTORS
GERALD GOERTZEL
JOHN H. GREIG
BY J. B. Burke
ATTORNEY

INVENTORS
GERALD GOERTZEL
JOHN H. GREIG
BY J. B. Burke
ATTORNEY

INVENTORS
GERALD GOERTZEL
JOHN H. GREIG
BY J. B. Burke
ATTORNEY hd

INVENTORS
GERALD GOERTZEL
JOHN H. GREIG
BY J. B. Burke
ATTORNEY

Dec. 12, 1961 G. GOERTZEL ET AL 3,012,723

ELECTRONIC COMPUTER SYSTEM

Filed Jan. 12, 1955 34 Sheets-Sheet 20 st

INVENTORS
GERALD GOERTZEL
JOHN H. GREIG

BY J. B. Burke

ATTORNEY

Dec. 12, 1961 G. GOERTZEL ET AL 3,012,723

ELECTRONIC COMPUTER SYSTEM

Filed Jan. 12, 1955 34 Sheets-Sheet 21

INVENTORS
GERALD GOERTZEL
JOHN H. GREIG
BY J. B. Burke
ATTORNEY

INVENTORS
GERALD GOERTZEL
JOHN H. GREIG
BY J. B. Burke
ATTORNEY

INVENTORS
GERALD GOERTZEL
JOHN H. GREIG
BY J. B. Burke
ATTORNEY

INVENTORS
GERALD GOERTZEL
JOHN H. GREIG
BY J. B. Burke
ATTORNEY

INVENTORS
GERALD GOERTZEL
JOHN H. GREIG
BY J. B. Burke
ATTORNEY

INVENTORS
GERALD GOERTZEL
JOHN H. GREIG
BY J. B. Burke
ATTORNEY

INVENTORS
GERALD GOERTZEL
JOHN H. GREIG

BY J. B. Burke

ATTORNEY

INVENTORS
GERALD GOERTZEL
JOHN H. GREIG
BY J. B. Burke
ATTORNEY

ELECTRONIC COMPUTER SYSTEM

Filed Jan. 12, 1955 34 Sheets-Sheet 29

| CODE POSITION | P7 | P6 | P5 | P4 | P3 | P2 | P1 |
|---|---|---|---|---|---|---|---|
| A | | X | | X | | X | |
| B | | X | | X | | X | X |
| C | | X | | X | X | | |
| D | | X | | X | X | | X |
| E | | X | | X | X | X | |
| F | | X | | X | X | X | X |
| G | | X | X | | | | |
| H | | X | X | | | | X |
| I | | X | X | | | X | |
| J | | X | X | | | X | X |
| K | | X | X | | X | | |
| L | | X | X | | X | | |
| M | | X | X | | X | X | |
| N | | X | X | | X | X | X |
| O | | X | X | X | | | |
| P | | X | X | X | | | |
| Q | | X | X | X | | X | |
| R | | X | X | X | | X | X |
| S | | X | X | X | X | | |
| T | | X | X | X | X | | X |
| U | | X | X | X | X | X | |
| V | | | | | | | X |
| W | | | | | | | X |
| X | | | | | | X | X |
| Y | | | | | X | | |
| Z | | | | | X | | X |
| 1 | | X | | | | | X |
| 2 | | X | | | | X | |
| 3 | | X | | | | X | X |
| 4 | | X | | | X | | |
| 5 | | X | | | X | | X |
| 6 | | X | | | X | X | |
| 7 | | X | | | X | X | X |
| 8 | | X | | X | | | |
| 9 | | X | | X | | | X |
| 0 | | X | | | | | |
| + | | | X | | | | |
| − | | | X | X | X | X | X |
| , | | | | | X | X | |
| . | | | | | X | X | X |
| = | | | | X | | | |
| ; | | | X | | | | |
| LOWER CASE | X | | | X | X | | |
| UPPER CASE | X | | | X | | X | X |
| CARRIAGE RETURN | X | | | X | X | | X |
| BACK SPACE | X | | X | X | X | | X |
| SPACE | X | | | X | | X | |
| TABULATE | X | | | X | | | X |
| COLOR SHIFT | X | | | X | X | X | |
| STOP | X | | X | | | X | |
| DELETE | X | X | X | X | X | X | X |

900
901

FIG. 39

INVENTORS
GERALD GOERTZEL
JOHN H. GREIG

BY J. B. Burke

ATTORNEY

* P-7
** CAN PUNCH
*** ADVANCE & PUNCH

INVENTORS
GERALD GOERTZEL
JOHN H. GREIG
BY J. B. Burke
ATTORNEY

ELECTRONIC COMPUTER SYSTEM

Filed Jan. 12, 1955

INVENTORS
GERALD GOERTZEL
JOHN H. GREIG
BY J. B. Burke
ATTORNEY

Dec. 12, 1961 G. GOERTZEL ET AL 3,012,723

ELECTRONIC COMPUTER SYSTEM

Filed Jan. 12, 1955 34 Sheets-Sheet 32

INVENTORS
GERALD GOERTZEL
JOHN H. GREIG
BY J. B. Burke
ATTORNEY

Dec. 12, 1961 G. GOERTZEL ET AL 3,012,723

ELECTRONIC COMPUTER SYSTEM

Filed Jan. 12, 1955 34 Sheets-Sheet 33 cp

INVENTORS
GERALD GOERTZEL
JOHN H. GREIG

BY J. B. Burke

ATTORNEY

FIG. 49

(xdo)

| END OF STEP | A.S.R. | C.S.R. | LOCATION COUNTER | b REGISTER LEFT HALF | b REGISTER RIGHT HALF | STEP COUNTER | MEMORY |
|---|---|---|---|---|---|---|---|
| S0 | fa1 | LAST COMMAND | SUM OR DIF. OF fa1 & Ip (Am) | fa1 | fa1 | ADVANCE TO STEP S1 | ADDRESS Am IS LOCATED |
| S1 | fa1 | LAST COMMAND | h PULSES ADDED CONTENTS SPILLED | fa1 | fa1 | ADVANCED TO STEP S2 | ADDRESS fa1 IS LOCATED |
| S2 | fa1 | PRESENT COMMAND | SET TO 0 | fa1 | fa1 | ADVANCED TO STEP S3 | CONTENTS OF fa1 tr. TO ASR & CSR |
| S3 | fa1 | PRESENT COMMAND | SET TO 0 | fa1 | fa1 | ADVANCED TO STEP S4 | |
| S4 (FIRST HALF) | fa2 | PRESENT COMMAND | ADDRESS X | fa1 | ADDRESS X | HELD AT STEP S5 | |
| S4 (SECOND HALF) | fa2 | PRESENT COMMAND | ADDRESS X | fa2 | ADDRESS X | ADVANCED TO STEP S5 | |
| S5, S6, S7 | fa2 | PRESENT COMMAND | ADDRESS X | fa2 | ADDRESS X | ADVANCED TO STEPS S6, S7, S8 | |
| S8 | fa2 | PRESENT COMMAND | ADDRESS X PLUS Ip & r PULSES | fa2 | ADDRESS X | ADVANCED TO STEP S9 | |
| S9 | fa2 | PRESENT COMMAND | h PULSES ADDED CONTENTS SPILLED | CLEARED | CLEARED | ADVANCED TO STEP S10 | ADDRESS X IS LOCATED |
| S10 S11 S12 | fa2 | PRESENT COMMAND | SET TO 0 | CONTENTS OF X (LEFT) | CONTENTS OF X (RIGHT) | ADVANCED TO STEPS S11, S12, S13 | CONTENTS OF ADDRESS X tr. TO br |
| S13 | fa2 | PRESENT COMMAND | SET TO 0 | CONTENTS OF X (LEFT) | CONTENTS OF X (RIGHT) | ADVANCED TO STEP S14 | a-register: CONTENTS OF X (LEFT) \| CONTENTS OF X (RIGHT) |
| S14, 15 | fa2 | PRESENT COMMAND | SET TO 0 | CONTENTS OF ADDRESS X | CONTENTS OF ADDRESS X | ADVANCED TO STEPS S15, S0 | CONTENTS OF X (LEFT) \| CONTENTS OF X (RIGHT) |

INVENTORS
GERALD GOERTZEL
JOHN H. GREIG
BY J. B. Burke 3,012,723

ELECTRONIC COMPUTER SYSTEM

Gerald Goertzel, White Plains, and John H. Greig, New York, N.Y., assignors to Hogan Laboratories, Inc., New York, N.Y., a corporation of New York Filed Jan. 12, 1955, Ser. No. 481,398
18 Claims. (Cl. 235—157)

This invention relates to electronic computer systems and particularly concerns a novel means for general purpose electronic digital computing.

High speed electronic digital computer systems heretofore available have been very complex and costly making them cost-prohibitive to any but the very largest of commercial and government organizations. The present computer system has been devised to meet the need for a relatively low cost computer system sufficiently flexible to solve most of the problems met in engineering and research organizations. The information storage capacity of this system is sufficient to handle more than 90 percent of the problems encountered in scientific work. Very large problems may be handled by breaking them down into parts and solving each part separately. The speed of operation of the present computer system is at least 400 times that of a mechanical calculator operated by a skilled operator. It is thus feasible to use the computer system for all but the very simplest calculations.

The computer system according to the invention may be used to perform any calculation which can be stated as a series of simple arithmetical steps. It is economically most feasible to use the computer system for problems in which a series of steps is repeated several times with different values assigned to one or more of the parameters of the problem on each excursion through the steps. Numerical methods of solution for many types of complex mathematical and physical problems are known. Some of these problems are too complex to be easily solved by manually operated calculators but they can be readily solved by the present digital computer system.

An important advantage of the present computer system is the efficiency of its logical design. By this is meant that the computer system embodies a minimum number of components which interact to perform all orders or logical functions of the computer system. A significant economy is effected by using certain components repeatedly in different combinations and arrangements to perform all the orders or commands which the system is capable of executing.

It is therefore a principal object of the invention to provide a general purpose electronic digital computer system having a novel logical design.

It is a further object to provide an electronic digital computer system including novel components for performing memory, arithmetic and control functions.

It is a further object to provide an electronic digital computer system in which its several components interact in a novel manner to perform predetermined commands and operations.

It is a further object to provide an electronic digital computer system which is basically simpler in construction and thus lower in cost to manufacture, operate and service than systems having comparable computing capabilities.

Other and further objects and advantages of the invention will become apparent from the following description taken together with the drawings, wherein:

FIG. 4 shows the manner in which

Figure 4A:
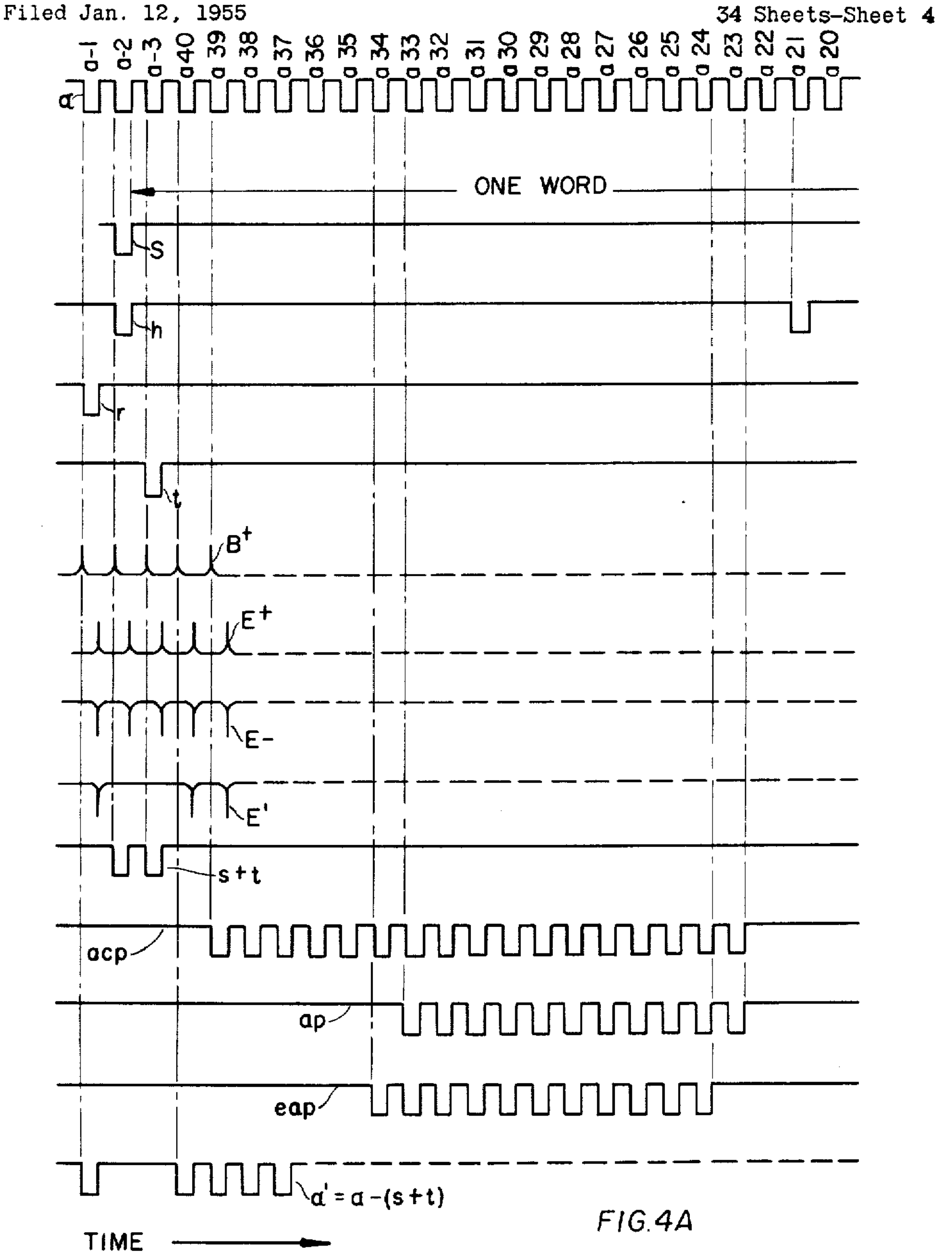
FIGS. 4A and 4B are to be viewed.
Figure 4:
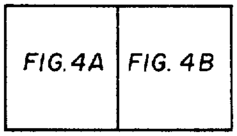
Figure 4B:
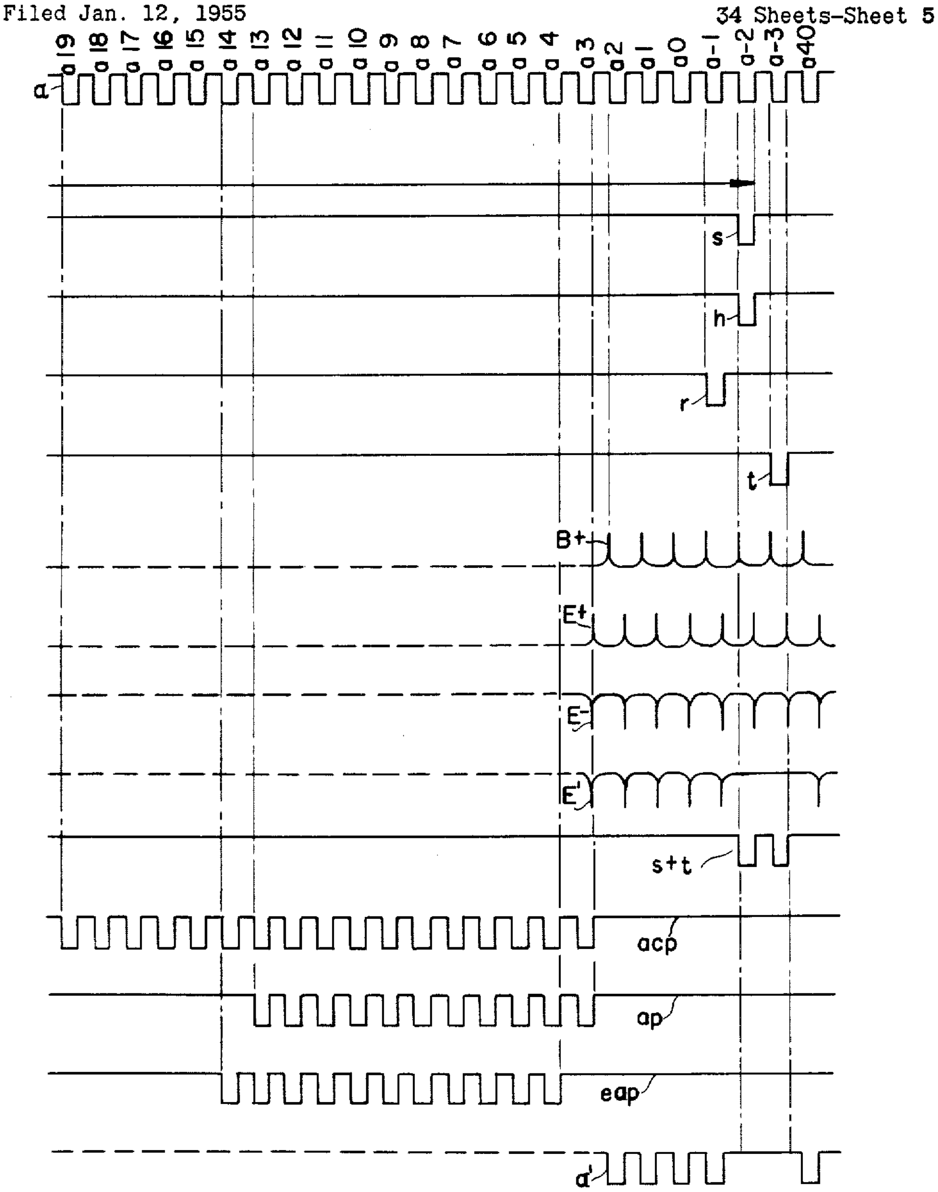

FIGS. 4A and 4B taken together constitute a diagram of various fixed control pulses.

Figure 5:
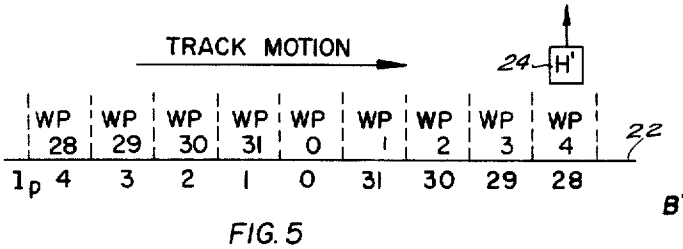

FIG. 5 is a diagram of the location pulse source.

Figure 6:
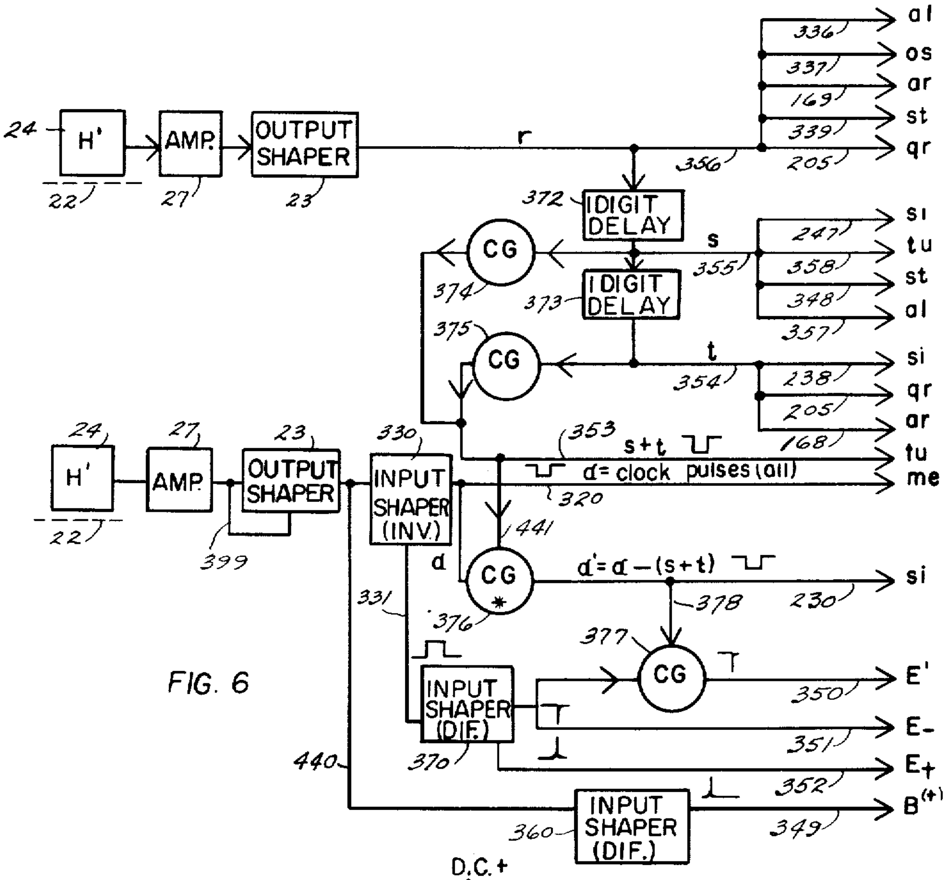

FIG. 6 is a diagram of an alternative source for various timing pulses.

Figure 7:
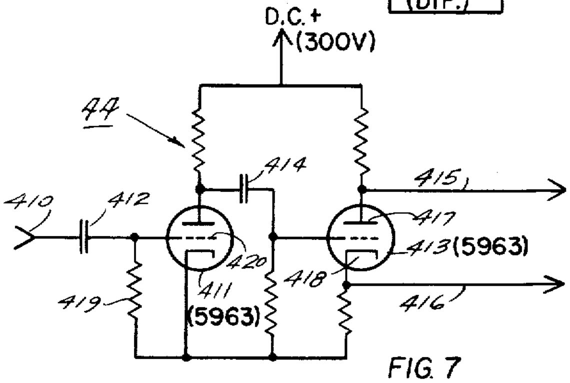

FIG. 7 is a circuit diagram of an input shaper circuit.

Figure 8:
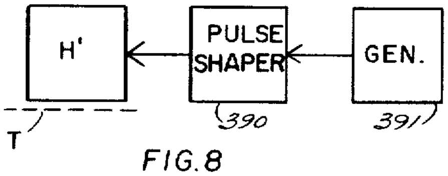

FIG. 8 shows in block diagram form an arrangement for recording fixed pulses on a magnetic track.

FIGS. 9, 10, 11, 12 show symbols as used in the drawings representative of gate circuits as shown in FIGS. 9A, 10A, 11A and 12A respectively.

FIGS. 9A, 10A, 11A and 12A are diagrams of various gate circuits.

Figures 12A, 13, 14:
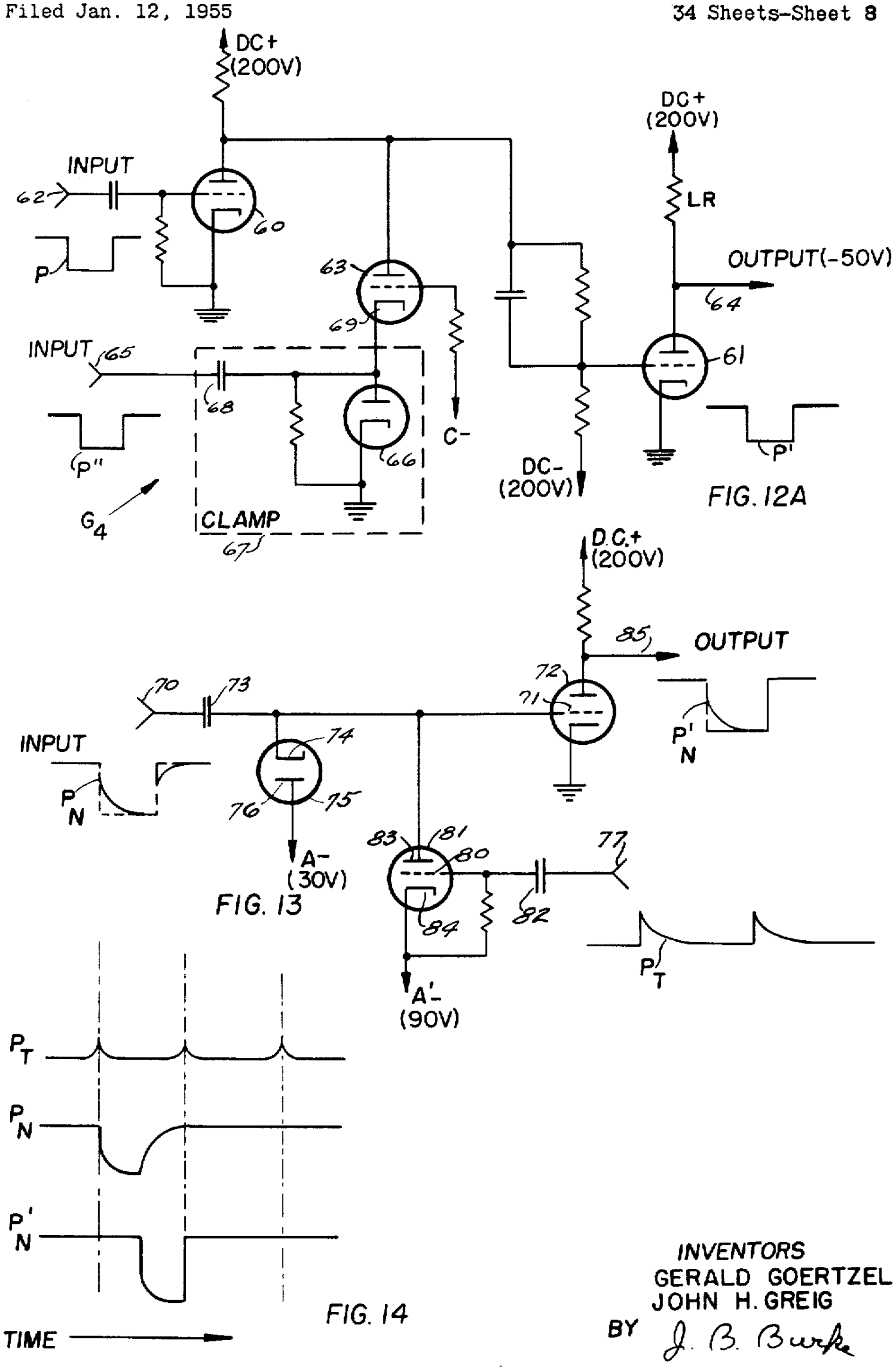

FIG. 13 is a circuit diagram of a delay circuit.

FIG. 14 is a pulse diagram illustrating the mode of operation of the circuit of FIG. 13.

Figure 15:
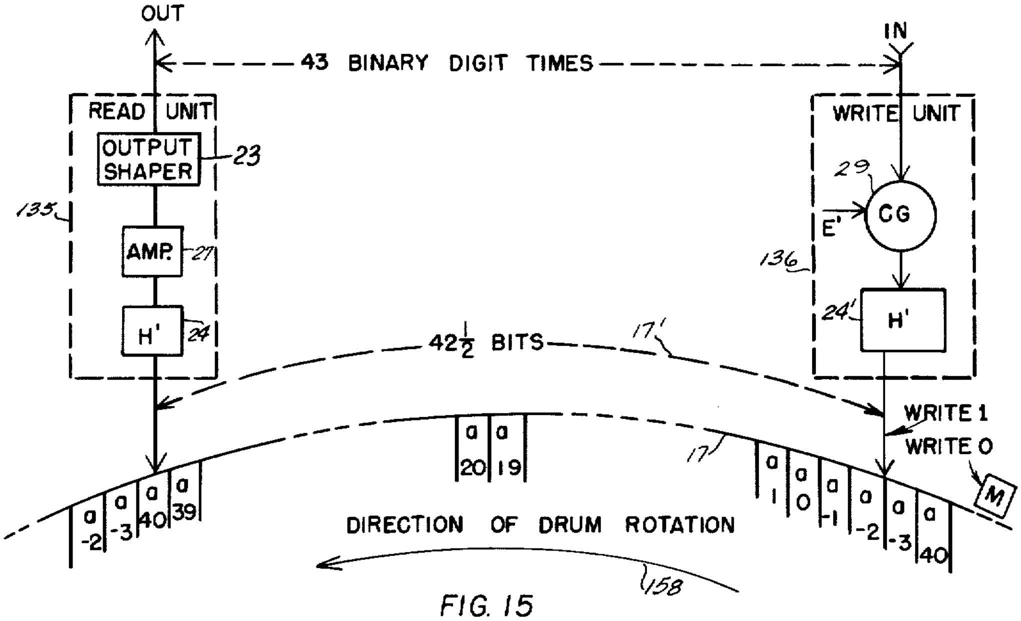

FIG. 15 is a diagram of a recirculating track and associated read and write units.

Figure 16:
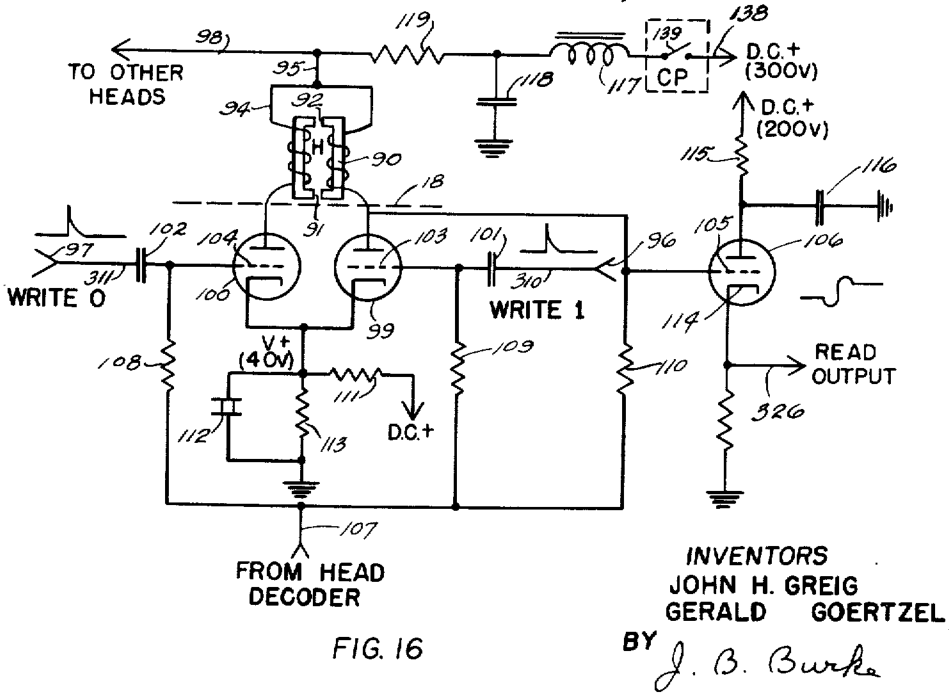

FIG. 16 is a diagram of a read-write unit.

Figure 17:
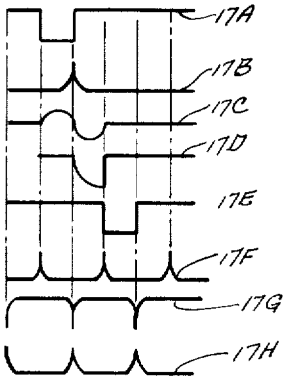

FIG. 17 is a pulse diagram showing how pulses are rephased in the memory unit.

Figure 18:
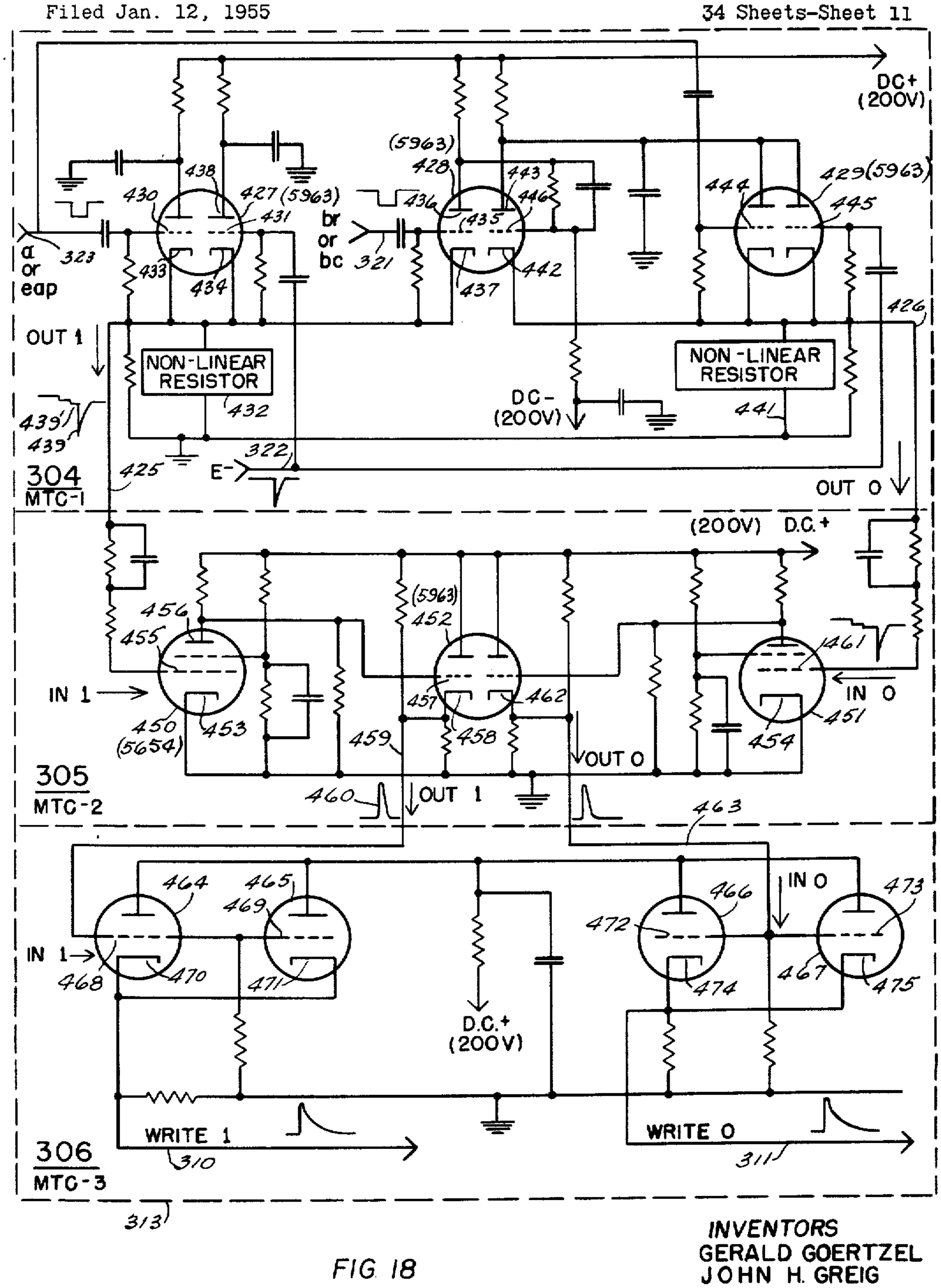

FIG. 18 is a circuit diagram showing the memory triple coincidence circuits included in the write 0, write 1 unit of the memory unit.

Figure 19:
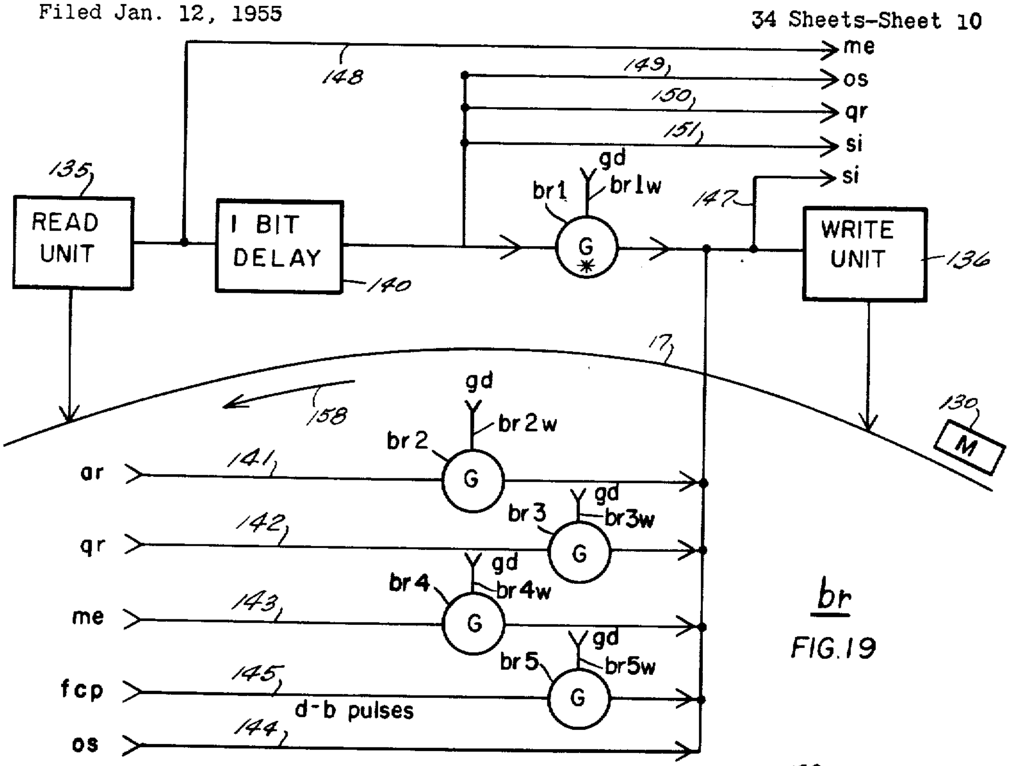

FIG. 19 is a diagram of the *b*-register.

Figure 20:
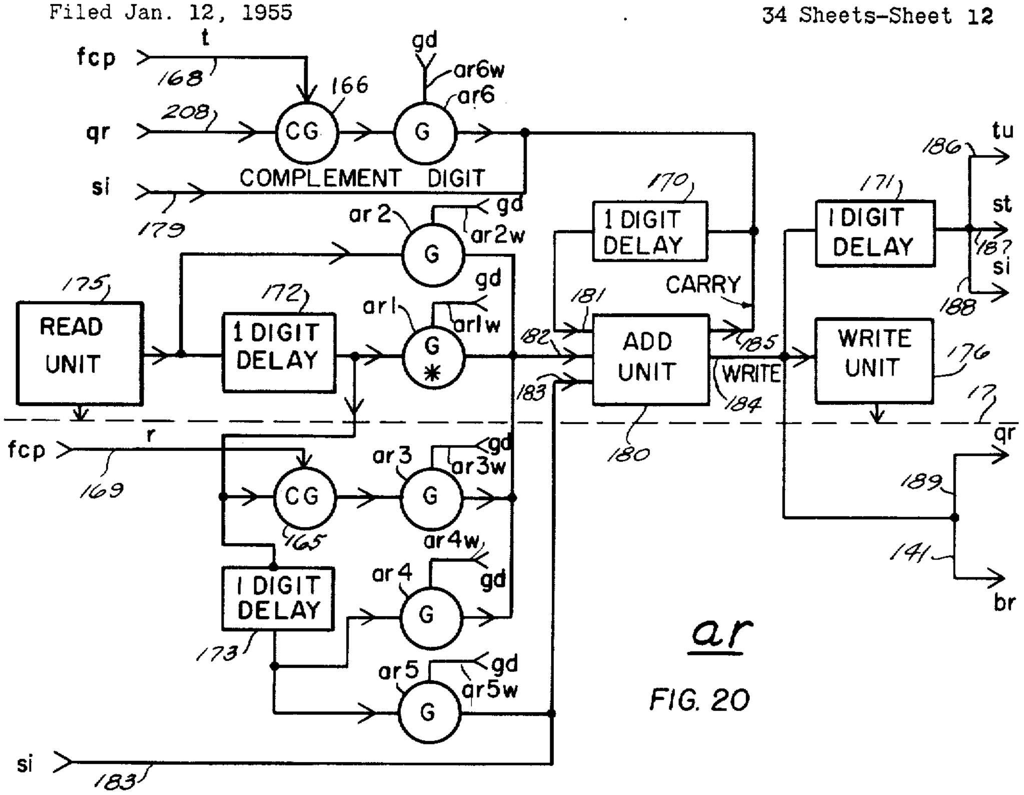

FIG. 20 is a diagram of the *a*-register.

Figure 21:
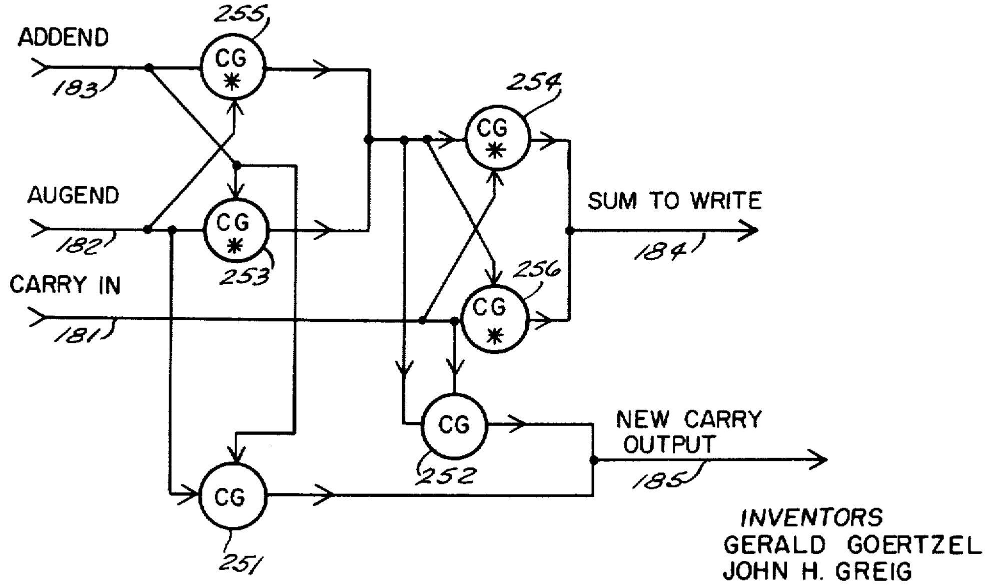

FIG. 21 is a diagram of the add unit used in the *a*-register.

Figure 22:
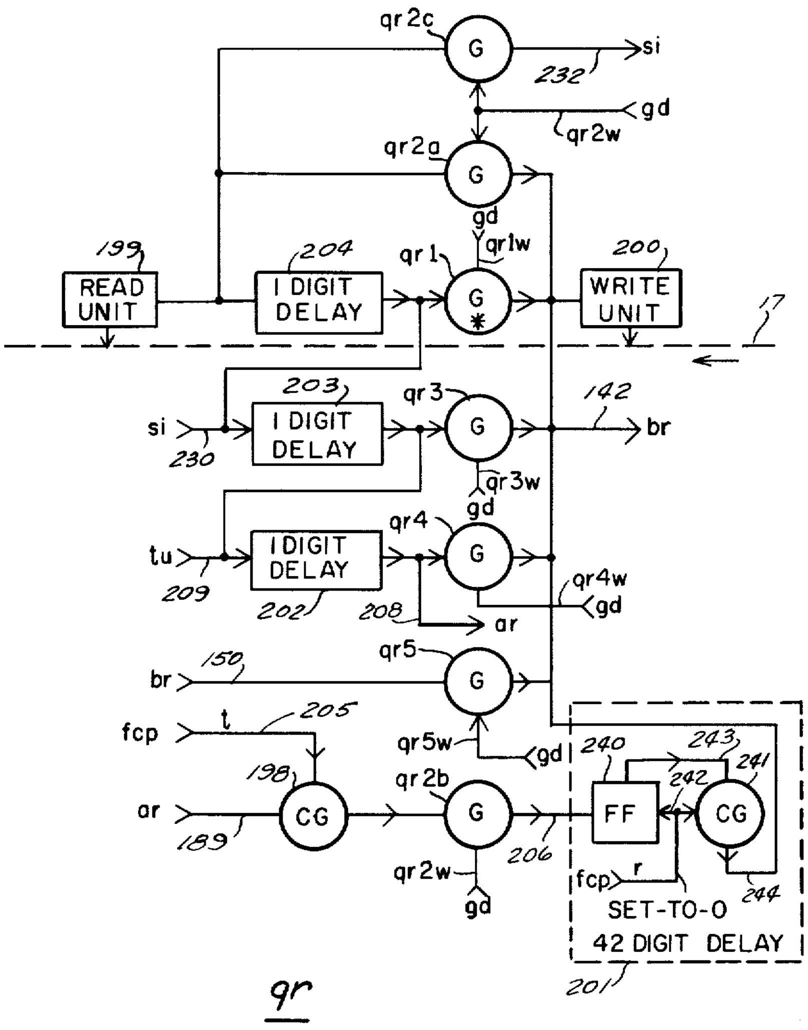

FIG. 22 is a diagram of the *q*-register.

Figure 23:
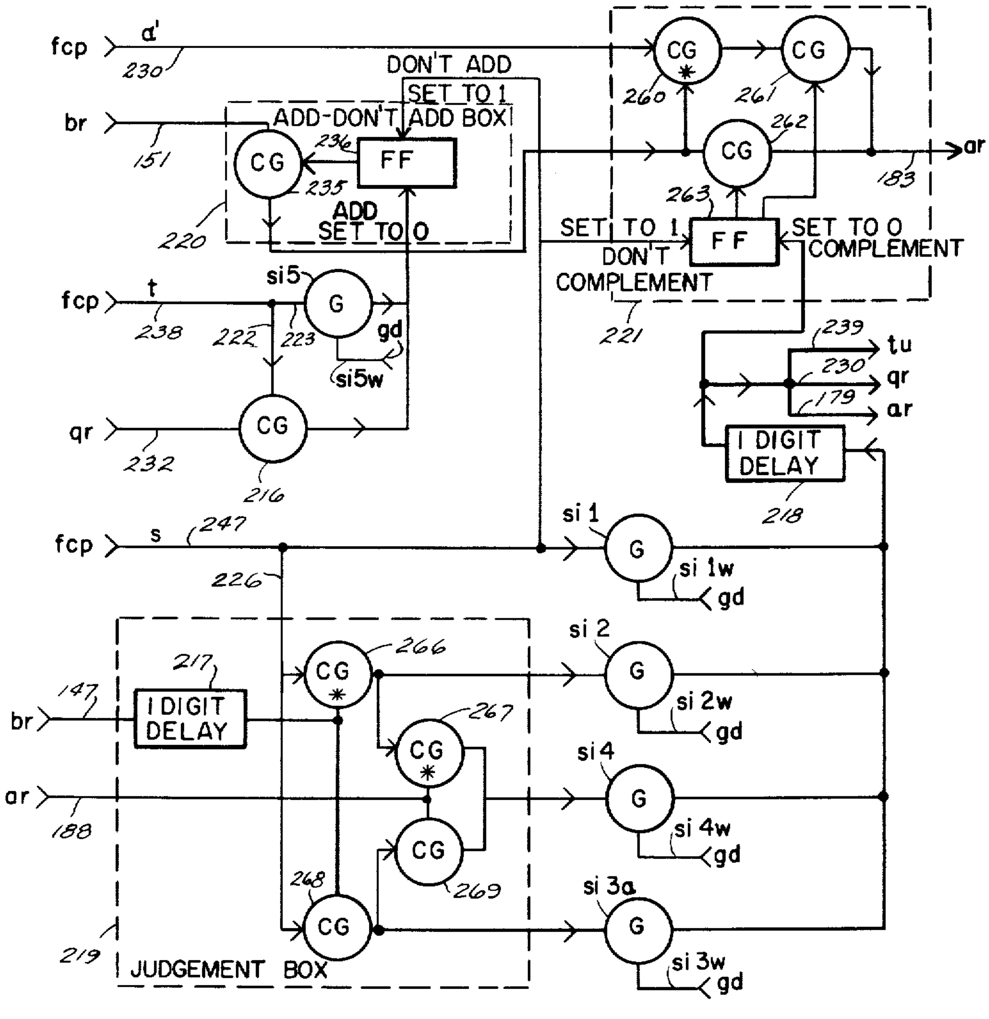

FIG. 23 is a diagram of the sign unit.

Figures 24, 25, 26, 27:
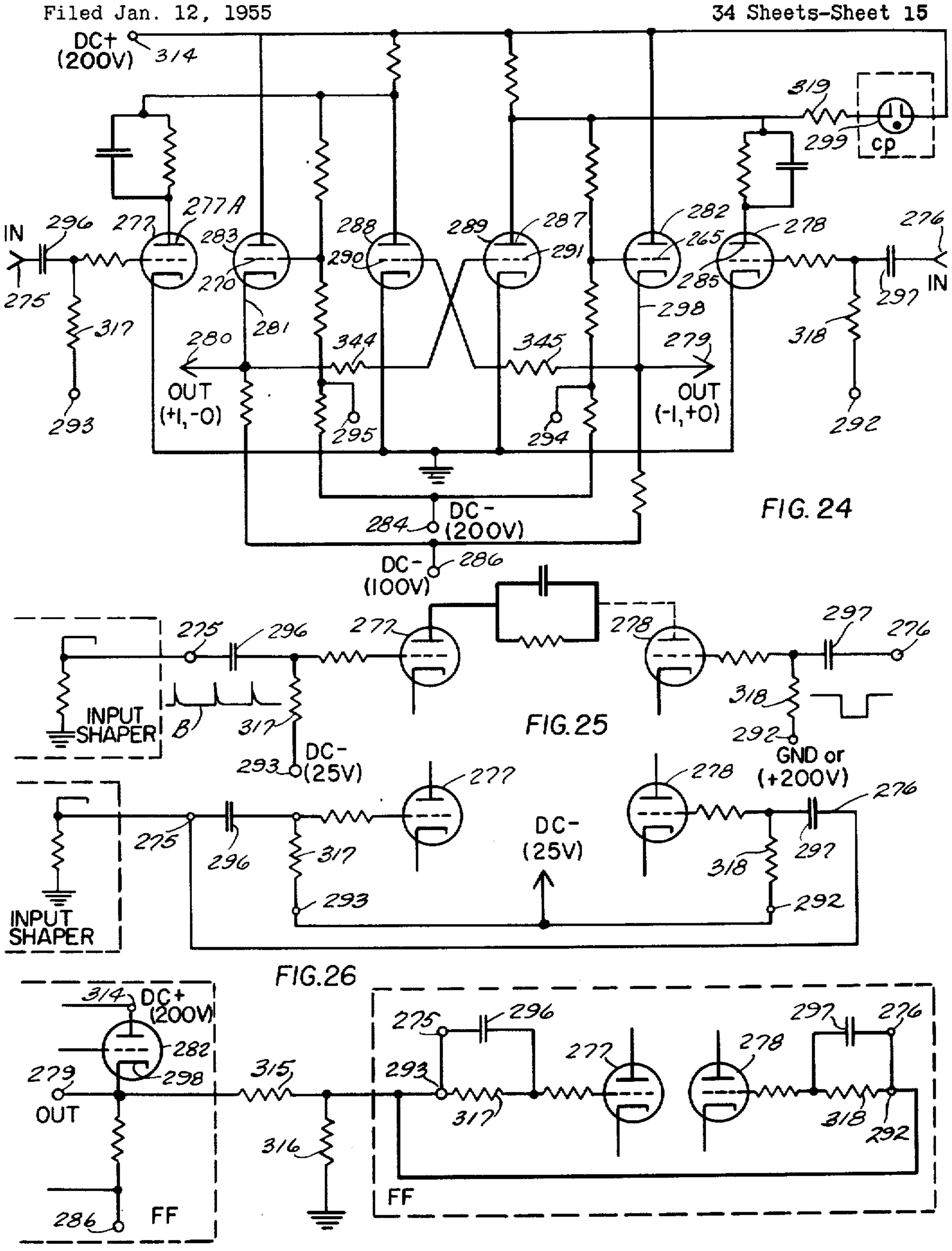

FIG. 24 is a diagram of a flip-flop circuit.

FIG. 25 shows an arrangement of the flip-flop circuit in a shift register.

FIG. 26 shows an arrangement of the flip-flop circuit in a binary counter.

FIG. 27 shows interstage coupling connections for a flip-flop circuit in a binary counter.

Figure 28:
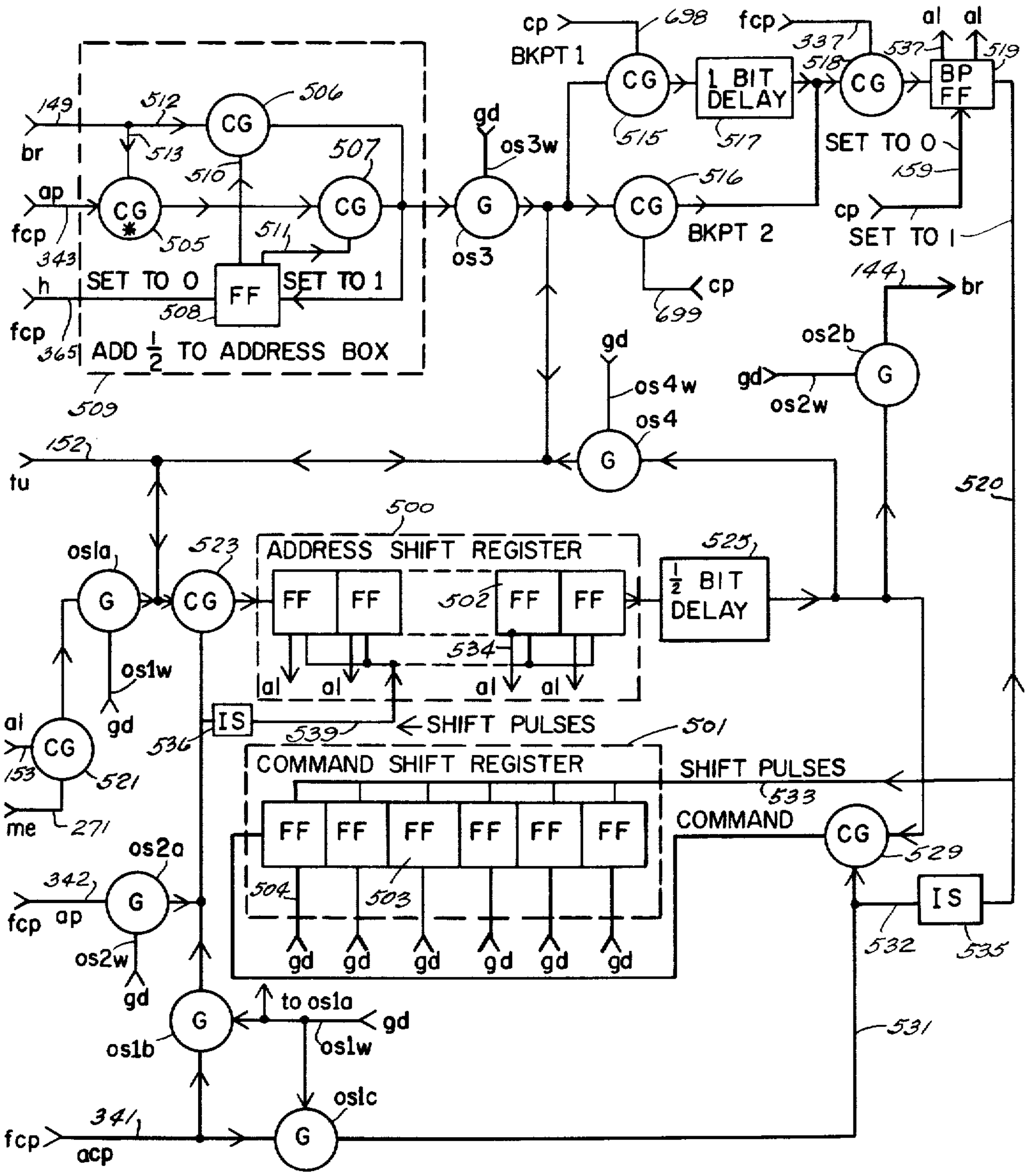

FIG. 28 is a diagram of the order storage unit.

Figures 29A, 29B:
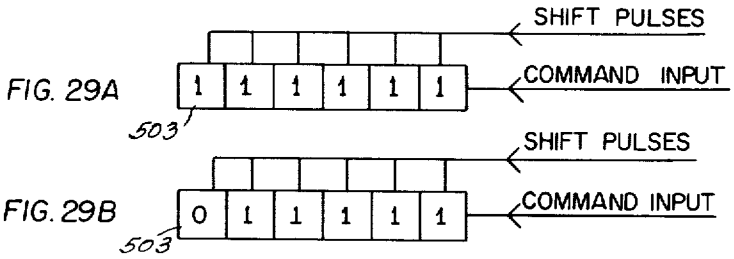
Figure 29C:
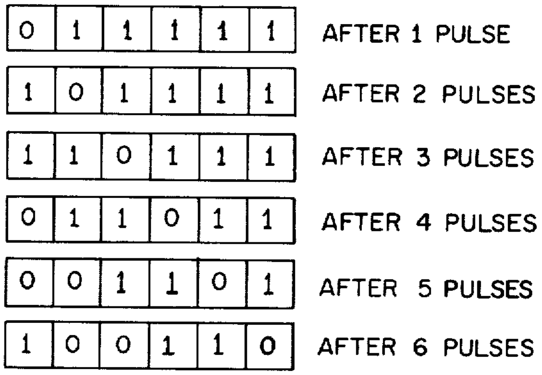

FIGS. 29A, 29B and 29C are diagrams of digits as stored in the command shift register.

Figure 30:
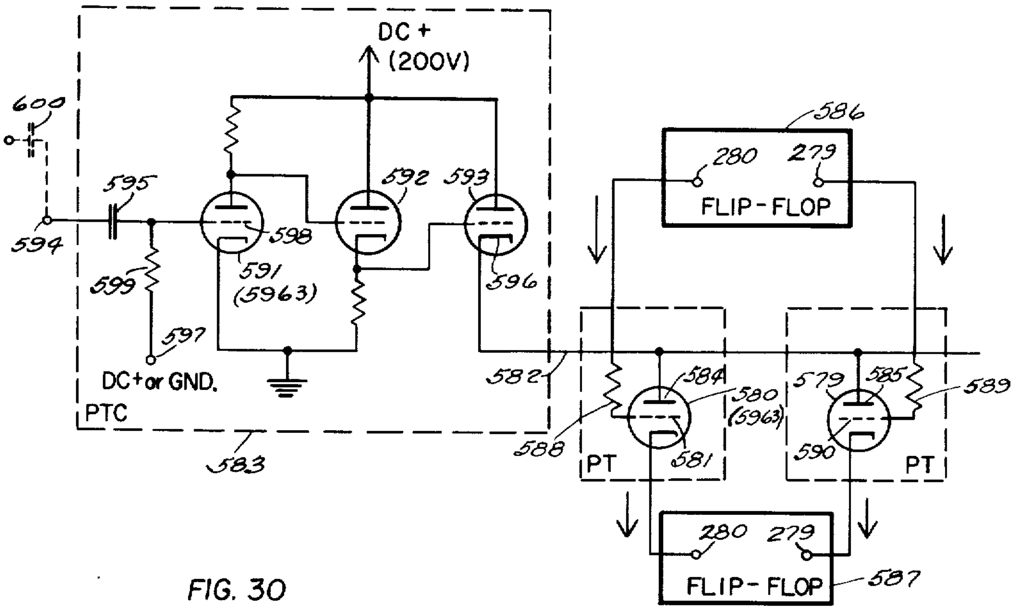

FIG. 30 is a diagram of a parallel transfer control circuit with associated parallel transfer circuits and flip-flops.

Figures 31, 32:
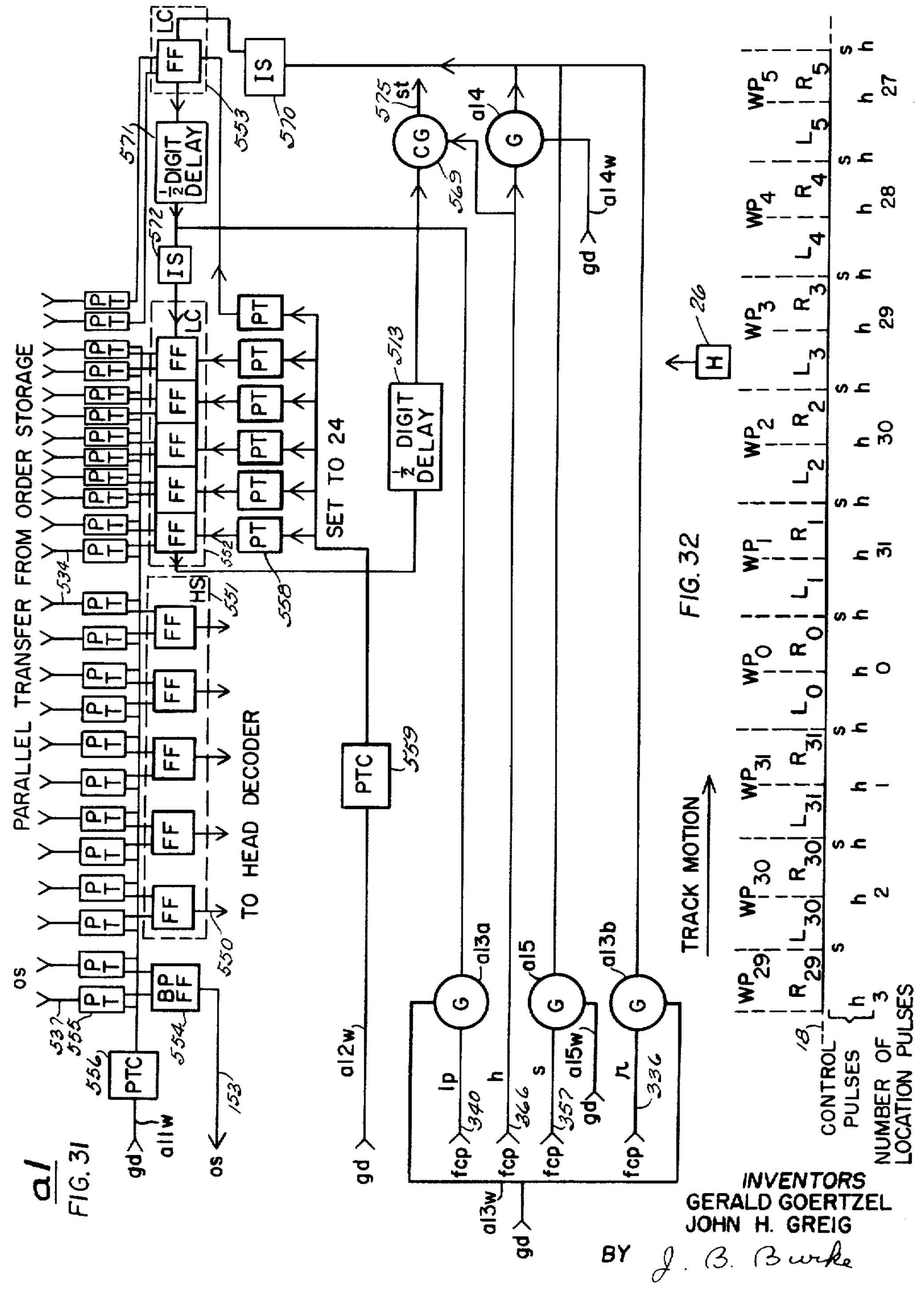

FIG. 31 is a diagram of the address location unit.

FIG. 32 is a diagram of the word position designation assigned to a memory track.

Figure 33:
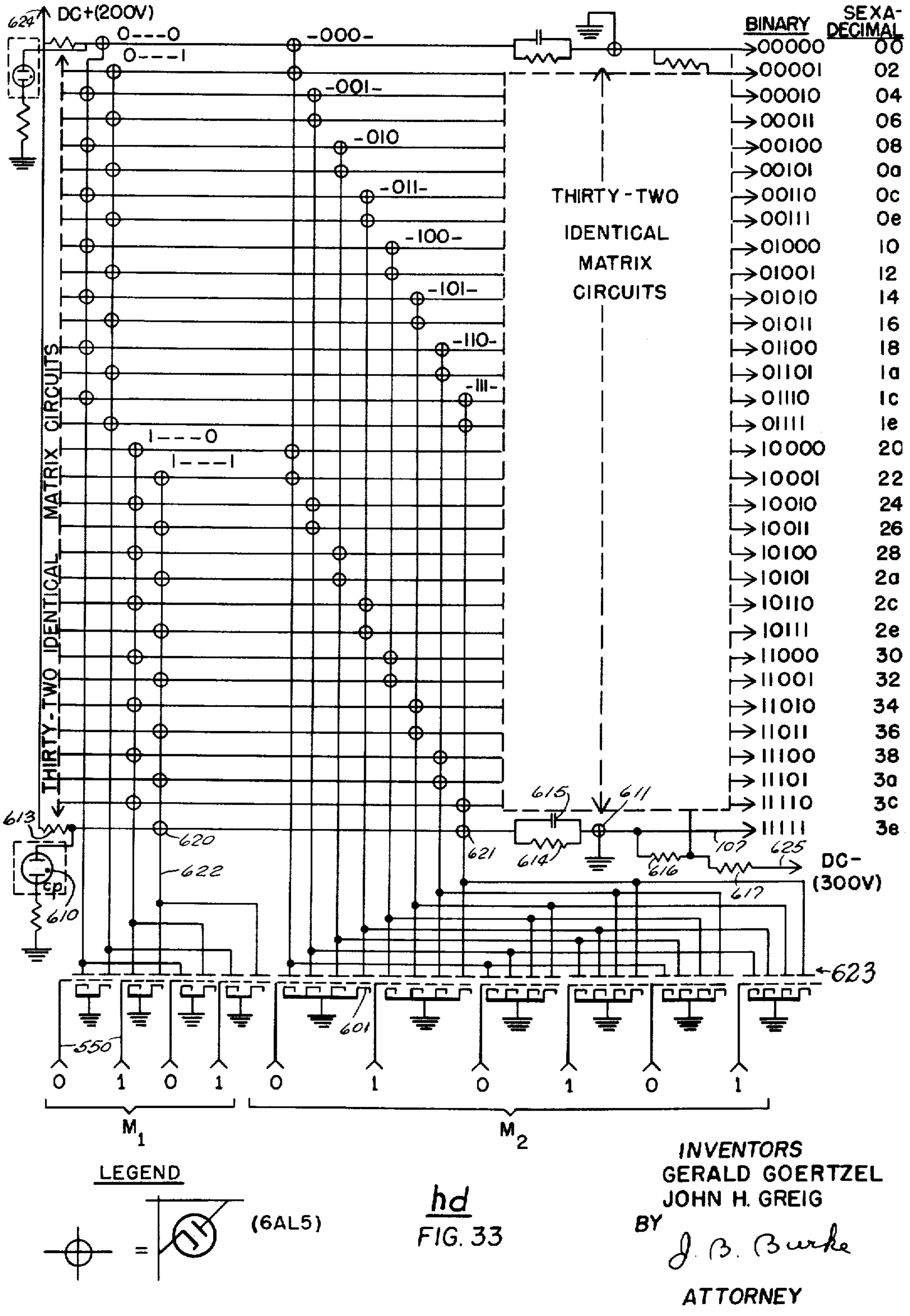

FIG. 33 is a diagram of the head decoder.

Figure 34:
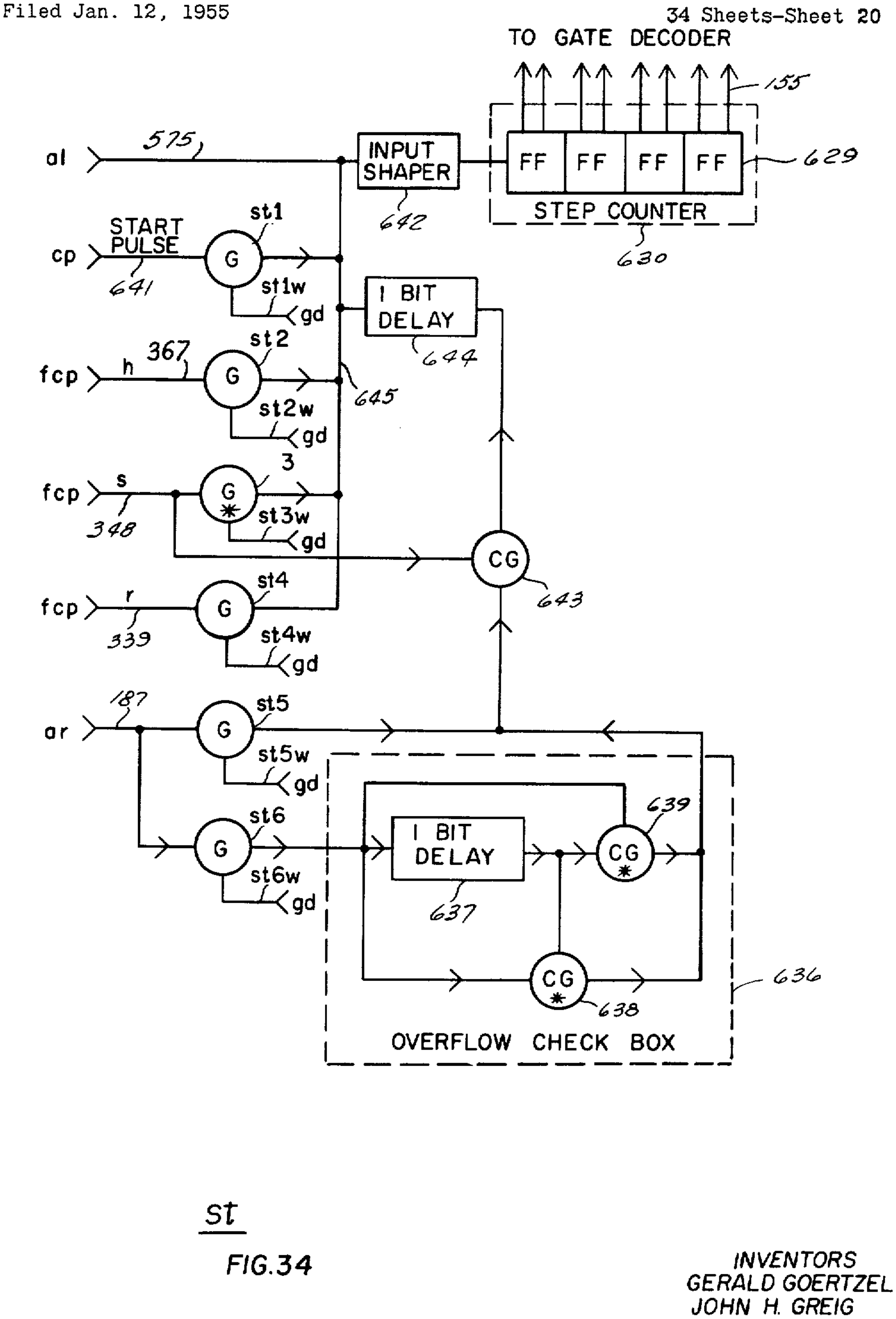

FIG. 34 is a diagram of the step counter unit.

Figures 35, 35A:
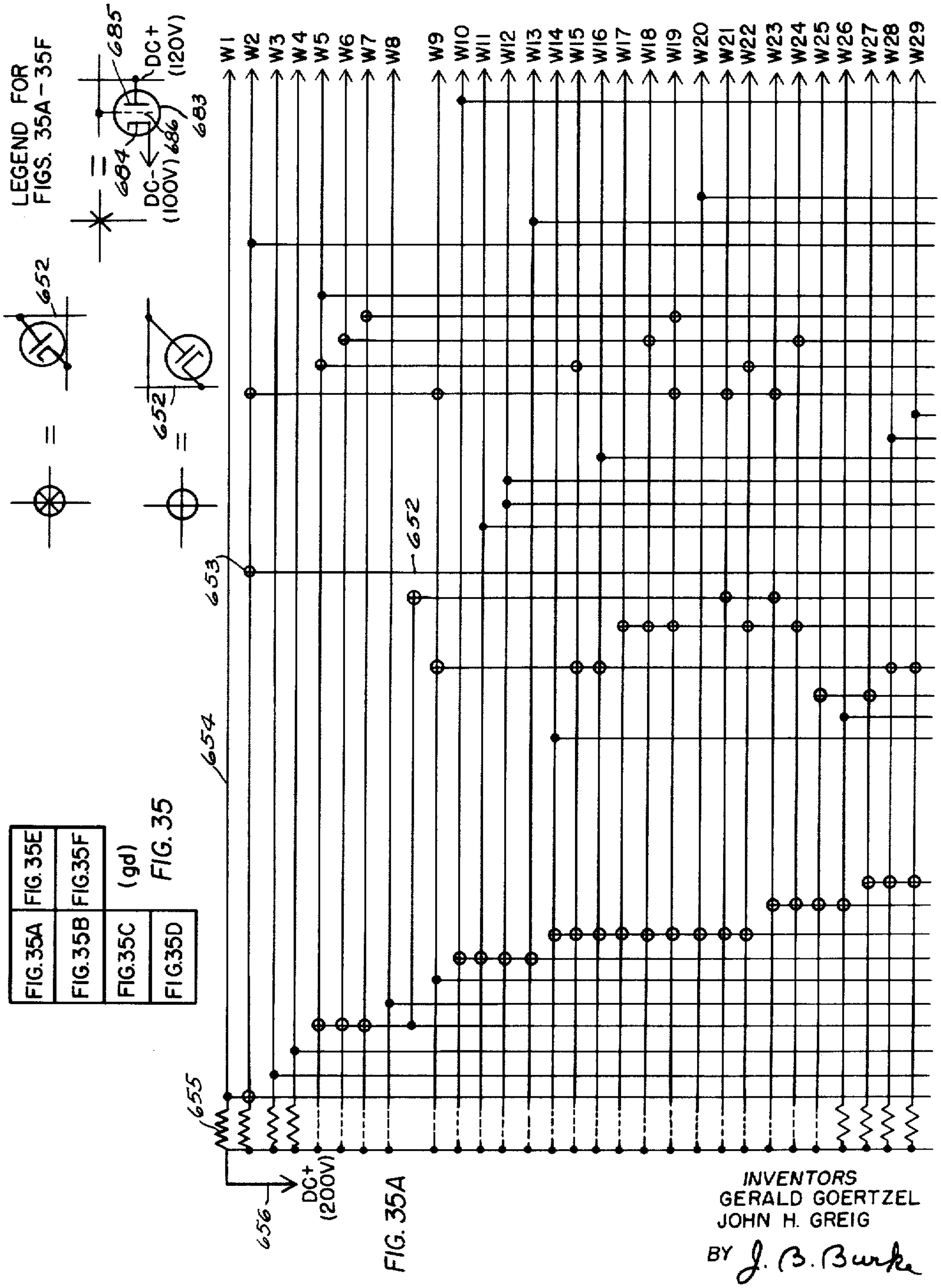
Figure 35B:
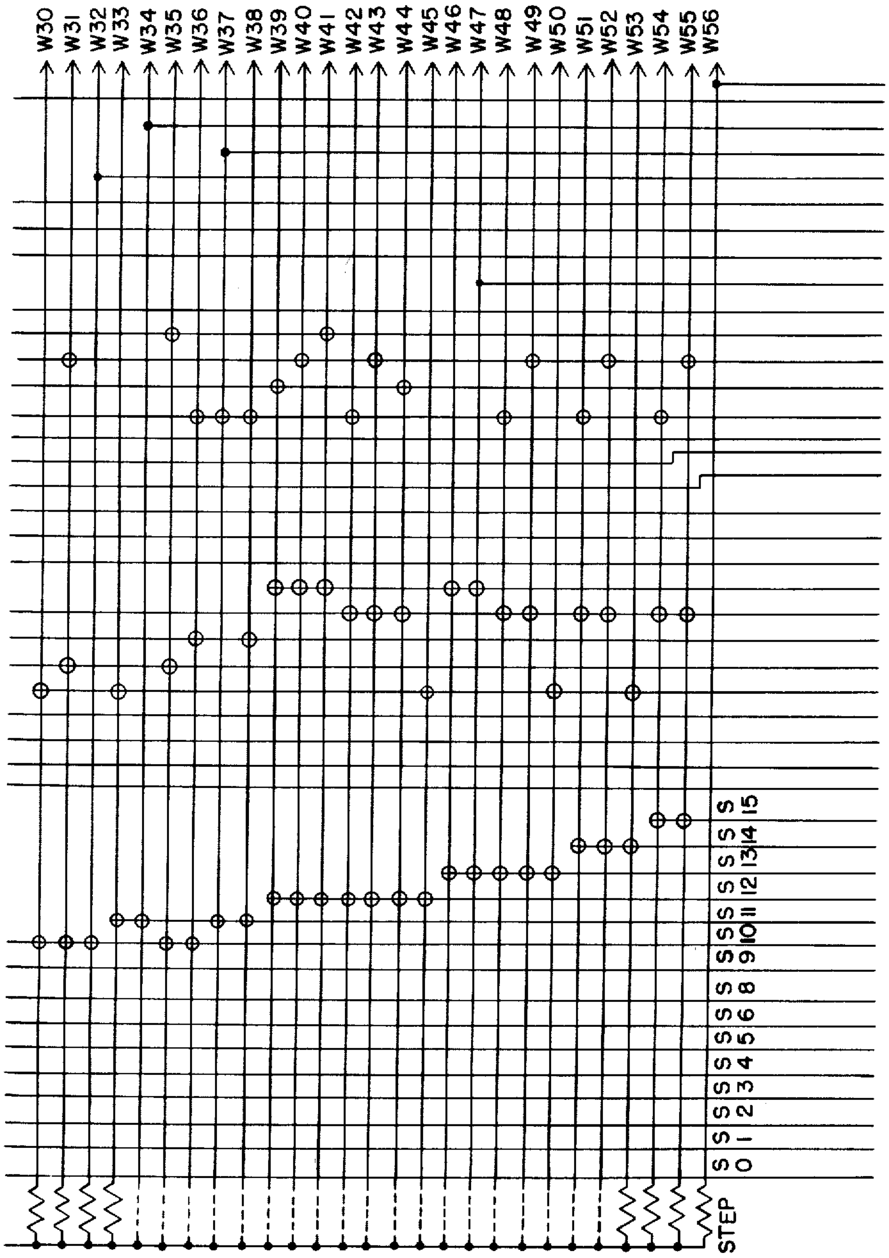

FIG. 35 shows the manner in which FIGS. 35A–35F are to be viewed as a unit.

FIGS. 35A–35F taken together constitute a diagram of the gate decoder.

Figure 36:
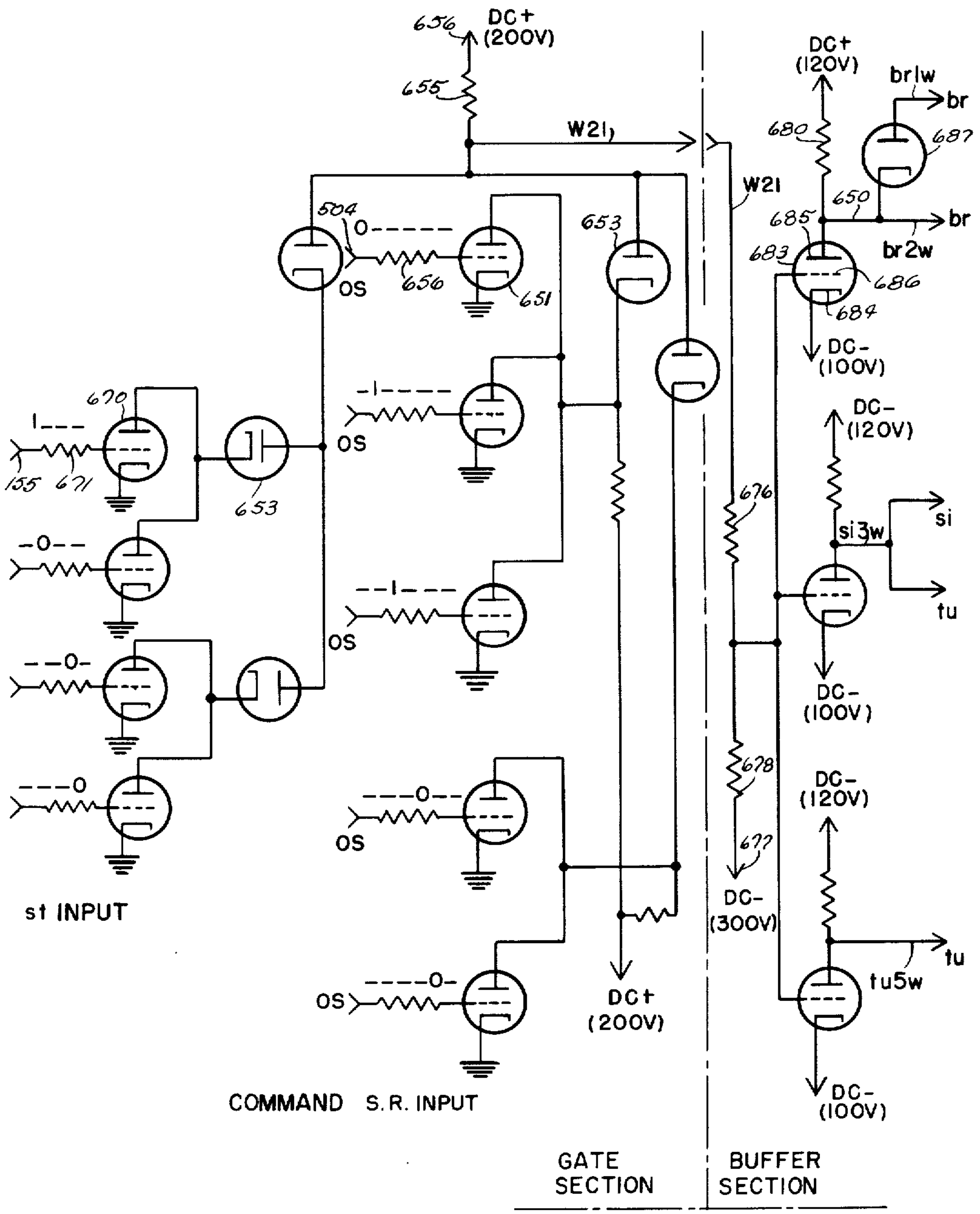

FIG. 36 is a diagram showing one configuration of the gate decoder unit.

Figures 37, 38:
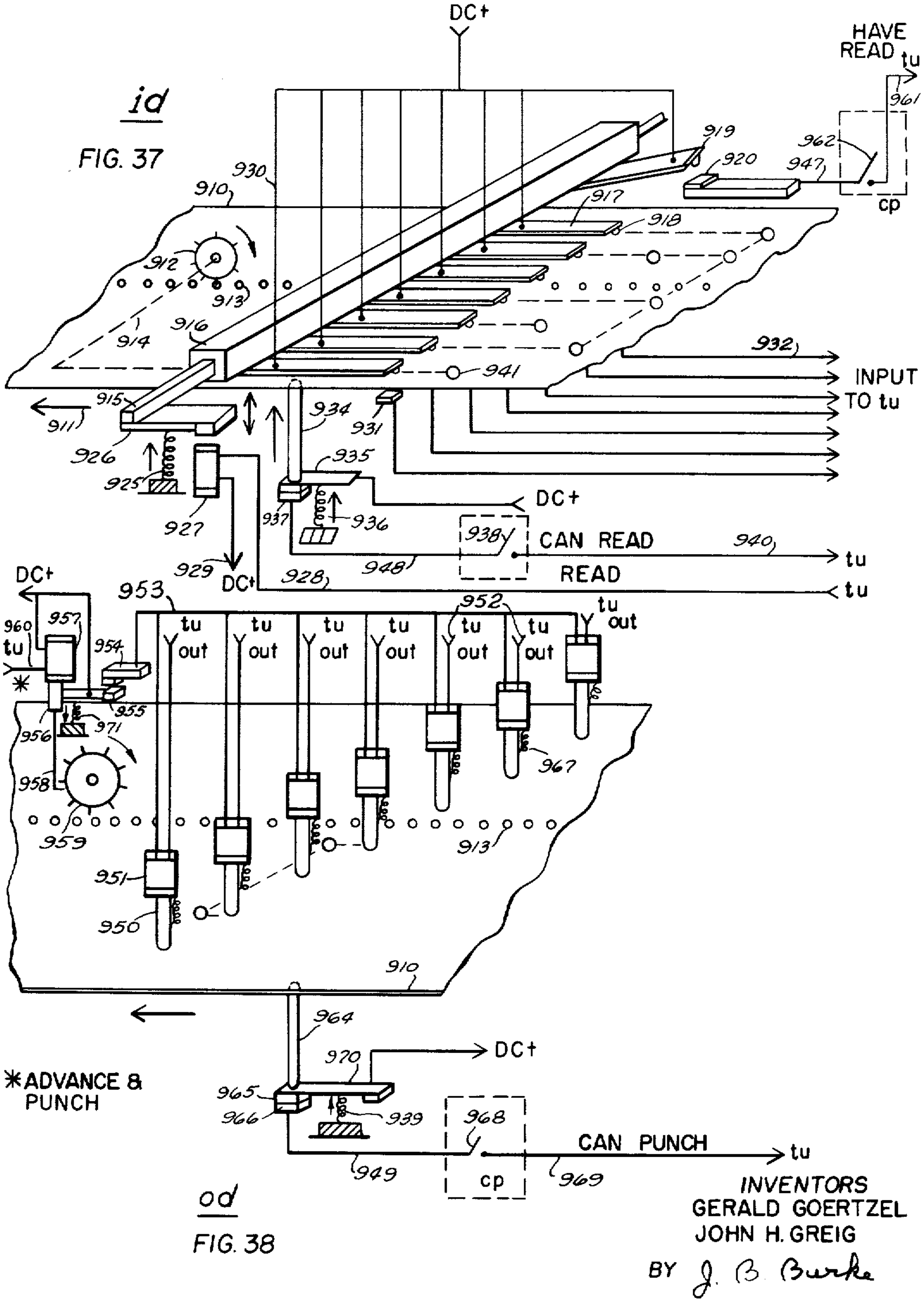

FIG. 37 is a diagram of an input device for reading information into the system.

FIG. 38 is a diagram of an output device for recording information put out by the system.

FIG. 39 is a diagram of a tape code.

Figure 40:
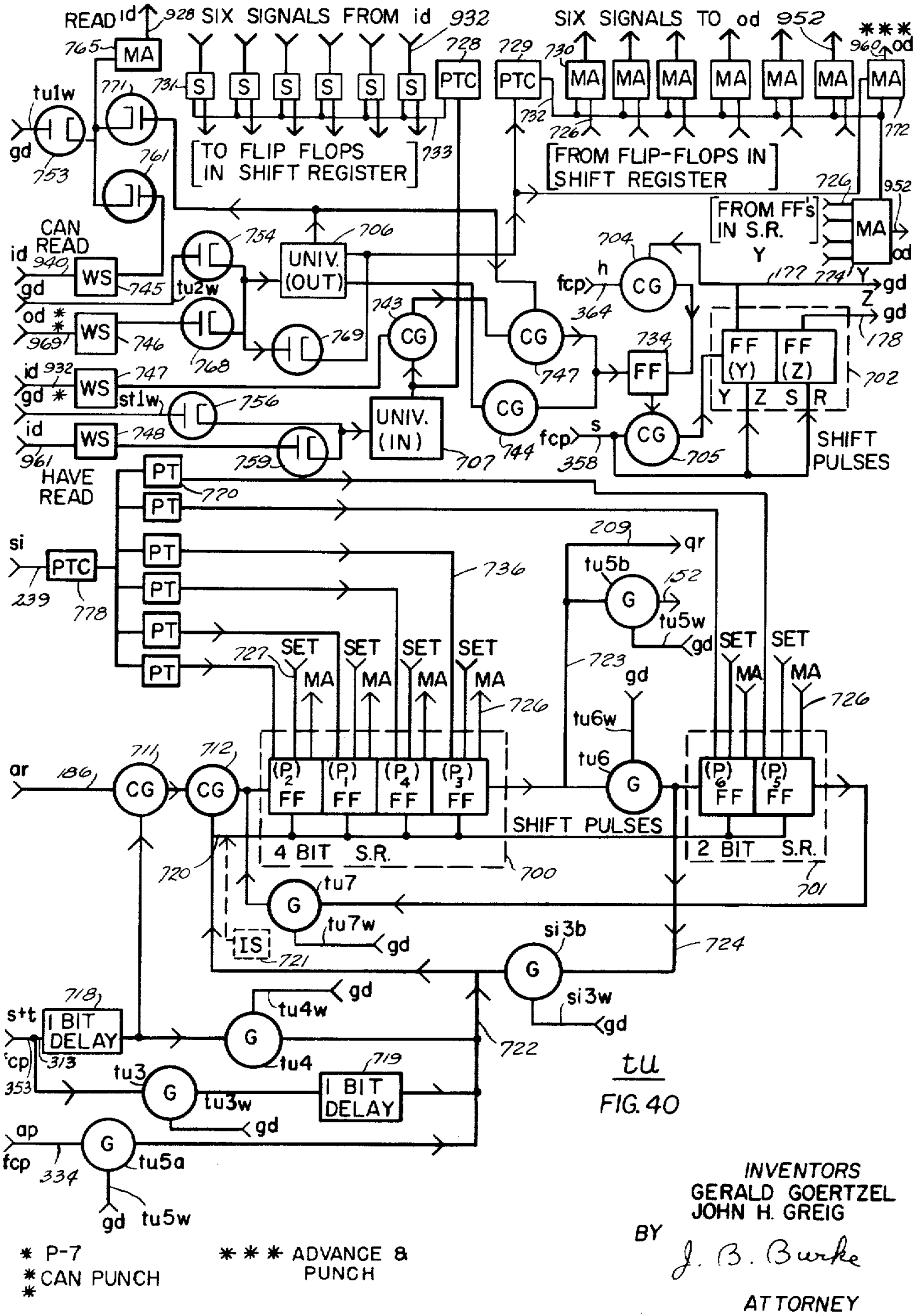

FIG. 40 is a diagram of the transfer unit.

Figures 41, 42:
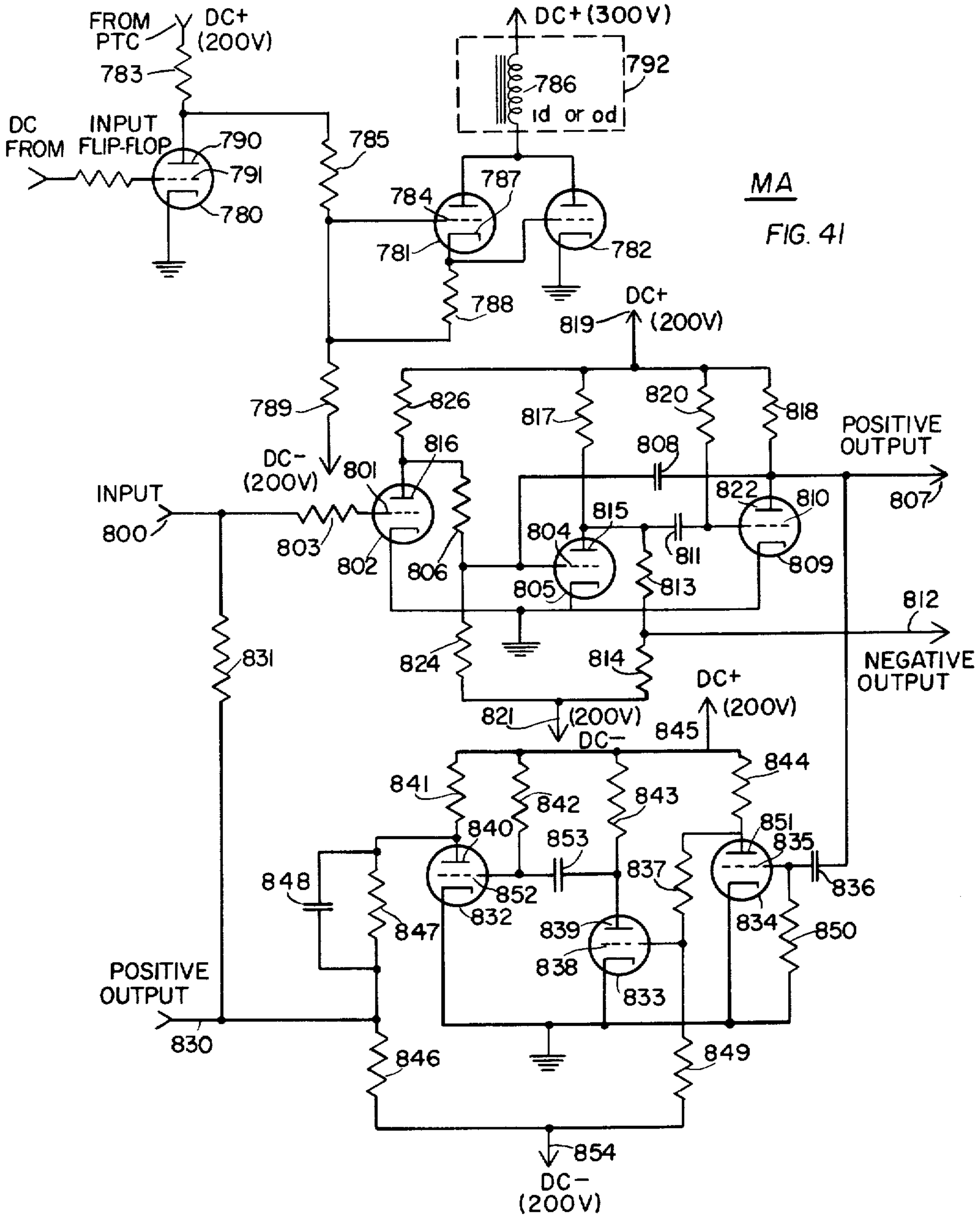

FIG. 41 is a diagram of a magnet actuator circuit.

FIG. 42 is a diagram of a univibrator circuit.

Figures 43, 44, 45, 46, 48:
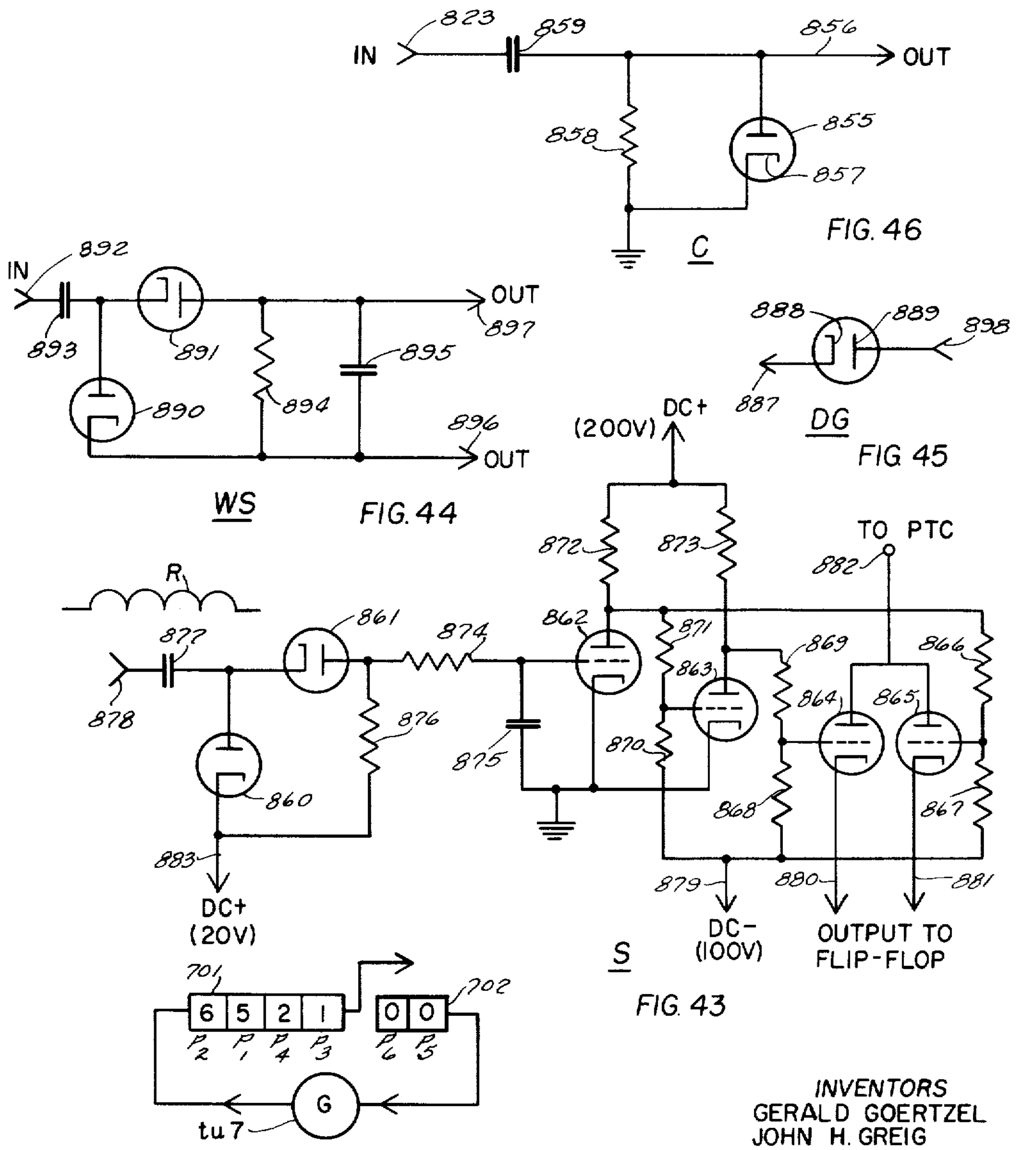

FIG. 43 is a diagram of a set circuit.

FIG. 44 is a diagram of a wave shaper circuit.

FIG. 45 is a diagram of a diode gate.

FIG. 46 is a diagram of a clamp circuit.

Figure 47:
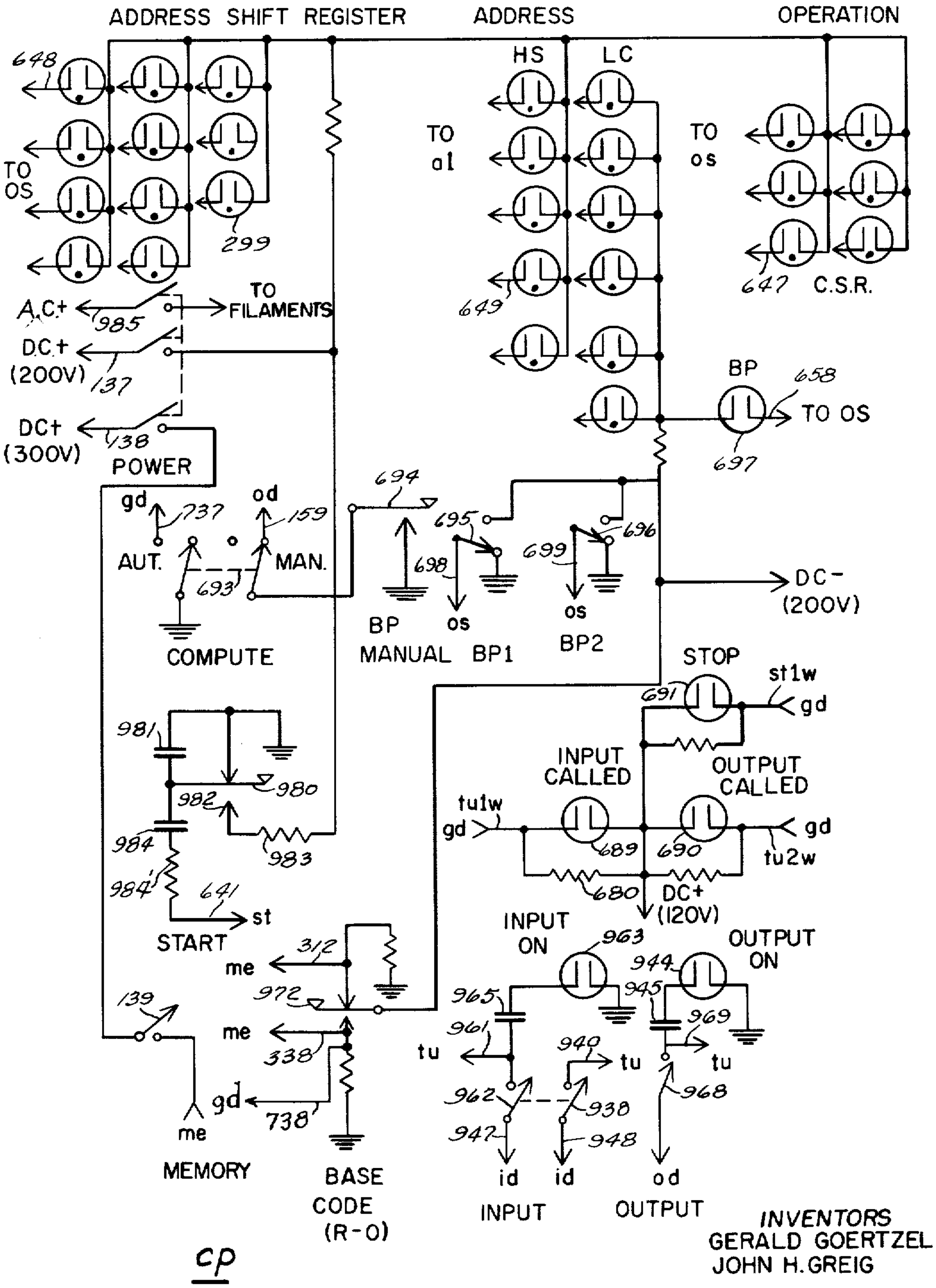

FIG. 47 is a diagram of a control panel.

FIG. 48 is a diagram showing binary digits as stored in the transfer shift register during performance of a certain order.

FIG. 49 is a diagram showing the contents of various units in the system at the end of each step during performance of a certain order.

Figure 1:
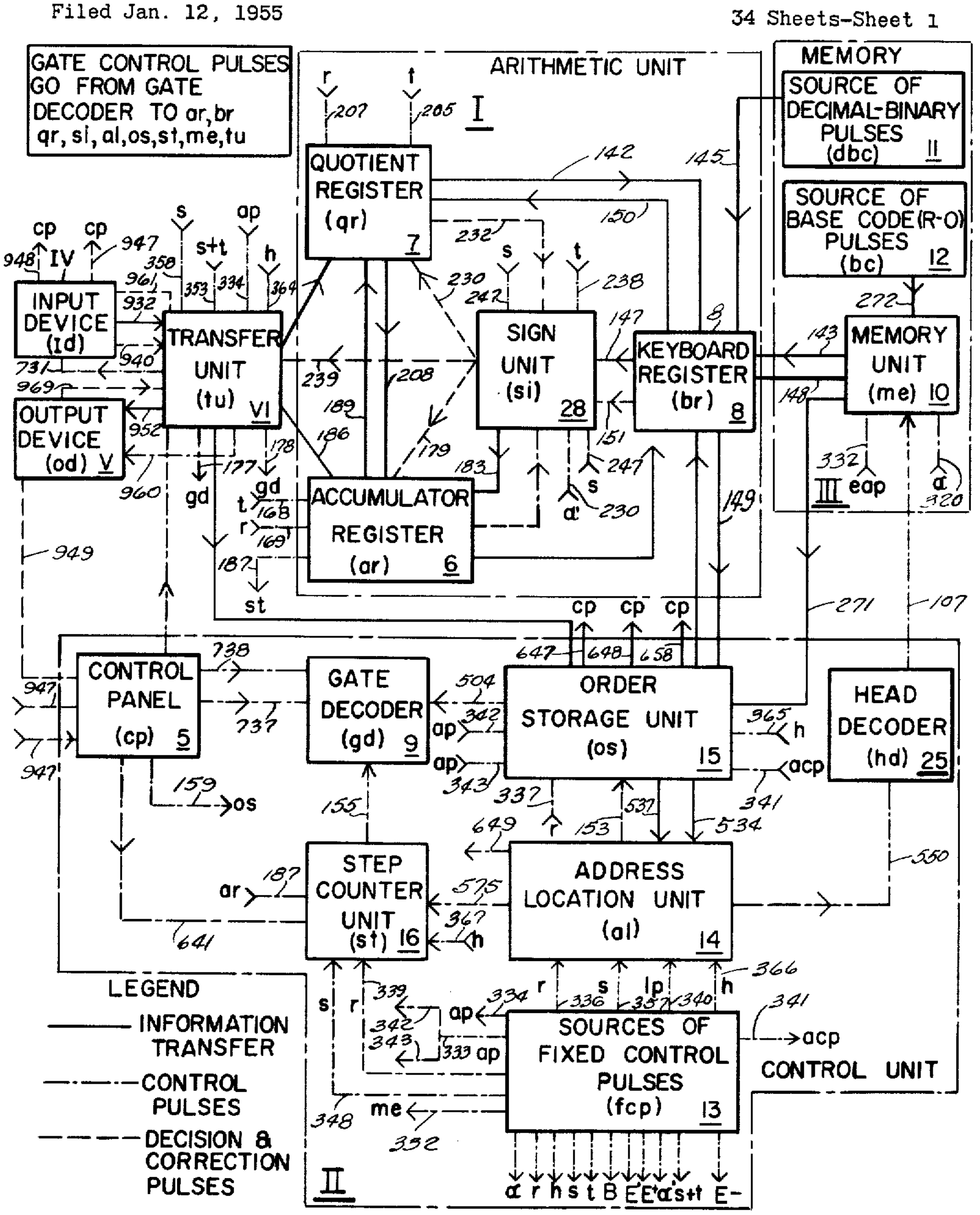
FIG. 1 is a block diagram of the computer system embodying the invention.

The computer system shown in block form in FIG. 1, may be regarded as including an arithmetic unit I, a control unit II, and a memory III. Associated with the arithmetic unit and control unit are an input device IV, and output device V connected thereto via a transfer unit VI. The arithmetic unit I is capable of performing the same sort of operations as a conventional manually operated desk-type calculator and has two operating register: an accumulator register 6 and a quotient register 7. These registers correspond to the accumulator and register, respectively, of a conventional desk-type calculator. A third register, the keyboard register 8, not available for direct operation by the operator of the computer system, is provided to handle numbers on their way to and from the memory. The memory III stores both orders and numbers. The control unit II keeps track of the system's situation and position in a routine and is capable of making a judgment and modifying the routine accordingly as required.

The transfer unit VI serves as a buffer unit between the input-output devices and the remainder of the computer system. The transfer unit serves to convert the comparatively fast pulses employed in the memory, arithmetic and control units to slower pulses for operating the input and output devices and vice versa. The input device may be a reader of a magnetic tape, a reader of a punched or marked tape or card, such as a mechanical or photoelectric reader, a typewriter or any other device capable of reading information in the form of coded electrical pulses into the transfer unit. The output device may be a tape or card punch, a typewriter, a magnetic tape recorder, an oscilloscope or any other device capable of recording or indicating information put out by the system.

In the arithmetic unit, in addition to the registers 6, 7, and 8 is a sign unit 28. This unit takes the complement of numbers passing from the keyboard or *b*-register to the accumulator or *a*-register.

Figure 2:
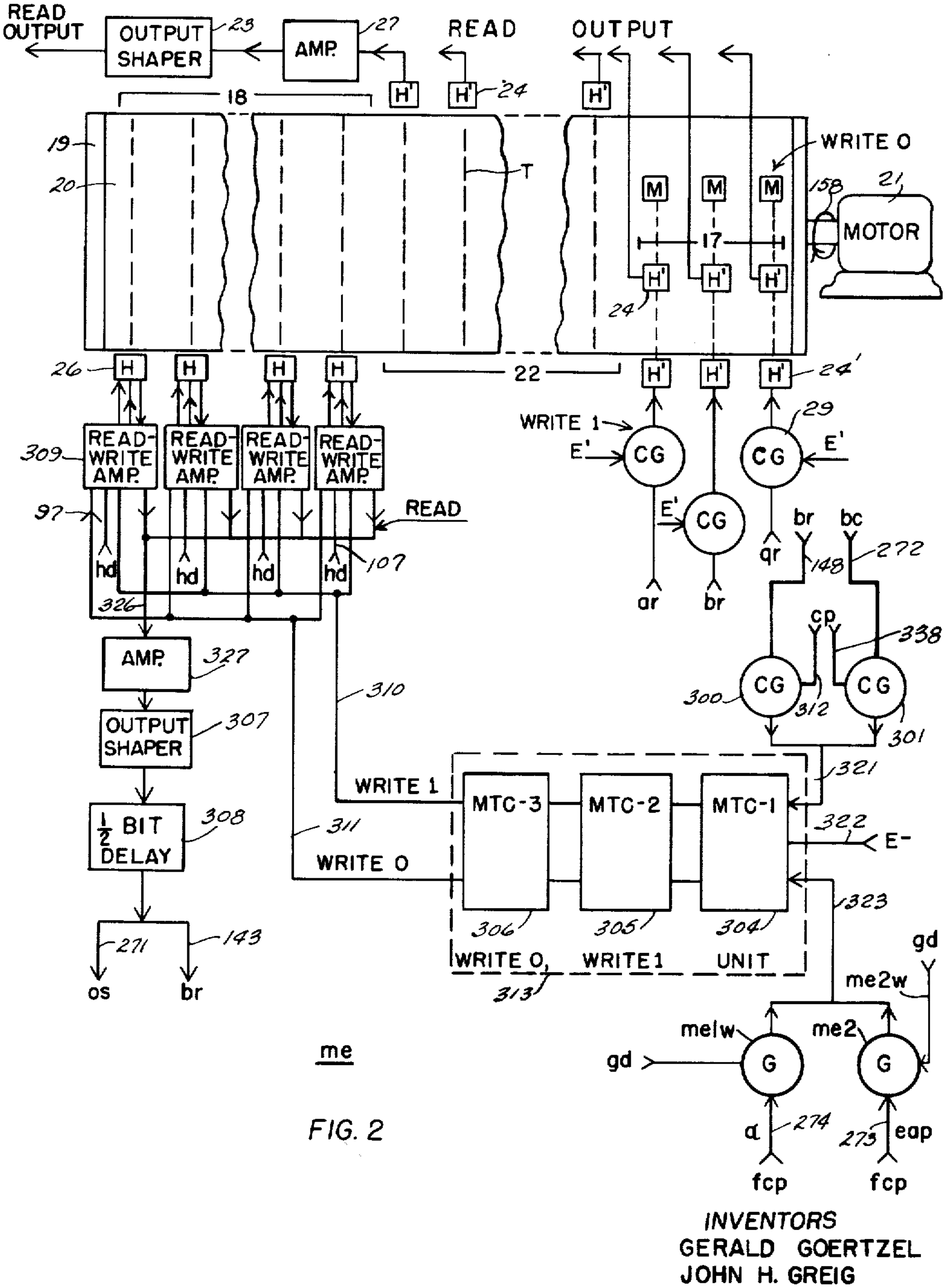
FIG. 2 is a diagram of a data storage drum and associated circuits constituting the memory unit.

Permanently stored in the system is a binary coded decimal table. This table is stored in the memory and constitutes the content of a decimal-binary pulse source 11. The pulse source is for convenience arranged as a suitable magnetic track on a magnetic drum in the memory. The decimal-binary table has the configuration of a fixed pattern of magnetized spots on this track. A base code which is a predetermined routine of operation of the system is also permanently stored in coded form in the memory. The base code pulse source is a magnetic track on the memory drum in which the base code is stored in a fixed pattern of magnetized spots. Instead of storing the base code and decimal-binary table in magnetic tracks they may be stored in any other desired forms suitable for permanent storage of information such as punched cards, photographic film and the like. Included in the memory is the memory unit 10. This unit contains the means for storing orders and numbers during the operation of the system. This unit includes a magnetic drum as shown in FIG. 2 on which are a plurality of information storage tracks and associated circuits. Instead of a magnetic drum the information may be stored in an electromagnetic matrix or other known data storage device.

In the control unit is a head decoder 25 which applies control pulses to the memory unit to enable or disable selected portions for reading information out of the memory or writing information into the memory. The head decoder receives control pulses from an address location unit 14. This unit chooses the correct memory track and correct position on the track for storing or retrieving orders and numbers. The order storage unit 15 is used for temporary storage of an order. It provides means to store an order for the time necessary to carry it out. The step counter unit 16 is used to count the successive steps in performance of order. The gate decoder 9 controls the opening and closing of gate circuits in various units of the system. Control panel 5 contains the switches, pushbuttons, and indicating lamps which may be used to operate the system. In the control unit are provided a plurality of fixed pulse sources 13. These sources supply timing pulses some of which are pulses of special configuration for use in the system. These sources may include a plurality of magnetized tracks on a drum, or any other convenient type of permanent pulse storage device.

All of the units of the system are interconnected by suitable conductors or wires. Some wires conduct information only such as wires 141, 149, 183, 209, etc. As indicated in the legend of FIG. 1, some wires conduct only control pulses such as wires 107, 550, 575, 641, etc., while wires 188, 230, 947 etc. provide decision and correction pulses to the various units. Each unit is described in detail in the following description and reference will be had to the detailed drawings illustrating each unit for explaining the construction and operation of the system.

The computer system operates on a binary number basis, but input and output data may be in decimal, sexadecimal, or other number form. Conversion from one number system to another is performed automatically. The orders and numbers are stored in the memory unit 10, which is included in the memory, in a plurality of magnetic memory tracks on a memory drum described in connection with FIG. 2. Operations may be performed on both the stored orders and the stored numbers. Thus the computer system may modify its own command coding depending on the results of previously performed calculations.

Binary numbers are handled in the computer system as electrical pulses or as magnetized spots on the memory drum. With few exceptions a pulse will mean 1 (one) and the lack of a pulse will mean 0 (zero). The instructions given the computer system are in the form of a binary number code so that they can be handled in the same way that other binary numbers are handled. Each instruction or order consists of two parts, an address and a command. The command tells the computer what to do with a number and the address tells where to find the number in the memory. This is known as "single address coding." An order to the computer will thus be of this form:

Perform some operation (the command) on the contents of a certain memory position (the address)

Orders and numbers in whole or in part as used by the computer system may be put into the memory by the operator before the computer system starts a problem and then the computer system carries out and solves the problem to the extent that the problem has been programmed. The computer system then calls for additional orders or numbers. The coding of a problem for the computer system consists of calling for the proper orders at the right time. These orders are stored in sequence in the memory, each order (command and address) occupying any suitable number of digit spaces. In the present system the order may occupy twenty binary digit spaces. A number may occupy forty binary digit spaces. Thus any group of forty digits consisting of two orders (an order-pair) or one number is designated as a *word*. As used in the present computer system each word consists of forty binary digits plus two sign digits. When a word is interpreted as a number it corresponds to a twelve digit decimal number, or as an order-pair. When a word consists of an order-pair, two orders are stored in one word position in the memory. The computer system may choose and perform either of these two orders. In normal operation successive orders occur one half word apart; i.e., suppose a particular order is stored in the left half of word No. 15, then the next order is in the right half of word No. 16, the next in the left half of word No. 16, etc. The control unit II must then add one half word to the address of each order and communicate this new address to address location unit 14 as the address of the next order which is to be carried out. The computer system is capable of modifying this procedure by means of transfer orders and by substituting addresses in its own orders.

Each order is carried out in steps. The order procedure includes:

(*a*) Location of the address at which the order to be performed is stored.
(*b*) Reading of the order from the memory into the order storage unit 15.
(*c*) Placing the address of the next order in the address shift register located in the order storage unit 15.
(*d*) Location in the memory unit 10 of the address associated with the order to be performed.
(*e*) Performance of whatever command is indicated in the order.

Each order occupies a maximum of sixteen steps. The step counter unit 16 is used to keep track of the system's position in the order. Each time the step counter unit reads zero the computer system begins to locate another order.

The orders are stored in sequence in the memory. The computer must first locate an order by means of the address location unit 14 and place the order in the order storage unit 15. The order storage unit stores the command code for the duration of the order. Since the order requires performance of some operation (the command) on the contents of memory position $x$ (the address), one step required is to find memory position $x$. This is done by the address location unit 14. After the address has been found, the operation on its contents is performed by the *a*-register (*ar*) 6, the *b*-register (*br*) 8, the *q*-register (*qr*) 7 and the sign unit (*si*) 28.

As has been noted above, the order is carried out in steps. The step counter unit 16 keeps track of the computer system's position in the order. An order starts at step S0, and usually ends before step S15. As soon as a particular step is finished, a signal is sent to the step counter unit which advances it to the next step.

Numbers are sent to the various parts of the computer system through gates or gate circuits. If a particular gate is closed, the signal does not go through; if it is open, the signal goes through. As the computer system goes through an order, certain gates are called for (i.e., opened or closed) on step S0, other gates on step S1, etc. Which gates are called is determined by the gate decoder 9. Depending on which order is in the order storage unit 15 and on the number in the step counter unit 16, the gate decoder picks a certain gate decoder wire, also designated *gate wire*. This gate wire is connected through buffer amplifiers to all the gates which are called at this point in the order. A single gate in the computer system may be called several times during an order or at various times during several orders. This gate may then be operated by any one of several gate wires. It is connected to these gate wires in such a way that there is no coupling between gate wires. That is, if a particular gate is called by two gate wires and the gate is operated by one of the gate wires the other gate wire is not activated and vice versa.

In addition to those gates which are operated by gate wires there are gates which are operated by pulses. The gates which are operated by gate wires remain opened or closed for a single step time. This may be anywhere from one digit time to the time the computer system remains on a stop order. The gates which are operated by pulses remain opened or closed for one digit time. Both types of gates may be either normally open, in which case they are closed when they are opened when called. In addition to these types of gates there are a few gates which are operated by setting a flip-flop circuit to a certain configuration. The arrangement and operation of the gates referred to are described below.

The computer system operates serially throughout. The results of arithmetic operations appear either in the accumulator register 6 or quotient register 7 and an additional order places these results in the memory.

The computer system normally operates with a fixed binary point (binary equivalent of a decimal point). This point is located immediately to the right of the sign digits. The computer system normally handles numbers whose values lie between $-1$ and $(1-2^{-40})$. The computer system may also be coded to operate with a floating binary point.

A command table for the computer system appears below in Table II. Conditional and unconditional transfer orders are included as well as an overflow transfer order. This order transfers control of the computer system when the number in the accumulator register 6 becomes greater than $(1-2^{-40})$ or less than $-1$. Thus the computer can be programmed to stop at critical points in solving a problem if the number in the accumulator is too large to be handled therein.

A subroutine transfer order stores the floating address at the position called for by the order and then transfers the control to the memory position next after that. The subroutine which begins here is carried out by the computer system. The last order in the subroutine is an unconditional transfer to the address stored at the memory position just prior to the beginning of the subroutine, i.e., to the floating address of the main routine. The computer system thus enters a subroutine and returns to the main routine by using just two additional orders i.e., a single word of coding. Liberal use of such subroutines in coded form thus greatly reduces the amount of coding necessary with only a negligible increase in storage requirements. By establishing a subroutine library coding time for the computer system may be materially reduced. As examples, subroutines may include: floating binary point operation, evaluation of trigonometric functions, extraction of square roots, special input routines, diagnostic routines, etc.

In order that the arrangement and functioning of the computer system may be better understood, the several units indicated in FIG. 1 will be described in detail. The operation of each unit in carrying out the orders which the computer system is capable of performing will also be described. First, however, it is necessary to describe the construction of a *word* as used in the present system.

WORD CONSTRUCTION

In the present computer system a *word* consists of a group of 40 binary digits plus two sign digits which may be represented by a group of forty-two pulses on a memory track. These words will be denoted in the following way:

(1) $A=a_{-1}a_0\cdot a_1a_2a_3a_4 \ldots a_{38}a_{39}a_{40}$

The two sign digits appear to the left of the decimal point. Two sign digits are employed instead of one to simplify the arithmetic procedure of the system and to effect a simplification of construction. The sign digits are zeros for positive numbers and ones for negative numbers. Negative numbers are written as a positive number minus one. For example:

(2) $00.1111=\frac{1}{2}+\frac{1}{4}+\frac{1}{8}+\frac{1}{16}=+\frac{15}{16}$ (3) $11.0001=+\frac{1}{16}-1=-\frac{15}{16}$ A negative number for the present computer system is therefore constructed by taking the complement of the absolute value of the number. The complement of a binary number is taken by replacing each one by a zero and each zero by a one. To correct the complement for the fact that the series is finite a 1 is *added* into the least significant place in the number. Application of this rule to the above example produces the correct answer as can be seen. As another example, suppose it is desired to write $$-\frac{13}{32}$$

First write $$+\frac{13}{32}$$

$$00.01101=+\frac{1}{4}+\frac{1}{8}+\frac{1}{32}=\frac{8+4+1}{32}=+\frac{13}{32} \quad (4)$$

Next replace all 1's by 0's and 0's by 1's—11.10010—and add 1 to the least significant digit—

$$11.10011=\frac{1}{2}+\frac{1}{16}+\frac{1}{32}-1=-\frac{13}{32} \quad (5)$$

Subtraction in the computer system is done by adding the complement of the number. The absolute value of a negative number is also found by taking its complement.

An order for the computer system consists of two parts, an address and a command. Eleven binary digits are required to designate a particular half-word in the memory ($2^{11}=2048$). Six binary digits are used to designate the command. Thus a total of 17 binary digits is necessary to completely define an order. Since a word contains 40 digits (plus 2 sign digits) two orders may be written into a single word space. An order will be in digit spaces $a_1 \ldots a_{20}$ in which case it is said to be in the left half word, or in digit spaces $a_{21} \ldots a_{40}$, the right half word. In either case three digits are irrelevant: $a_1$, $a_2$ and $a_{20}$ for an order in the left half word and $a_{21}$, $a_{22}$ and $a_{40}$ for an order in the right half word. If a word consists of an order-pair, the sign digits are also irrelevant (except insofar as these sign digits are used to control the semi-automatic breakpoint operation which is explained later).

The memory of the computer system as shown in FIG. 1 includes a memory unit 10, a source of decimal binary pulses 11 and a source of base code pulses 12. The memory unit as shown in FIG. 2 is a pulse storage device which includes a data storage or memory drum 19. The memory drum may be a cylinder of non-magnetic material such as aluminum which is coated with a layer of magnetizable material 20 such as iron oxide or the like. The drum is rotatable at a high uniform speed by a motor 21. Impressed on the magnetic layer area a plurality of magnetic paths or tracks T. Certain of the tracks T are designated the memory tracks 18 and in which are stored orders and numbers as magnetized spots. The number of memory tracks provided will depend on the size of the memory required. If each memory track has thirty-two word spaces for example, then sixteen tracks will be required for a memory of 512 words; thirty-two tracks will be required for a memory of 1024 words; sixty-four tracks will be required for a 2048 word memory, 128 tracks for a 4096 word memory, etc. In the interest of simplicity the present computer system will be explained with reference to a 1024 memory since the principles of construction and operation may readily be applied for smaller and larger memories.

A magnetic head (H) 26 is provided for each track 18. This head is used in reading information from the track and in writing information into the track.

A word may occupy any one of thirty-two positions on any one of the thirty-two tracks 18 in the memory. The position of a word may be indicated in the present system by a number in sexadecimal notation or by an equivalent number in binary notation as will be explained below.

A particular group of magnetic tracks 22 on the drum in association with appropriate circuitry serve as the fixed pulse sources 11, 12, 13 of FIG. 1. Three tracks 17 are designated recirculating tracks and are used in association with the *a*-register, *b*-register and *q*-register. One magnetic head (H') 24 is associated with each track 22 and two heads (H') 24, 24' are associated with each track 17. Each of heads 24, in association with an amplifier 27 and an output shaper circuit 23 acts as a read unit to read pulses from a track 17 or 22. Heads (H') 24' are used to write pulses into the tracks 17.

Figure 3:
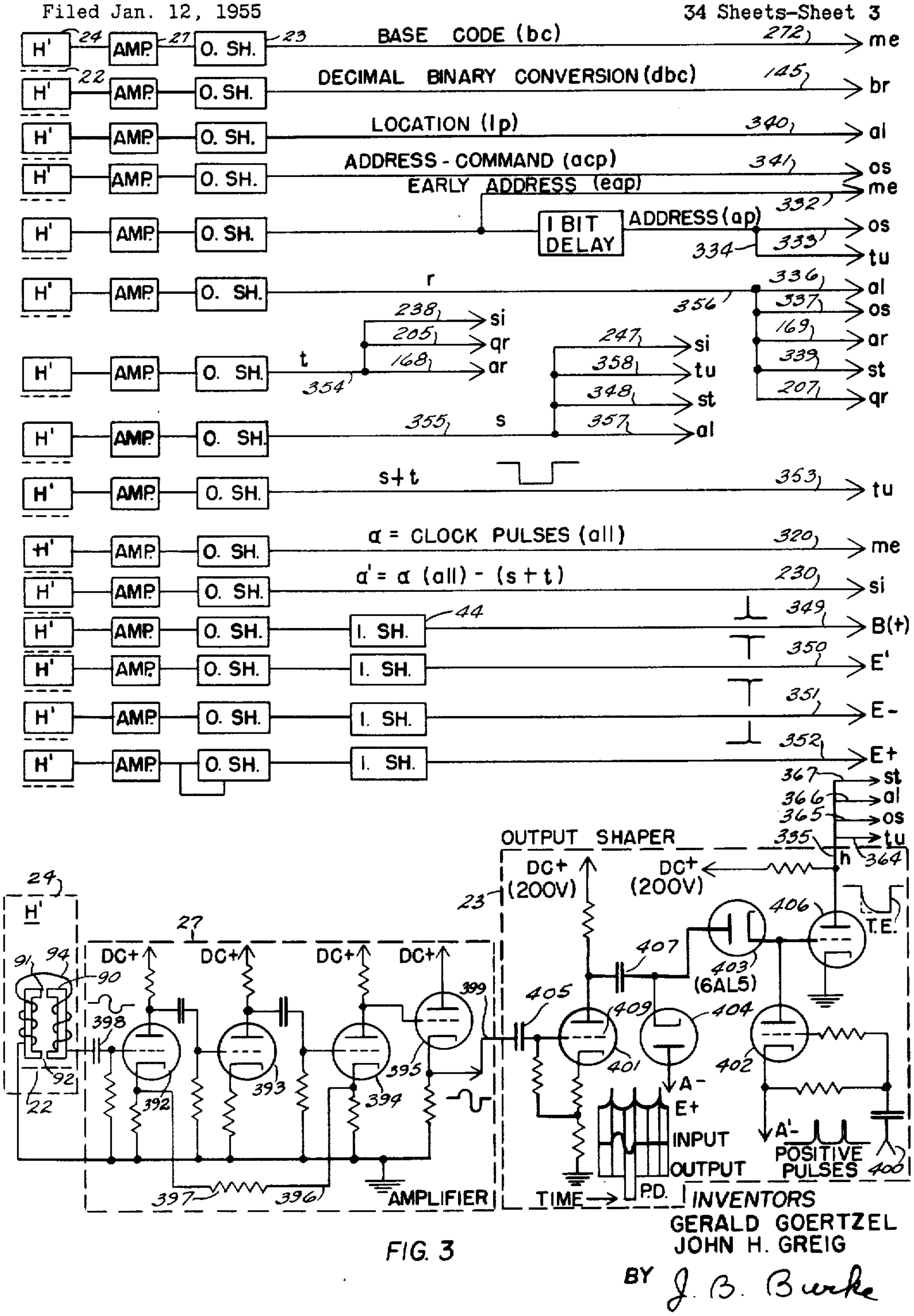
FIG. 3 is a diagram showing sources of various fixed pulses used in the system.

In FIG. 3 are shown the sources for the fixed pulses used in the computer system. The fixed pulses include fixed control pulses and fixed information pulses. In the fixed information pulse sources are stored base code data, decimal-binary conversion data and any other tables of numbers or orders to which reference is made frequently. The fixed pulse control sources are collectively designated *fcp* and provide timing, location, address, address-command, and early address pulses. The timing pulses are designated $\alpha$, $\alpha'$, B+, E', E+, E−, *h*, *r*, *s*, *t*, and *s*+*t*. The digit times and configurations of all fixed control pulses except location pulses (*lp*) are shown in FIGS. 4A, 4B taken together. All of the fixed pulses are stored on the memory drum on tracks 22.

In FIG. 6 is shown how the *s*, *t*, and *s*+*t* pulses may be derived from *r* pulses; the B+, E+, and E− pulses may be derived from basic clock pulses $\alpha$; and E' and $\alpha'$ pulses may be derived from *r* and $\alpha$ pulses. Address pulses (*ap*) may be derived from early address pulses (*eap*) as shown in FIG. 3.

A detailed circuit for the *h* pulse source is shown in FIG. 3. The sources for $\alpha$, *r*, and all other fixed pulses may be arranged in a similar manner. The pulse source includes a track 22, head 24, amplifier 27 and output shaper 23. Members 23, 24 and 27 may be regarded as constituting a *read unit*. The sources of spiked pulses B, E', E+, and E− may further include an input shaper circuit 44 arranged as shown in FIG. 7. The head H' may be a laminated iron core member 90 made in two sections with air gaps 91, 92 between the sections. The principal plane of the head is aligned with the magnetic track 22. Coil 94 is wound on both sections of the core. Coil 94 is connected to amplifier 27. As track 22 is rotated sine wave pulses are produced periodically by head 24 and applied to amplifier 27 from coil 94.

The amplifier 27 is a plural stage R-C coupled high gain linear amplifier including amplifier tubes 392, 393, 394, 395. Negative feedback is provided via line 396 and resistor 397 from the cathode of tube 394 to the cathode of tube 392. The coil 94 is connected to the grid of tube 392 via capacitor 398. The output of the amplifier is taken via line 399 from the cathode of tube 395 which serves as a cathode follower. Amplifier 27 provides a high voltage gain for the pulses supplied by head 24. The amplified pulses are applied to the output shaper circuit 23.

The output shaper serves as an amplifier, a peak to peak rectifier and a pulse reshaper. When used following the read amplifier 27 it standardizes and retimes the read signal to remove noise. The trailing edge T.E. of the output pulse from the circuit is determined by the positive timing pulses which in this instance are E+ pulses applied to input terminal 400. The circuit includes amplifier tubes 401, 402, 406 and two diodes 403, 404. The input pulses are applied to the grid 409 of tube 401 via capacitor 405. Tube 402 is biased so that it conducts only at the peaks of the positive pulses when their voltages exceed A'− volts which is the bias on the grid of tube 402. When tube 402 conducts it does so through tubes 403 and 404 and applies A− volts to the grid of tube 406. The A'− voltage is substantially more negative than the A− voltage. When tube 402 cuts off, the grid of tube 406 remains floating at A− volts being held there by stray capacitance. The sinusoidal input to tube 401 is amplified and inverted in tube 401. The output of tube 401 is negative going first and changes the charge on capacitor 407 connected to the plate of tube 401. When the input to tube 401 becomes negative, the grid of tube 406 is driven positive by an amount equal to the peak-to-peak value of the amplified input, and the output of tube 406 goes sharply negative. Appropriate voltages for operating the circuit are shown in parentheses adjacent to the voltage symbols. Suitable tube type numbers are shown in parentheses adjacent to the tube symbols.

Inputs of insufficient amplitude to overcome the bias on the grid of tube 406 will not cause any output of tube 406 and the output remains negative since the grid of tube 406 remains floating at ground until the next timing pulse; then the output goes positive sharply. Thus the trailing edge has been retimed. The *h* pulse output of tube 406 appears on line 335 and is passed to *st*, *al*, *os*, and *tu* units via lines 367, 366, 365, and 364. In FIG. 3 also appears the pulse diagram P.D. for the operation of the output shaper circuit. The positive half of the input pulse has been amplified, inverted and retimed. It has been delayed one half digit time with respect to the positive timing pulses E+.

The pulses obtained from the output shapers 23 are approximately square except for the narrow timing pulses E and B. The memory drum should be rotated at such a speed that the pulses are each about six microseconds in duration. A single word time in the present computer system consists of 44 digit times. Forty-two of these digits may be used to store a number in the word position. The remaining two digit times are used for timing purposes only and when the word position is used to store numbers or order-pairs, these two digits are zero. Thirty-two words may be stored in each memory track 18. One of the tracks 22 has 1408 (32×44) of these pulses, designated α pulses, evenly spaced along it. These are the basic clock pulses for the computer system. The leading (or beginning edge) of each pulse defines *B time*. The trailing (or ending edge) defines *E time*. In FIGS. 4A, 4B are shown the various timing and address pulses for a single word as used in the present system. It is not always necessary to use a magnetic track as the source of the α or any of the other timing pulses. These pulse tracks could be inscribed, printed, embossed, or otherwise marked on the drum and the marks could be scanned by photoelectric, electromechanical or other known reproducing means. Regardless of the physical arrangement of the timing tracks, the electrical pulses obtained therefrom will have the general configuration shown in FIGS. 4A, 4B.

The *h* pulses obtained on line 335 are negative and occur at digit time $a_{-2}$. The *r* pulses originate in a track 22 and are obtained on line 356 from which they are transmitted via lines 169, 207, 336, 337 and 339 to various units in the system. The *r* pulses are negative and occur at digit time $a_{-1}$. The *s* and *t* pulses are used to separate words. The *s* pulses occur at digit time $a_{-2}$ (or $a_{42}$) and *t* pulses occur at digit time $a_{-3}$ (or $a_{41}$). The *s* pulses are obtained on line 355 and are passed to various units in the system via lines 247, 348, 357, 358. The *t* pulses are obtained on line 354 and are passed to various units in the system via lines 168, 205, 238. Pulses *s*+*t* are negative pulses occuring at time $a_{-2}$ and $a_{-3}$ and are obtained on line 353. The α' pulses are negative α pulses including all α pulses except the *s* and *t* or $a_{-2}$ and $a_{-3}$ digit time pulses. These pulses are obtained on line 230. E pulses are narrow peaked pulses which occur at E time, i.e., the ends or trailing edges of α pulses and may be of type E−, E+ or E'. The E− pulses are negative and E+ pulses are positive. These pulses are obtained on lines 351 and 352. The E− pulses are used in the memory triple coincidence circuit designated MTC–1 and shown in FIG. 2. The E+ pulses are used in delay and output shaper circuits. The E' pulses are negative E pulses with pulses at *s* and *t* times omitted. These pulses are obtained on line 350. They are used with the writing gates of the *a*-, *b*-, and *q*-registers. B or B+ pulses are narrow peaked positive pulses which occur at B time, i.e., the beginning or leading edges of all α pulses. These pulses are obtained on line 349 and are used in delay and output shaper circuits.

Numbers are written into and read from the memory from right to left, i.e., the least significant digit ($a_{40}$) first. The process of writing a number in the memory and reading it out again in the present system causes one binary digit delay (for electronic reasons). It is therefore necessary to correct for this. It will be seen below that this correction is made by writing into the memory one binary digit time early; that is, a binary digit which is to be read out as $a_{40}$ is written at *t*-time ($a_{-3}$), $a_{39}$ is written at $a_{40}$ time, etc. When this number is read from the memory, it will be at the correct time. For this reason one binary digit *early address* timing pulses (*eap*) are needed in certain commands. The early address pulses are obtained on line 332 from an output shaper as has been described. These pulses represent binary ones digits (or bits) and the pulses occur at digit times $a_4$ through $a_{14}$ and $a_{24}$ through $a_{33}$. The *address* pulses (*ap*) are obtained on lines 333 and 334 via a one binary digit delay from the output shaper. These pulses are used to write addresses in the memory and are delayed one binary digit or bit to operate various shift registers in the computer system and the *add ½ unit* to be explained later. These pulses represent binary ones digits and occur at digit times $a_3$ through $a_{13}$ and $a_{23}$ through $a_{33}$. The *address command* pulses (*acp*) are obtained on line 341 and represent binary ones digits. These pulses occur at digit times $a_3$ through $a_{19}$ and $a_{23}$ through $a_{39}$ for each word space in the memory tracks.

The decimal-binary conversion pulses (*dbc*) are negative information pulses obtained on line 145 from an output shaper. These pulses in the aggregate represent a decimal number-to-binary number conversion table, and the decimal-binary pulse source 11 is most conveniently embodied in one of tracks 22 but may be stored in any other appropriate permanent form. Although the decimal-binary pulse source is physically located on the memory drum along with the timing tracks it is not considered a timing pulse source. It is regarded as a body of information permanently stored in the memory as indicated in FIG. 1.

One of tracks 22 is used as a source of fixed code location pulses (*lp*). The location pulses are used by the address location unit to locate particular word positions in the memory. The location pulse track is regarded as having as many divisions or word positions as there are word positions in a memory track. In the present system the circular location pulse track has 32 such word positions each of which is assigned a word position number (WP). Thus in FIG. 5 which represents the location pulse track arrangement, the word position designations on the track 22 are numbered from $WP_0$ to $WP_{31}$. The zero position $WP_0$ is in an arbitrarily chosen location on the track 22. Each word position is identified on the track by having a different number of location pulses (*lp*) stored therein, thus word position $WP_0$ has zero pulses, word position $WP_{31}$ has one pulse, word position $WP_{30}$ has two pulses, etc. The location pulses scanned by head 24, are obtained on line 340 via an amplifier 27 and output shaper 23 as shown in FIG. 3 and are passed to the address location unit (*al*) as shown in FIG. 1.

The base code (*bc*) pulses, also designated R–0 are negative information pulses obtained on line 272 from an output shaper. The base code pulse source 12 constitutes data permanently stored in the memory as indicated in FIG. 1. For convenience it is physically located in a track 22 but is not considered a timing, location, or address pulse source. The base code pulse source facilitates reading data and coding into the computer system and determining the contents of the memory, *a*-register and *q*-register. It also is used in changing the contents of the certain units in the control unit II as will be described.

All the pulses which are permanently stored on tracks 22 may be recorded on the tracks by an arrangement such as shown in FIG. 8. A square wave generator 391 will apply pulses through an input shaper circuit of a type shown in FIG. 7. This circuit will transmit the pulses to the head H' which will impress the pulses magnetically on track 22. After the pulses are impressed the input shaper 390 and pulse generator 391 will be disconnected from heat H' which is then connected to an amplifier and output shaper as shown in FIG. 3. Other means for impressing pulses of suitable configuration and at the desired digit times may readily be devised.

In FIG. 6 is shown the arrangement for deriving $s$, $t$, $s+t$, $\alpha'$, B and E pulses from $r$ and $\alpha$ pulses. This arrangement employs a plurality of input shaper circuits as shown in FIG. 7. This circuit is a versatile two stage differentiating (or peaking) amplifier. The circuit may also be used as a non-differentiating amplifier. In FIG. 7 the pulse input terminal 410 is connected to the grid of tube 411 via capacitor 412. The plate of tube 411 is connected to the grid of tube 413 via capacitor 414. Tube 413 has two outputs 415, 416. Output 415 is taken from the plate 417 and output 416 is taken from the cathode of 418 of tube 413. Capacitor 412 and resistor 419 constitute a differentiator for the input pulses to the circuit and grid 420 is biased to clip the position going peak so that the negative going edge of the input wave is differentiated. The output of the circuit is taken on lines 415, 416 at negative or positive going peaked pulses respectively. If resistor 419 has a fairly low value of the order of 20,000 ohms the circuit acts as indicated. If the resistor has a high value of the order of one megohm the circuit acts as a non-differentiating pulse amplifier with outputs 415 and 416 negative and positive going respectively, and the circuit is then an inverter cathode follower amplifier for the output 416 and a linear amplifier for the output 415. When the input shaper differentiates a negative going $\alpha$ pulse, the trailing edge is differentiated and when it differentiates positive going square pulses, the leading edges are differentiated.

In FIG. 6, the input shaper 330 is employed as a dual output inverter amplifier. The $\alpha$ pulses applied to input shaper 330 from the output shaper 23 of the $\alpha$ pulse source are amplified and appear on line 320 as negative clock pulses. The positive timing pulses required for the output shaper are obtained from the amplifier 27 whose output 399 is connected to terminal 400 as well as to grid 409 via capacitor 405 of the output shaper. The $\alpha$ pulses are also applied via line 440 to the input shaper 360 where their leading edges are differentiated to produce narrow peaked positive B pulses. The input shaper 330 has a cathode follower output of square positive pulses which are applied to input shaper 370. The trailing edges of the positive pulses are differentiated and the output appears as E— pulses on line 351. At another output 352 of the input shaper 320 appear E+ pulses.

Figures 9, 9A, 10, 10A, 11, 11A, 12:
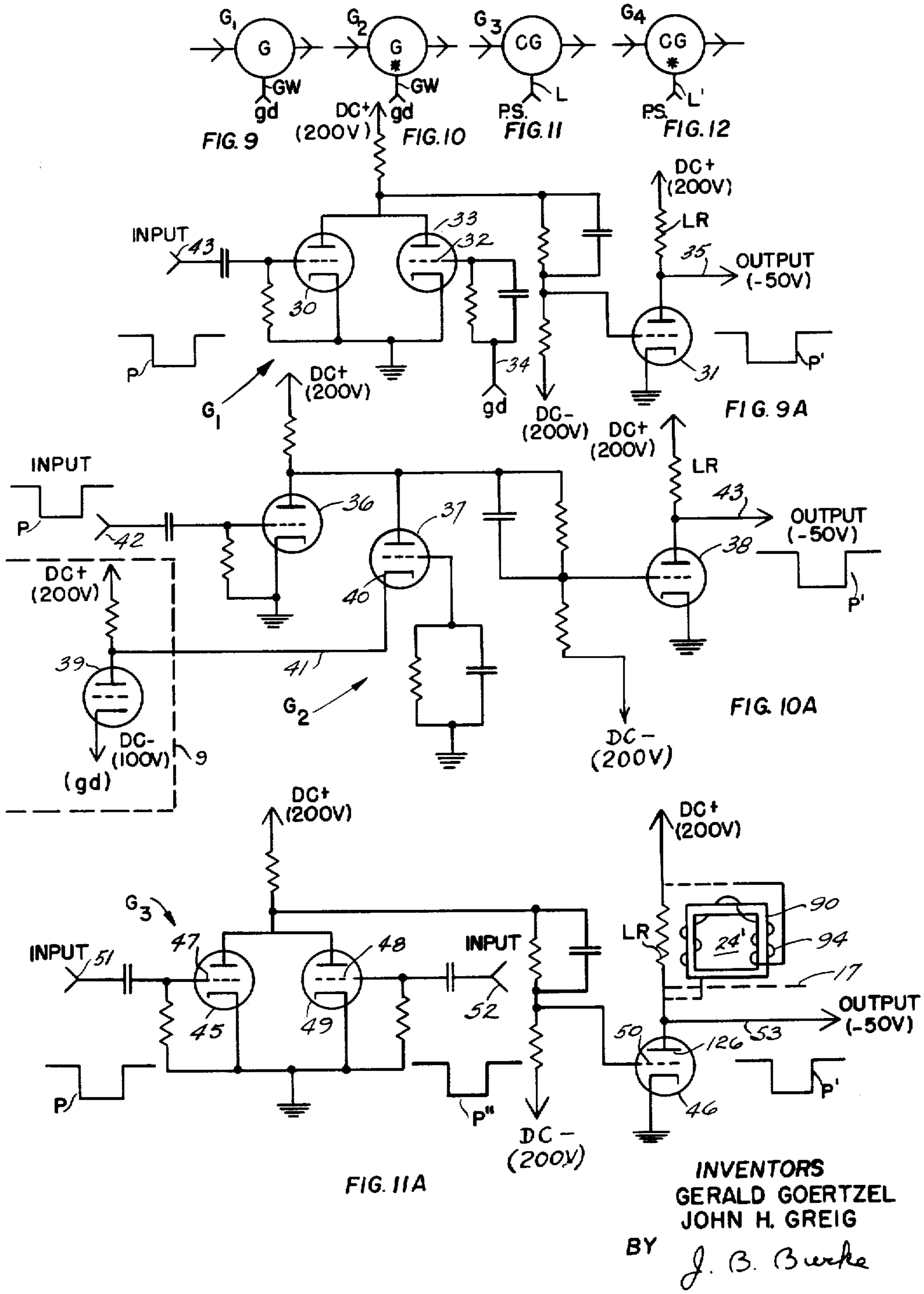

From the $r$ pulses obtained at the output of the output shaper 23 are derived pulses $s$ and $t$. The $s$ pulses are obtained on line 355 via a one digit delay circuit 372. This circuit is described in connection with FIG. 13. The $t$ pulses are obtained on line 354 from a one binary digit delay circuit 373 connected to the output of delay circuit 372. Thus from the $r$-pulses occurring at digit time $a_{-1}$ the $s$ and $t$ pulses are obtained at digit times $a_{-2}$ and $a_{-3}$ by one and two binary digit time delays respectively. Pulses $s$ and $t$ are obtained on line 353 from the joint output of gates 374 and 375 connected to the outputs of delay circuits 372 and 373. These gates are of type $G_1$ shown in FIGS. 9 and 9A. The $\alpha'$ pulses include all $\alpha$ pulses except $s$ and $t$ and are obtained on line 230 from gate 376. This gate is of type $G_4$ shown in FIGS. 12 and 12A. It receives amplified $\alpha$ pulses and is normally open except when closed at $s$ and $t$ times by pulses applied via wire 441 from line 353. The $\alpha'$ pulses are applied to gate 377 via wire 378. E— pulses are obtained from input shaper 370. Gate 377 is a type $G_3$ gate as shown in FIGS. 11 and 11A. It is a coincidence gate and passes E' pulses only when the $\alpha'$ and E— pulses are in coincidence. The E' pulses which pass gate 377 to the line 350 are negative spiked pulses.

Reference has been made above to gates and delay circuits used in the system which circuits will now be described.

In FIGS. 9, 10, 11 and 12 are shown the symbols which are used in the drawings to indicate the various types of gates. The circuit diagram for each gate is shown in corresponding FIGS. 9A, 10A, 11A, and 12A. In FIGS. 9 and 10 the symbol G represents a gate circuit which is called by application of a control signal from the gate decoder ($gd$) on gate wire GW. In FIGS. 11 and 12 the symbol CG represents a coincidence gate circuit which is called on wire L or L' from some pulse source P.S.

The gate circuits shown in FIGS. 9A–12A may employ twin input triodes followed by a low output impedance buffer amplifier. Negative input signals are applied to the grids of both the input triodes for coincidence to produce a logical AND and to one grid of one input triode and to the cathode of the other input triode for negation, i.e., logical AND-NOT. The output buffer amplifier prevents interaction between the gate tubes, i.e., logical OR. The gate circuits also perform pulse reshaping and noise clipping functions. Variations in connections permit DC or pulse operation and different operating speeds.

FIG. 9 represents a normally closed gate of type $G_1$ opened by a gate decoder wire GW. A preferred form of gate circuit for this type of gate is shown in FIG. 9A. This gate circuit includes a pair of triode tubes 30, 31 connected as direct coupled amplifiers. Gate decoder 9 is connected to grid 32 of triode tube 33 via gate wire 34. The gate is normally closed by the gate decoder's holding grid 32 positive so that tube 33 is heavily conducting. This prevents tube 30 from acting as an amplifier and no pulse can go through the gate. When the gate is called by the gate decoder by a negative DC voltage, tube 32 is cut off by the output of the gate decoder which drives and holds the grid 32 negative. This allows a negative pulse P applied to the input 43 to travel through the gate and appear as a negative pulse P' at the gate output 35.

FIG. 10 represents a normally open gate of type $G_2$ closed by a gate wire. A preferred form of gate circuit for this type of gate is shown in FIG. 10A. This gate circuit includes a pair of triodes 36, 38 connected as direct coupled amplifiers. The output of tube 39 in gate decoder 9 is connected to cathode 40 of triode 37 via gate wire 41. The gate is normally held open by the gate decoder's holding cathode 40 at a positive DC voltage cutting off tube 37 while tube 39 is not conducting so that negative pulses P travel via triode amplifiers 36 and 38 from the gate input 42 to the gate output 43 where they appear as negative pulses P'. When the gate is called by the gate decoder, tube 39 becomes conducting to drive and hold cathode 40 at a negative DC voltage. This causes tube 37 to become heavily conducting and the gate becomes closed because tube 36 is prevented from acting as an amplifier.

FIG. 11 represents a normally closed coincidence gate of type $G_3$ (logical AND) opened by a pulse on lead L. This type of gate is not called by the gate decoder. A preferred form for this type of gate is shown in FIG. 11A. This gate circuit includes the triodes 45, 46 connected as direct coupled amplifiers. Grid 47 of triode 45 is connected to gate input 51 and grid 48 of triode 49 is connected to gate input 52. This gate is used to produce a negative pulse P' at the gate output 53 when negative pulses P and P'' are impressed at both gate inputs 51 and 52. When either triode 45 or triode 49 is conducting, grid 50 of triode 46 is negative and triode 46 is cut off so that the gate output 53 is positive. When both grids 47 and 48 receive negative pulses P and P″ simultaneously, triodes 45 and 49 are cut off, and triode 46 is rendered conductive so that a negative pulse P′ appears at the gate output. Thus it is necessary that both grids 47 and 48 receive negative pulses in coincidence to produce a negative pulse P′ at the gate output 53. FIG. 12 represents a normally open gate of type $G_4$ closed by a pulse on lead L′. This type of gate is not called by the gate decoder. A preferred form for this type of gate is shown in FIG. 12A. This gate circuit includes the triodes 60 and 61 connected as amplifiers for negative pulses P at gate input 62. Triode 63 is normally cut off so that negative pulses P′ appear at gate output 64. When a negative pulse P″ is impressed at gate input 65, triode 63 is rendered conductive which prevents triode 60 from acting as an amplifier to pass pulses P. The diode 66 in the clamping circuit 67 allows the capacitor 68 to charge rapidly and holds the cathode 69 of triode 63 at ground potential.

In the above described gate circuits the triodes shown employ conventional heater circuits which are omitted from the figures to simplify the drawings. Grid biasing resistors, plate load resistors and by-pass capacitors and coupling capacitors are shown employed where appropriate and function in conventional manner. The above described gate circuits have been presented only as examples. Other gate circuits are known or may be devised by those skilled in the art to perform the same functions and may be substituted for the gate circuits described.

A one binary digit delay circuit is used in several components of the computer system. A preferred form of delay circuit which may be employed is shown in FIG. 13. This circuit is actually a one-half binary digit or one-half bit delay circuit but a one binary digit or one bit delay circuit may be formed by connecting two half bit delay circuits in cascade as will be explained. The delay circuit shown in FIG. 13 has an input terminal 70 to which negative signal pulses $P_N$ are applied. The signals are fed to grid 71 of triode 72 via input capacitor 73 which is in series with the input signal source. The cathode 74 of diode 75 is connected between capacitor 73 and grid 71. Plate 76 of the diode is held at a voltage A— which is negative with respect to ground. Positive timing pulses $P_T$ are continuously applied to terminal 77. These pulses are applied to grid 80 of triode 81 via coupling capacitor 82. The plate 83 of triode 81 is connected between capacitor 73 and grid 71. The potential of cathode 84 is held at a voltage A′— which is more negative than voltage A—. As the pulses $P_T$ are applied to grid 80, the triode 81 is rendered conductive only at the peaks of the positive timing pulses and is cut-off for the remainder of each cycle. When triode 81 conducts, it does so through diode 75. This pulls the grid 71 of output tube 72 down to A— volts to cut off the tube. When triode 81 cuts off again, the grid 71 remains at A— volts, being held there by input capacitor 73. When a negative signal pulse $P_N$ is applied to the input at terminal 70, the charge on capacitor 73 is changed through diode 75. The trailing edge of the pulse is positive going and must overcome the A— bias on tube 72 to turn on the tube 72. Thus the output of tube 72 is a negative going pulse $P'_N$ which begins at the trailing edge of the input pulse. The grid 71 floats at zero bias and the output remains negative until the next timing pulse $P_T$ when tube 72 is cut-off again. As shown in FIG. 14 the input pulse $P_N$ has been given a half bit delay with respect to the timing pulse $P_T$. Its trailing edge has been retimed. Pulses too small to overcome the bias A— have not been transmitted and the output pulse has been standardized in amplitude.

The delay circuit described is thus a half bit delay, a noise clipper, and pulse reshaper, with auxiliary timing pulses used to determine the timing and width of output pulses. If a full bit or one full binary digit delay is required, two circuits as shown in FIG. 13 may be connected in cascade with output terminal 85 of one circuit connected to input terminal 70 of the other with positive timing pulses being applied to terminal 77 of both circuits and negative pulses $P_N$ being applied to terminal 70 of the first delay circuit. The timing pulses will be derived from a basic timing track to be described impressed with square wave pulses. These square wave pulses are differentiated to produce sharp pulses at the leading and trailing edge of each pulse. The leading or beginning pulses will be applied to terminal 77 of the first half bit delay circuit and the trailing or ending pulse will be applied to terminal 77 of the succeeding half bit delay circuit. The one bit delay circuit thus formed will produce output pulses $P'_N$ which are delayed one full bit-time. The leading and trailing edges of pulse $P_N$ will be retimed. Amplitude and rise time will be standardized and noise pulses below clipping level will be removed.

Each gate circuit and delay circuit terminates in an amplifier tube. This output amplifier serves as a logical OR. The outputs of several delay circuits and/or gate circuits are tied together in the *a*-register, *b*-register and other units. When all the plates of the output amplifier tubes are tied together, only one of the load resistors LR is used as a common plate load resistor. This forms a buffer or logical OR circuit since when any amplifier tube conducts it will swing the output voltage over its permissible range.

Each recirculating track 17, as shown in FIG. 2, includes two heads H′ disposed a predetermined distance apart along the track. In FIG. 15 head 24 is shown in association with an amplifier 27 and an output shaper 23 which together constitutes a read unit in the same manner as described for the fixed pulse tracks 22. Head 24′ in association with a gate circuit 29 constitutes a *write unit* for writing binary *ones* digits. The gate is of type $G_3$ as shown in FIGS. 11 and 11A. In FIG. 11A is shown how the gate circuit is adapted for use in a write unit by substituting the coil connection shown in dotted lines for the plate load resistor LR. Coil 94 wound on core member 90 is connected as a plate load between plate 126 of triode 46 and the DC+ potential. The core 90 is disposed in alignment with track 17. In operation negative timing pulses (E′) will be applied to input terminal 52 while negative information pulses are applied at terminal 51. This write unit will write binary *ones*. A permanent magnet M as shown in FIGS. 2 and 15 is provided to write *zeros* or continually erase pulses from track 17. The spacing 17′ of heads 24, 24′ along track 17 is set at 42½ bits or binary digit time spaces as shown in FIG. 15. This spacing obtains for each recirculating track 17 used with each of the registers. The output shaper 23 causes a delay between writing input and reading output of one-half bit or one-half binary digit time when E+ pulses are used for timing as explained above, thus the write and read pulses are brought into proper phase being now 43 bits apart.

The memory unit determines whether to read from or write in the memory tracks 18. It also determines whether to write 0 or 1 in a particular digit space. The memory unit as shown in FIG. 2 includes the memory tracks 18 each of which is provided with an H type read-write head 26. This head is used to write 0, write 1 and read both 0 and 1 from a memory track. An individual read-write amplifier 309 is connected to each head 26 and together therewith may be regarded as constituting a read-write unit shown schematically in FIG. 16. The head 26 as shown in FIG. 16 may include the ferromagnetic core member 90 with air gaps 91, 92 arranged as in head type H. The plane of the head is aligned with magnetic track 18. Coil 94 is wound on both sections of the core and has a center tap 95 which is connected to corresponding center taps of all other memory track heads. The coil 94 is connected to the writing amplifier triodes 99 and 100 and the reading amplifier triode 106. A positive potential of V+ volts is applied to the cathodes of triodes 99 and 100. This potential is derived from a suitable DC source via resistor 111. A thyrite non-linear resistor element 112 is connected across cathode resistor 113 between the cathodes and ground and serves as a voltage regulating element. The grid 105 of reading amplifier tube 106 is connected to coil 94. The read output is taken off cathode 114. Positive plate voltage is applied via a decoupling R–C circuit consisting of resistor 115 and capacitor 116. The write signals are applied at input terminals 96 and 97 via lines 310, 311 from the write 0, write 1 unit 313 as shown in FIG. 2. The write-0 signal is applied to grid 104 via coupling capacitor 102 and the write-1 signal is applied to grid 103 via capacitor 101. The grids 103, 104 and 105 are connected to the head decoder via resistors 108, 109, 110 and wire 107. The positive plate voltage for triodes 99 and 100 is obtained from a suitable DC source via a decoupling L–C filter consisting of inductor 117 and capacitor 118, switch 139 and wire 138. Switch 139 may be located at the control panel 5. Resistor 119 is a protective resistor. The Write signals are available to all write amplifier inputs 96, 97 simultaneously. All heads read continually and apply those signals to grid 105. Those read-write units which are not required to read or write are prevented from so doing by application of negative DC bias potential of at least V− volts from the head decoder 25 to cut off triodes 99, 100 and 106. That read-write unit which is required to read or write is enabled to do so by application of ground potential to the grids of triodes 99, 100 and 106 from the head decoder via conductor 107 and resistors 108, 109, 110 respectively. The Read output is obtained on line 326 from the cathode of tube 106.

Referring now to FIG. 2, the read output of each read-write amplifier is delivered to an output shaper circuit 307 via amplifier 327. The output shaper circuit may be of the same type as shown in FIG. 3. This circuit receives the amplified Read pulses and shapes them to provide steep trailing edges. These pulses are passed to a one-half bit delay circuit 308. The delay circuit may be of the same type as shown in FIG. 13. From the delay circuit the Read signals are sent to the order storage unit and *b*-register via lines 271 and 143. The one-half bit delay circuit is required to restore proper phase between write and read pulses. FIG. 17 is a pulse diagram showing how this rephasing is done. The curve 17A shows a write-1 pulse as applied to the memory unit. The pulse is written in the memory track at E time, i.e., the trailing edge of the negative going write-1 pulse as shown by curve 17B. Curve 17C shows the pulse shape as it appears at the output of amplifier 327 and is applied to the output shaper 307. The curve is substantially one cycle of a sine wave. The negative pulse 17D derived from the output shaper is delayed one-half bit with respect to the positive half of the pulse in curve 17C. Curve 17E shows the pulse as obtained at the output of delay circuit 308. This pulse is delayed a full bit and restored to phase with a write 1 pulse of curve 17A. Curve 17F represents the B+ pulses which are used as the positive timing pulses in the output shaper. Curve 17G shows the E− timing pulses as applied to the write 0, write 1 unit 313 shown in FIG. 2. Curve 17H shows the E+ timing pulse applied to delay circuit 308. Since the pulse was written in the memory at E time as shown in FIG. 17A and B+ pulses are used as timing pulses the pulse leaving the output shaper has been delayed one-half bit in the writing-reading reshaping circuits. To bring the pulse back in proper phase the additional half bit delay 308 follows the output shaper 307. The information is also written one full bit early in the memory to compensate for the full one bit delay and bring the pulse back into proper time for application to the *br* and *os* units.

Referring now to FIG. 2, there are shown the three memory triple coincidence circuits 304, 305, 306 constituting the write 0, write 1 unit 313. The circuit arrangement for this unit is shown in FIG. 18. The unit 313 has inputs 321, 322, 323. To input 323 are applied α pulses over line 274 via gate *me1* or early address pulses (*eap*) over line 273 via gate *me2*. To input 322 E− pulses are applied continuously, and to input 321 pulses are applied from the *b*-register over line 148 via gate 300 or from the base code (*bc*) pulse source over line 272 via gate 301. Lines 312, 338 shown in FIG. 2 are connected to a two position switch 972 at the control panel. In one position of the switch the base code is written into a memory track via gate 301 and in the other position the contents of the *b*-register will be written via gate 300. If α pulses are applied to the memory writing will be done at all digit times. If address pulses enter through gate *me2* only address digits will be written in the memory tracks 18. The address (*eap*) or α pulses activate the writing units, and no writing may be done if these pulses are absent. The E− pulses are the differentiated trailing edges of the α pulses. These pulses start the writing cycle if an activation pulse is present. The contents of the memory are thus kept in coincidence with the pulses on the α track. What is written depends on the input through gate 300 or gate 301. Input 323 therefore determines whether to write or not; input 322 determines when to write; and input 321 determines what is written (i.e., 0 or 1). If a pulse appears at outputs 310 and 311 of the unit 313 positive pulses at E time are applied to the read-write amplifiers 309 to write binary *one* in the memory. If a pulse appears at output 311 only, positive pulses at E time appear to write binary *zero* in the memory.

In FIG. 18 is shown the circuit arrangement for the write 0, write 1 unit which will now be described. The MTC–1 circuit 304 provides a triple coincidence between:

(*a*) The information to be written in the memory (the contents of the *b*-register or the base code).
(*b*) The part of the word to be written (the address only or the entire word).
(*c*) The proper time to write (E time).

The MTC–1 circuit provides a negative pulse output on line 425 if a 1 is to be written, or a negative pulse output on line 426 if a 0 is to be written. There is no output on either line when nothing is to be written.

The coincidence circuit 304 includes double triodes 427, 428, 429. To grids 430, 431 of tube 427 are applied negative α or *eap* and E pulses. Pulses from the *b*-register or base code source are applied to grid 435 of tube 428. A non-linear resistor 432 of thyrite is connected to the circuit of cathodes 433, 434. This resistor tends to keep a constant voltage across its terminals. Normally both sections of tube 427 and one section of tube 428 including plate 436 and cathode 437 are conductive. The output is kept substantially constant by the resistor 432. When negative pulses are applied to grids 430 and 435, the tube sections are cut-off and the output on line 425 drops slightly because the thyrite is not a perfect voltage controller. When the tube section including cathode 434 and plate 438 is cut-off by the negative E pulses applied to grid 431 no current flows through resistor 432 and the output voltage on line 425 falls to zero. The output on line 425, as shown by the shape of the output pulse 439 is a deep narrow negative pulse of about 18 volts superimposed on a small pedestal 439' of about 2 volts. The non-linear resistor 441 acts in a similar manner for the output of both sections of tube 429 and the output of the section of tube 428 including cathode 442 and plate 443, so that the *write* 0 output appearing on line 426 is also a steep negative pulse on a small negative pedestal. It will be noted that the or *eap* pulses are applied to both grids 430 and 444. E− pulses are applied to both grids 431 and 445. The pulses of *br* or *bc* are applied to grids 435 and grid 446. The input to grid 446 is taken via plate 436. The section of tube 428 including cathode 437 and plate 436 acts as an inverter in providing the *write* 0 signal.

The memory triple coincidence circuits 305, also designated MTC–2, follows circuit 304. This circuit limits the amplitude of the output pulses from circuit 304 and removes the pulse pedestals 439′. The circuit includes tubes 450, 451, and 452. Tubes 450 and 451 are preferably pentodes. The usual suppressor grids which are connected internally to the cathodes 453, 454 are not shown. Tube 452 is a double triode. The write-1 output 425 of circuit 304 is connected to the input of tube 450 at grid 455. The output of tube 450 is taken from plate 456 and applied to grid 457 of tube 452. The tube 450 limits the amplitude of its output by swinging between cutoff and saturation limiting, also known as plate bottoming; plate bottoming being the limiting characteristic of the tube which results when the plate voltage has gone as low as it can and yet leave some tube voltage to supply the tube current. The plate bottoming removes the pedestal from the pulse 439. The write-1 output is taken from cathode 458 and passed to circuit 306 via line 459. Note the shape of pulse 460 with amplitude limited and pedestal removed. The write-0 pulse obtained on line 426 from circuit 304 is fed to grid 461 of tube 451. This pulse is also limited in amplitude and its pedestal is removed by tube 451. The write-0 pulse is taken from cathode 462 of tube 452 and passed to circuit 306 via line 463. It should be noted that the low interelectrode capacitances of the tubes 450, 451 provide in effect electrostatic shielding for the Write signals against noise and parasitic signals which could otherwise pass through the gate circuits of the memory, the write-0, write-1 unit, and the read-write units, to be then amplified by the high gain read amplifier 327.

The memory triple coincidence circuit 306, also designated MTC–3, follows circuit 305. This circuit is a cathode follower amplifier. Triodes 464, 465 may be included in a single envelope. Triodes 466 and 467 may also be included in a single envelope. Triode 464 is connected in parallel with triode 465 and triode 466 is connected in parallel with triode 467. Each pair of triodes must have a low output impedance of one or two hundred ohms because it is used to drive the grids of the write tubes 99, 100 in the read-write amplifiers well positive. The write-1 input is applied to grids 468, 469 connected together and the write-1 output is taken from cathodes 470, 471 and applied via line 310 to grids 103 of the write-1 tubes 99, shown in FIG. 16. The write-0 input is applied to grids 472, 473 connected together and the write-0 output is taken from cathodes 474, 475 and applied via line 311 to the grids 104 of the write-0 tubes 100 in the read-write amplifiers.

The operating registers of the arithmetic unit include the accumulator register 6, also designated herein as *a*-register and *ar*, the quotient register 7, also designated *q*-register and *qr*, and the keyboard register 8, also designated *b*-register and *br*.

The *a*-register corresponds to the accumulator on a desk calculator. It is here that the results of the arithmetic operations except division appear. The *a*-register is also used to store a word which is to be printed by the output device such as a typewriter or the like.

The *q*-register corresponds to the register on a desk calculator. The quotient of a division operation appears here and the multiplier in a multiplication operation is stored here. Numbers which come into the computer from an input device such as a typewriter or tape reader enter by way of the *q*-register.

The *b*-register corresponds to the keyboard of a desk calculator in the sense that the numbers to be added into the accumulator are brought from the memory to this register and are then sent to the accumulator. The multiplicand in a multiplication operation is also placed here. Likewise numbers from the *a*-register and *q*-register which are to be stored in the memory are first brought to the *b*-register.

These three registers all employ individual recirculating tracks 17 located on the same drum. In the recirculating tracks information in any of these registers at a particular word interval is rewritten in the next word interval provided no gates are called to change the contents of the particular register.

FIG. 19 shows a diagram of the *b*-register with its associated recirculating track 17. Four gates *br*2, *br*3, *br*4 and *br*5 are provided of type $G_1$ as shown in FIG. 9A. Gate *br*1 is of type $G_2$ as shown in FIG. 10A. A read unit 135 and a write unit 136 as discussed in connection with FIG. 15 are disposed along magnetic track 17. The write unit writes binary *ones* and the permanent magnet (M) 130 writes binary *zeros*. The direction of motion of the drum carrying the track 17 is as shown by arrow 158. A one binary digit (one bit) delay circuit 140 as shown in FIG. 8, is connected to the read unit 135. The input to the *b*-register is derived from the *a*-register 6, *q*-register 7, memory unit 10, order storage unit 15, and fixed time pulse source (*fcp*) 13 over gate wires 141, 142, 143, 144 and 145 respectively. Each of the pulse sources is shown in block form in FIG. 1 and is described below. The pulse sources actuate the write unit 136 via the several gates which are opened and closed by pulses from the gate decoder 9. The output of the read unit 135 is delivered directly to the memory over line 148 before the one binary digit delay 140. The output is also directed to the order storage, *q*-register and sign unit after the one binary digit delay over lines 149, 150 and 151. Conductor 147 is connected from the common output of gates *br*1–*br*5 to the sign unit. The output of read head is spaced 43 binary digit times from the input to the write head instead of 44 digits which comprise a whole word space as shown in FIG. 15. A delay of one binary digit time provided by delay circuit 140 is placed between the heads to correct for this in normal operation. If this delay circuit is short-circuited, a right shift of one binary digit occurs, that is, a pulse at digit time $a_{39}$ will be rewritten at digit time $a_{40}$, $a_{38}$ will be rewritten at $a_{39}$, etc. A pulse at digit time $a_{-1}$ will be rewritten as 0 regardless of what it is unless provision is made to do otherwise. A pulse at digit time $a_{40}$ will not be rewritten at all since it would occur at *t*-time and writing at *s*-time or *t*-time is not permitted. Likewise if an extra one binary digit delay is placed between the two heads, a left shift of one binary digit occurs. A pulse at digit time $a_{40}$ is then rewritten at $a_{39}$, $a_{39}$ is rewritten at $a_{38}$, etc. A zero is written at digit time $a_{40}$ and a pulse at digit time $a_{-1}$ is not rewritten at all.

As was noted above, the input to the memory must occur one binary digit or one full bit early. As is seen from FIG. 19 the output to the memory is taken before the one bit delay 140. It is therefore written one binary digit early in the memory. When it is read from the memory it is again at normal time because of the one binary digit delay in writing into and reading from the memory.

In FIG. 20 is shown a diagram of the *a*-register. This component includes the add unit 180 which performs arithmetic operations in the computer system. The arrangement of the add unit is described in connection with FIG. 21. The add unit has three inputs 181, 182, 183 and two outputs 184, 185. The sign unit is connected to input 183. The gates *ar*1, *ar*2, *ar*3 and *ar*4 are connected to input 182. Gate *ar*5 is connected to input 183. Gates 165, 166 are connected to the inputs of gates *ar*3, *ar*6. A one bit delay circuit 172 is connected between read unit 175 and gate 165 and *ar*1. A further one bit delay circuit 173 is provided before gates *ar*4, *ar*5. A one bit delay circuit 170 is disposed between gate *ar*6 and input 181 of the add unit. The one bit delay circuit 171 is connected between output 184 of the add unit and the *a*-register outputs 186, 187, 188 to the transfer unit (*tu*), step counter unit (*st*), and sign unit (*si*). The write unit 176 is connected to output 184 of the add unit. The read and write units are arranged in the same manner as shown in FIG. 15 with respect to track 17. The *a*-register connections 189 and 141 to the quotient and *b*-registers are derived from the add unit output 184. It will be noted that *r* and *t* pulses derived from the fixed pulse source (*fcp*) are applied to gates 165 and 166. Detailed circuit diagrams appear herein for each of the read, write and add units, delay circuits and gates.

In operation of the *a*-register, the augend, addend and the carry from a previous addition are supplied to the inputs 182, 183 and 181 respectively of the add unit as shown best in FIG. 21. The sum which is written by write unit 176 and the carry are derived from the outputs 184 and 185. In the add unit:

(1) If 0's come in on all three inputs 181, 182 and 183 a 0 is sent to both the write lead 184 and the carry lead 185 (0+0+0=0, carry 0).

(2) If a 1 comes in on any add unit input with 0's on the other two inputs then a 1 is sent to the write lead 184 and a 0 to the carry lead 185 (1+0+0=1, carry 0).

(3) If 1's come in on any two of the inputs with a zero on the third, a 0 is sent to the write lead and a 1 to the carry lead (1+1+0=0, carry 1).

(4) If 1's come in on all three inputs, a 1 is sent to both the write lead and the carry lead (1+1+1=1, carry 1).

It should be noted that addition is done serially—that is, one digit at a time as the numbers are read from their respective memory tracks, the least significant digit first. Suppose that it is desired to add the number in the *b*-register to a number which is already in the *a*-register. The number from the *b*-register comes to the add unit input 183 through the sign unit while that from the *a*-register gates comes to input 182. Suppose digit $a_{40}$ in both (*ar*) and (*br*) is 1. Then the write lead has a zero on it and digit $a_{40}$ in the sum is written as 0. The carry lead has a 1 on it at $a_{40}$ time which is sent through the one digit delay 170 and arrives at the input 181 at $a_{39}$ time. If digit $a_{39}$ in both (*ar*) and (*br*) is 1 then there is a 1 at each of the add unit inputs at $a_{39}$ time. A 1 is written in the sum as $a_{39}$ and 1 is carried to $a_{38}$ time, etc. This process continues for the whole word time, and the sum of the two numbers has been written in the recirculating track of (*ar*). The symbols (*ar*) and (*br*) are to be read as *contents of the a-register* and *contents of the b-register* respectively.

Gate *ar*2 is used to obtain a right shift of the number in (*ar*). If gate *ar*2 is opened and gate *ar*1 closed, the one bit delay is eliminated and $a_{39}$ is written as $a_{40}$, $a_{38}$ as $a_{39}$, etc. It should be noted that a right shift of the number in (*ar*) by one binary digit corresponds to dividing the number by two. Gate *ar*1 must be closed during this operation. If gate *ar*3 is called at the same time as gate *ar*2, the sign digit $a_{-1}$ which is written down through gate *ar*2 as $a_0$ is in coincidence with *r* pulses and is written down again at $a_{-1}$ time to produce ½ of a negative number correctly.

If gate *ar*4 is opened and gate *ar*1 closed, the number in (*ar*) goes through an extra one digit delay and is therefore shifted to the left one digit. This corresponds to multiplying the number in (*ar*) by two. Similarly, if gate *ar*5 is opened, a left shift of one digit occurs. No provision is made for a right or left shift in the *b*-register.

Note that the output from gate *ar*5 goes to input 183 of the add unit while that from gate *ar*4 goes to input 182. Therefore if both gates *ar*4 and *ar*5 are open, the number in (*ar*) is multiplied by 4 ($2A+2A=4A$). Likewise, if gates *ar*2, *ar*3, *ar*5 are opened, the number in (*ar*) is multiplied by 2.5 i.e., ($2A+.5A=2.5A$). These operations are used in the conversion of a binary number to the equivalent decimal number in the present system.

As was noted above when the complement of a number is to be added into the *a*-register, it is necessary to add an extra binary one digit at $a_{40}$ time. Complements are taken in the sign unit and the extra binary one digit from the sign unit. The complement digit, comes in at *t*-time via conductor 179. This digit goes into the add unit at input 181 after being delayed one bit time in delay circuit 170 to bring it to $a_{40}$ time.

When two forty binary digit numbers are multiplied, the product is an eighty binary digit number. In the present computer system it is possible to obtain the product as the complete eighty binary digit number or as a number which is rounded off to forty digits. If the eighty digit product is desired, it appears with the least significant forty binary digits in the *q*-register and the most significant forty binary digits in (*ar*). Round-off is accomplished by adding the most significant binary digit in the *q*-register to the least significant place in (*ar*).

In FIG. 21 is shown the arrangement of the add unit. The add unit includes a plurality of coincidence gates. Gates 251, 253, and 255 are cross connected as shown between add unit inputs 182 and 183. Gates 252, 254 and 256 are cross connected as shown between the carry in input 181 and the output of gates 253, 255. The sum to write is derived via lead 184 from the outputs of gates 254, 256. The new carry output via lead 185 is derived from the outputs of gates 251, and 252.

The add unit performs binary digit addition only. To see how the add unit does this, the pulses may be followed through it thusly:

(A) 1 on input 182, 0's on inputs 181, 183.

The pulse on input 182 goes through gates 253 and 254 to the write unit 176 in the *a*-register. These gates are open since no pulses are on inputs 181 or 183 to close them. The pulse from gate 253 does not go through gate 252 to the carry lead since a pulse on input 181 is necessary to open this gate. (0+1+0)=1, carry 0.

(B) 1 on input 183, 0's on the inputs 181, 182.

This pulse goes through gates 255, and 254 to the write lead 184. Again gate 252 is closed due to the absence of a pulse on input 181. (0+0+1)=1, carry 0.

(C) 1 on input 181, 0's on inputs 182, 183.

The pulse on input 181 goes through gate 256 to the write unit 176. (1+0+0)=1, carry 0.

(D) 1's on inputs 181 and 182, 0 on input 183.

The pulse on input 182 goes through gate 253 then through gate 252 to the carry lead 185. Gate 252 is opened and gate 254 closed by the pulse on input 181. The pulse on input 181 does not go through gate 256 because the pulse which comes through input 182 closes gate 256. (1+1+0)=0, carry 1.

(E) 1's on inputs 181 and 183, 0 on input 182.

The pulse on input 183 goes through gate 255 (open since no pulse on input 182) and through gate 252 (open due to pulse on input 181) to the carry lead 185. The path from input 183 through gate 251 to the carry lead is not open due to the lack of a pulse on input 182. The pulse on input 181 is prevented from going to the write lead 184 by gate 256, closed due to pulse out of gate 255. Gate 254 is closed by the pulse on input 181. (1+0+1)=0, carry 1.

(F) 1's on inputs 182 and 183, 0 on input 181.

The pulse on input 182 closes gate 255, so input 183 does not go through. The pulse on 183 closes gate 253, so input 182 does not go through. The only open path is that through gate 251 (opened by pulse on input 182) to the carry lead 185. (0+1+1)=0, carry 1.

(G) 1's on all three inputs 181, 182, 183.

The pulse on input 183 goes through gate 251 (opened by input 182) to the carry lead 185. Gates 253 and 255 are closed by inputs 183, 182 respectively. Gate 256 is therefore open. Input 181 goes through gate 256 to the write lead 184. (1+1+1)=1, carry 1.

(H) 0's on all three inputs 181, 182, 183. No pulses out. (0+0+0)=0, carry 0.

FIG. 22 is a diagram of the *q*-register unit. The three gates *qr2a, qr2b* and *qr2c* are arranged so that all three gates open together when called by the gate decoder. These gates are used in a multiplication order described below. The write unit 200 is connected to the outputs of gates *qr1, qr2a, qr3, qr4* and *qr5*. These outputs are also connected in common to the *b*-register via line 142. The output of gate *qr2c* is connected to the sign unit via line 232. A one digit delay circuit 204 is disposed between read unit 199 and gate *qr1*. The read and write units are arranged in the same manner as shown in FIG. 15 with respect to track 17. A one bit delay 202 is provided between the transfer unit and gate *qr4*. A one bit delay 203 is provided between the sign unit and gate *qr3*. The *b*-register is connected to gate *qr5* via line 150 and the *a*-register to gate 198 via line 189. The transfer unit line 209 is connected between delay circuits 202 and 203. Gate 198 is pulsed at *t*-time via lead 205. A forty-two binary digit delay circuit 201 is disposed between the output of gate *qr2b* and the write unit 200. This circuit includes a single bit storage flip-flop circuit 240 as shown in FIG. 24 connected to gate *qr2b* via lead 206. The gate 241 is connected to input lead 242 of the flip-flop. An *r* pulse from *fcp* provides a *set-to*-0 pulse for the flip-flop. Lead 243 from the flip-flop is connected to the gate input and lead 244 from the gate goes to the write unit 200. The forty-two digit delay is required to store a binary digit from *t*-time when the digit comes from the *a*-register until *r*-time when the digit is written down in the *q*-register. The pulse that comes from the *a*-register at *t*-time sets the flip-flop circuit 240 to *one* via conductor 206. This flip-flop opens gate 241 directly when it is set to *one*, and an *r*-pulse passes through this gate and is written down in the *q*-register. The flip-flop is reset to zero by the back edge of every *r*-pulse, so one pulse out at *r*-time is obtained for each pulse in at *t*-time. The write unit 200 consists of a write head and writing gate, and the read unit includes a read head and amplifier as described above. Circuit diagrams for all gate circuits and the one binary digit (one bit) delay circuits appear herein.

The *q*-register is used in the division operation of the computer system explained below. The quotient of a division operation appears here as does the multiplier and least significant forty binary digits in a multiplication. In addition to the *a*-, *b*-, and *q*-register units shown in FIG. 1, the arithmetic unit includes the sign unit 28. A diagram of the sign unit is shown in FIG. 23. This unit serves to take the complement of a number to be subtracted on its way from (*br*) to (*ar*). It will be noted that the present system subtracts by adding the complement as pointed out above. The sign unit includes the add, don't add box 220, the complement, don't complement box 221, the judgment box 219, associated gates and the one bit delay circuit 218. The gates and delay circuit are of types which have previously been described. The *a*-register input is applied via lead 188 to gates 267 and 269 in the judgment box. Gates 216 and *si5* are pulsed at *t*-time via leads 222, 223. The *b*-register is connected to the one digit delay 217 in the judgment box, the output of which is connected to gates 266, 268. The fixed pulse source applies timing *s* pulses via leads 247 and 226 to gates 266, 268, to gate *si1* and to flip-flop 236. The output of gates *si1, si2, si3a, si4* are connected via the one bit delay circuit 218 to *ar, qr* and *tu* via leads 179, 230, 239.

The add-don't add box 220 consists of a single bit storage flip-flop circuit 236 as shown in FIG. 24 and a gate 235. A pulse at *t*-time sets the box to add by setting the flip-flop 236 to zero. The flip-flop opens the gate when it is set to zero, and the number from the *b*-register can then pass through the gate 235 until *s*-time when the gate is closed again. The flip-flop is reset to one by *s*-pulses, so a single pulse at *t*-time opens the gate for one and only one word time (*t*-time to *s*-time).

The complement, don't complement box 221 consists of a single bit storage flip-flop circuit 263 and three coincidence gates 260, 261, 262. The flip-flop is reset to 1 by *s* pulses at the end of each word time. When the flip-flop is set to 1, it opens a gate which allows pulses from the add, don't add box to pass to the add unit in the *a*-register via lead 183 without modification. When a pulse sets the flip-flop 263 to zero the box is set to complement, and gate 261 is opened to pass the complement of the number to the add unit, and the gate which passes the unmodified number is closed.

The complement is obtained by the normally open pulse gate 260 which passes timing pulses $\alpha'$ (all except *s* and *t*). A pulse which corresponds to a binary 1 in the number closes this gate so the output corresponds to a 0 (no pulse). A zero in the number (no pulse) does not close the gate, so a pulse comes out. Thus all 1's are changed to 0's and 0's to 1's.

The judgment box 219 consists of the four coincidence gates 266, 267, 268, 269 and a one bit delay circuit 217. A signal to complement, if the number in the *b*-register is greater than or equal to zero, is obtained by means of the normally open pulse gate 266 which passes *s* pulses unless a sign digit pulse from (*br*) closes the gate. A signal to complement, if the number in (*br*) is negative, is obtained by coincidence gate 268 providing an output pulse if the sign pulse from (*br*) delayed one binary digit time by delay circuit 217 opens the gate to pass an *s* pulse.

A signal to complement, if the *a*-register and *b*-register have the same sign, is obtained by two more gates 267, 269. A normally open pulse gate 267 passes the pulse indicating that the number in (*br*) is zero or positive, unless a sign pulse from the *a*-register closes the gate. A normally closed gate 269 passes the pulse indicating that the number in (*br*) is negative only if a sign pulse from (*ar*) opens the gate. The outputs of these two gates are connected together to the input of gate *si4*. Every word time i.e., each *s* pulse sets the add, don't add box to *don't add* and the complement box to *don't complement*. If gate *si5* is open on the next word time, a *t* pulse sets the add, don't add box to *add;* Likewise if there is an output from (*qr*) at *t*-time (through gates *qr2c* and 216), the add, don't add box is set to *add*. If the complement box is not changed, the *number* from (*br*) is added into (*ar*). If however, gate *si1* is open, an *s* pulse through this gate sets the complement box to *complement* at *t*-time after passing through a one bit delay. This also goes to (*ar*) where it is delayed and added to the memory at digit time $a_{40}$ through the carry channel. In this case the *complement of the number* in (*br*) is added into (*ar*), or the number in (*br*) is subtracted from that in (*ar*).

If it is desired to add or subtract the absolute value of the number in (*br*) to or from (*ar*), then the computer system is required to make a judgment. To add the absolute value of a positive number, the *number* is added; but if the number is negative, its complement must be added. This judgment is made by the judgment box 219. In this case gate *si3a* is opened and if the number in (*br*) is negative, a pulse goes through this gate at *s*-time. Similar judgments may be made for subtraction of the absolute value of a number with gate *si2*. Gate *si4* is used in the division operation to be described below. The judgment box signals to the complement box to complement at *s*-time if:

(*br*)$\geq$0
Sign of (*br*) is the same as (*ar*)
(*br*)<0

The pulse which sets the complement box to complement is also used as the extra one which must be added to numbers which are complemented. The output from the sign unit to the *a*-register via lead 179 is for this purpose. The output 239 to the transfer unit is used to mark a negative sign in front of a decimal number. The output 230 to the *q*-register is used in the division order.

Flip-flop circuits are used in computer systems as single bit storage devices. A simplified form of flip-flop for use in the present system is a bistable multivibrator applicable in a shift register or binary counter or as a static storage element and is shown in FIG. 24. In this circuit input terminals 275 and 276 are connected to trigger tubes 277 and 278 via capacitors 296 and 297. One output 280 (+1, −0) is obtained from the cathode 281 of cathode follower tube 283. Another output 279 (−1, +0) is obtained from cathode 298 of cathode follower tube 282. The trigger tubes act as inverter amplifiers and decouplers. The outputs of tubes 277, 278 are applied from plates 277A, 285 to the grids of tubes 283 and 282. Multivibrator tubes 289 and 288 have their grids 291, 290 connected to cathodes 281, 298 via resistors 344, 345. The cathode followers are thus disposed in the feedback loops between the input tubes 277, 278 and the multivibrator tubes. A negative DC voltage is applied to terminal 286. This voltage will generally be less negative than the negative DC voltage applied to terminal 284. A positive DC voltage is applied via terminal 314 to the plates of the several tubes. The flip-flop circuit is considered set to *one* when the output at terminal 279 has a predetermined negative voltage (about −40 volts) and the output at terminal 280 has a predetermined or corresponding positive voltage (about +40 volts). The flip-flop is considered set to *zero* with the voltages reversed at the outputs with terminal 279 having the positive voltage (+40 volts) and terminal 280 having the negative voltage (−40 volts). A neon lamp 299 in series with resistor 319 and located at the control panel is provided to light up when the flip-flop is set to *one*. This flip-flop circuit is used in the *q*-register, sign unit, breakpoint circuit in the order storage unit, and elsewhere in the system as a single bit static storage device. The flip-flop is required to store one bit of information for a time and may be required to hold a gate open or closed during this time. The flip-flop may be set to 1 by applying a signal or timing pulse to terminal 276 with terminal 292 connected to ground or a positive voltage supply depending on the rate of rise of the back edge of the pulse. A signal or timing pulse applied to terminal 275 with terminal 293 connected to ground or a positive voltage supply will set the flip-flop to 0. If manual operation of the flip-flop is required momentary grounding of terminal 295 by touching the terminal by hand or otherwise will set the flip-flop to 1 and momentary grounding of terminal 294 will set the flip-flop to 0. The breakpoint flip-flop 519 in FIG. 28 may be manually set in this way. If a steep negative pulse (about −70 volts or more) such as obtainable from the gate decoder in shift register operation is applied to terminal 276 while terminal 292 is connected to the same positive DC voltage source (+200 volts) as terminal 314, the flip-flop will be set to 1 with a delay of the order of two or three microseconds.

In FIG. 25 is shown the manner in which the flip-flop circuit of FIG. 24 is adapted for use in a shift register. An input shaper circuit such as shown in FIG. 7 provides shift pulses in the form of positive spikes at B time. These pulses are applied to terminal 275 of the flip-flop circuit. Terminal 293 is connected to a negative grid bias voltage. The flip-flop is otherwise arranged as shown in FIG. 24. Negative information pulses are applied to terminal 276. Terminal 292 is returned to ground. The trailing edge of the information pulse is positive going and this sets the flip-flop. This pulse is sufficiently wide so that its trailing edge which does the setting does not interfere with the shift pulses. If the information pulse should be deteriorated in shape because of capacitance in the conductors to the flip-flop, terminal 292 may be connected to the same positive DC voltage (+200 volts) as terminal 314. This gives a sharper trailing edge to the information pulse but the flip-flop will not operate on lower amplitude information pulses. For interstage coupling such as is required in the address and order shift registers output terminal 280 of one flip-flop is connected to input terminal 276 of the next flip. Terminal 292 is connected to the positive DC voltage supply (+200 volts). The output on terminal 280 is a negative going pulse at the shift time if the preceding flip-flop contained a binary *one* digit. The negative pulse drives the trigger tube grid of the next flip-flop well off. This has no effect on the next flip-flop; all flip-flops are meanwhile being set to zero. As the input capacitor 296 charges, the grid of trigger tube 277 comes up to a conductive point and flips the flip-flop. The capacitor 296 therefore acts as a time delay or storage element, holding the information while the registers are being shifted.

In a binary counter such as used in the address location unit a plurality of flip-flop circuits which may be of the type shown in FIG. 24 are interconnected. In FIG. 26 is shown the arrangement of the first flip-flop in the counter. The input to tube 277 is derived from an input shaper circuit such as shown in FIG. 7. The cathode follower output of the input shaper gives a positive narrow pulse at the leading edge of the input pulse in the same manner as shown in FIG. 25. The trigger tubes 277, 278 are biased off by application of a sufficient negative DC voltage to the interconnected terminals 292 and 293. The positive spikes of the input pulses flip the flip-flop. Terminals 275 and 276 are connected together. Succeeding flip-flops in the binary counter are interconnected as shown in FIG. 27.

In FIG. 27 is shown the manner in which a plurality of flip-flop circuits may be coupled together in a binary counter. An attenuator consisting of two resistors 315, 316 is connected between each pair of flip-flops. Resistors 315 and 316 are connected together. One end of resistor 316 is grounded. Resistor 315 is connected between the cathode 298 of tube 282 in the previous flip-flop to terminal 293 in the next flip-flop. Capacitor 296 and grid resistor 317 are connected in parallel between the grid of tube 277 and terminals 275 and 293 which are connected together. The terminals 276, 292 of the next flip-flop are joined together so that grid resistor 318 and capacitor 297 are connected in parallel to the grid of tube 278. In this arrangement whenever the input at terminals 275, 293 and 276, 292 is positive going the flip-flop output flips to *one*.

A half bit delay circuit as shown in FIG. 13 may be used as a pulse former to form a pulse from the transition of a flip-flop circuit such as shown in FIG. 24. The side of the flip-flop which is negative when the flip-flop is set to *one* may be connected to the input 70 of the half bit delay circuit and E+ timing pulses may be applied to terminal 77. When the flip-flop is set to one, the input capacitor 73 is charged. If the flip-flop is now set to zero at B time, the output of the flip-flop will go positive and the output of the half bit delay circuit will go negative. The output of the half-delay circuit returns positive at the next E time. Thus a pulse is formed starting when the flip-flop flips and ending at E time.

In FIG. 28 is shown a diagram of the order storage unit of the computer system. This unit is used to store orders for the time necessary to carry them out. It is provided with means for maintaining the bits or binary digits of the order in parallel. Included in the unit is an address shift register 500 and a command shift register 501. The address shift register consists of eleven flip-flop circuits 502 connected in parallel and the command shift register consists of six flip-flop circuits 503 also connected in parallel. The flip-flop circuits may be of the type shown in FIG. 24 with the first flip-flop connected as shown in FIG. 25. The gate decoder is connected to each flip-flop circuit 503 via conductors 504. Gate circuits 505, 506, 507 together with flip-flop 508 constitute the *add ½ to address box* 509. Gates 506, 507 are of type $G_1$. They are connected by leads 510, 511 to the flip-flop circuit 508 which sets these gates. The flip-flop 508 is a single bit static storage element as shown in FIG. 24. Gate 505 is a normally open coincidence gate of type $G_4$ closed by a pulse on lead 513. Address pulses are applied to gate 505 via line 343 and *h* pulses are applied to flip-flop 508 via line 365. Pulses from the *b*-register are applied via line 149 to gates 506 and 505. The outputs of gates 506, 507 are connected to the set-to-1 input of flip-flop 508, and to gate *os*3. Gate *os*3 is of type $G_1$. Gates 515, 516 are used in breakpoint operations and their functions will be described later. These gates are of type $G_3$. Gate 515 is connected via a one bit delay 517 circuit to gate 518. Gate 518 is of type $G_3$. It is normally closed and is opened by an *r* pulse obtained on line 337. The flip-flop 519 is of the single bit static storage device as shown in FIG. 24. It is set to 0 by a pulse received from the control panel via line 159 and is set to 1 by a shift pulse received via line 520. Pulses from the address location unit are applied via line 153 to open coincidence gate 521. Pulses from the memory are applied to gate 521 over line 271 and the gate output is applied to gate *os*1*a*. Pulses from the transfer unit are applied to gates 515, 516, and 523 via line 152. A pulse shaper circuit 525 which may be a one half bit delay circuit as shown in FIG. 13 is connected to the output of the address shift register and the output of this circuit 525 is connected to gates *os*2*b*, *os*4. Address pulses are applied to gate *os*2*a* via line 342 and address-command pulses are applied to gates *os*1*b*, *os*1*c* via line 341. Gates *os*1*b*, 1*c*, 2*a*, 2*b*, 4 are all normally closed gates of type $G_1$, which gates are called by gate wires from the gate decoder. A gate 529 of type $G_3$ is connected between delay circuit 525 and the command shift register. Shift pulses are applied to the flip-flops 503 via lines 531, 532, and 533. An input shaper 536 may be disposed in the line 539 to shape the shift pulses applied to flip-flops 502.

In operation orders are shifted into the address and command shift registers from the memory. These registers store one binary digit (0 or 1) per flip-flop circuit. When a shift pulse comes in, the contents of the shift register are shifted one place to the right. If in addition there is a number input, the right-most digit of the number (first one in time) occupies the left-most flip-flop of the shift register after one pulse. This may be illustrated as follows: Suppose the shift register contains all *ones* as shown in FIG. 29A. Now if a shift pulse comes in and there is no number input the configuration after this pulse would be as shown in FIG. 29B. After six such pulses the shift register would contain all zeros, i.e., it would be cleared.

If it is desired to put a new number into the command shift register, it is necessary that the input digits be coincident with the shift pulses. Suppose it is desired to put the binary number 100110 into the shift register which contains all 1's at the start. This number goes in as shown in FIG. 29C.

The shift pulses which are used are either address pulses or address-command pulses. These pulses also open gate 523 at the right times to admit addresses and commands from the memory or an address from the *add ½ to address box* 509.

Outputs from the address shift register 500 may go to the command shift register through gate 529, to the *b*-register through gate *os*2*b*, or back into the address shift register through gate *os*4.

Whenever an order is shifted into the order storage unit, the command digits come in first (they are the right-most digits in the order) through the address shift register, through gate 529, and into the command shift register.

Provision is made for transfer of the contents of the address shift register via parallel conductors 534 into the location counter and head storage of the address location unit where the computer system then locates the required memory position.

The *add ½ to address box* 509 is required to to add *one* to the binary number represented by a group of pulses arriving at the time of the address pulses. Making use of the fact that in binary notation 1+1 is 0 with 1 to carry, it is obvious that 1 will be added to a binary number if starting at the right-hand end, all the 1's are changed to 0's until the first 0 is reached, then this 0 is changed to 1 and the remainder of the number is reproduced without change. Stated in another way: Start at the right and take the complement of the number without the correction for the fact that the series is finite, until a 1 is obtained, thenceforth repeat the number without complementing. The *add ½ to address box* is, therefore, the same as the *complement, don't complement box* 221 in the sign unit except that here address pulses are used to obtain the *complement, h* pulses set it to *complement*, and the first pulse out of the *add ½ to address box* resets it to *don't complement*.

In FIG. 31 is a diagram of the address location unit. This unit includes a head storage box (HS) 551 consisting of five individual flip-flops FF. Each flip-flop acts as a single bit storage device arranged as shown in FIG. 24. A location counter (LC) is provided consisting of five interconnected flip-flops 552 and a separate counter flip-flop 553. The flip-flops 552 and 553 are arranged as binary counters as shown in FIG. 26 and the flip-flops 552 are interconnected as shown in FIG. 27. A breakpoint flip-flop 554 is provided for use in breakpoint operation. Parallel transfer circuits (PT) 555 are connected to lines 534 and 537 to receive and transfer signals from flip-flops in the order storage unit to the address location unit. These circuits may be arranged as shown in FIG. 30. Two parallel transfer circuits are connected to each flip-flop circuit. A parallel transfer control circuit (PTC) 556, which may be arranged as shown in FIG. 30, is connected to the parallel transfer circuits 555 and wire *al*1*w* from the gate decoder provides a switched plate voltage supply to circuits 555. A plurality of parallel transfer circuits 558 are connected to the counter flip-flops 552 and 553. These circuits are used in a *set to 24* operation employed in multiplication, division and decimal-to-binary conversion orders described below. A parallel transfer control circuit 559 is connected between circuits 558 and is called by wire *al*2*w* from the gate decoder. Location pulses are obtained on line 340 and passed via gate *al*3*a* and input shaper 572 to the location counter flip-flops 552. On lines 336, 357 and 366 are obtained *r*, *s* and *h* pulses which are passed via gates *al*3*b*, *al*4, *al*5 to input shaper 570. Input shaper 570 is connected to flip-flop 553 which is connected via the pulse shaper circuit 571 and input shaper 572 to the location counter flip-flops 552. A pulse shaper circuit 513 is connected to the output of the location counter and to the step counter unit via gate 569 and line 575. The input shaper circuit may be of a type shown in FIG. 7 and the pulse shaper circuits 513 and 571 may each be a ½ digit delay circuit as shown in FIG. 13. Breakpoint flip-flop 554 is connected to the order storage unit via line 153. The head decoder is connected to the outputs of the head storage box flip-flops via lines 550.

In normal operation of the computer system it is required to find two addresses for each order which it carries out. These are:

(*a*) The address at which the order is to be found. Since orders take up one half word of storage space it is necessary to be able to locate a particular half word in the memory.

(*b*) The address associated with the order. This address may be either a full word or a half word.

In the present system, the memory may have a capacity of 1024 or more words. These words may be arranged in thirty-two or more memory tracks 18 on the drum 19, with each track containing a plurality of words, there being in the present illustrative embodiment thirty-two words per track for a 1024 word memory having thirty-two memory tracks. The address location unit must therefore choose the correct track and the correct position on that track. The correct track 18 is chosen by choosing the head 26 which reads and writes on that track. This is is done statically by the head decoder.

In order to find the position on the memory track it is first necessary to label the various word positions around the drum. The drum is divided into 32 equal segments and these are labeled as is shown in FIG. 32 from $WP_0$ to $WP_{31}$. The particular segment which is chosen for word $WP_0$ is arbitrary. Each word is divided into a left half $L_0$, $L_1$, etc. and a right half $R_0$, $R_1$, etc. It should be noted that the order in which the words appear under a particular head is inverted, i.e., a particular head sees first word $WP_3$ then words $WP_2$, $WP_1$, $WP_0$, $WP_{31}$, $WP_{30}$, $WP_{29}$, etc. This method of labeling the words is of course not the only possible way. For example, it may be convenient for coding purposes to number the several tracks and the word positions on each track according to a sexadecimal (base sixteen) system having the digits, 0, 1, 2, 3, 4, 5, 6, 7, 8, 9, *a*, *b*, *c*, *d*, *e*, *f*. The thirty-two tracks may be numbered 00, 02, 04, 06, 08, 0*a* . . . 3*e*. The first and last word position on these tracks may be designated 000–01*f*, 020–03*f*, 040–05*f*, 060–07*f*, 020–0*bf*, . . . 3*e*0–3*ff*. It will thus be noted that there are thirty-two sexadecimal digits allocated to the thirty-two word positions on each track. Each track and the address of each word position on each track may also be designated by an equivalent binary number. It is in the binary form that addresses are actually handled in the present computer system as explained below while the sexadecimal system is used for convenience in coding.

To locate a number in the memory the address location unit must:

(*a*) Know the address to be located,
(*b*) Know its position when it starts to hunt,
(*c*) Subtract its present position from the position which it seeks
(*d*) Count, in half-word steps, until it reaches the sought position, and
(*e*) Send a signal to the rest of the computer system (in particular the step counter unit 16) that the address has been located.

The address to be located is placed in the address location unit by the parallel transfer circuits 555. These circuits set the head storage box and the location counter to the same configuration as the address shift register in that order storage unit. The configuration of the address shift register is not altered during this process.

The location pulses, which indicate the present position of the drum are next added into the location counter via gate *al*3*a*. It should be noted that there are only forty-four digit spaces in a single word space and that there are sixty-four half-words around the drum. It is therefore possible to give the present location to the nearest word only. The six binary counter flip-flops which are necessary in order to add to the binary equivalent of decimal numeral 64 are therefore divided into two groups—one group containing five flip-flops 552 and the other a single flip-flop 553. The group 552 containing five flip-flops therefore indicates the word to be located and the single flip-flop 553 gives the half of that word which is sought, 0 for the left half and 1 for the right half. The location pulses are added into the five flip-flop group 552. This means that each location pulse is to be counted twice if one is counting in half-words.

It is further to be noted that the location pulses for a particular word are not completely into the counter until the *end* of that word, whereas the signal denoting that the location has been found must come at the *beginning* of the half word which is being located. To make this correction an extra pulse (an *r* pulse) is added via gate *al*3*b* into the counter in the units place.

The location pulses (and the *r* pulse) add the complement of the present address (binary of decimal 64 is the present address) into the counter. The counter now contains the difference between the desired address and the present address (or this difference+binary 64 if the difference is negative).

As the drum 19 continues to rotate, a pulse is added into the counter for each half word space (*h* pulses). When the counter reaches the binary number equivalent to decimal numeral 64, it "spills over" sending a signal to the step counter unit 16 to indicate that the correct head 26 has been chosen and that the drum has rotated until the beginning of the correct word or half word space is just under that head. The address has been located.

A few examples will serve to clarify this process:

Suppose it is desired to find position 000000 in the memory, the left half of word $WP_0$, and suppose we start at word $WP_5$. First, at *t*-time through parallel transfer circuit 555 the location counter is set to the address to be located; in this case 000000. During the rest of this word time the location pulses are added into the counter through gate *al*3*a*. An *r* pulse through gate *al*3*b* makes the correction described above. In this case twenty-seven location pulses are added in such a way that they each count twice and the *r* pulse is added into the units flip-flop 553 so the counter now reads 110111=55. On the next step the counter starts to get *h* pulses through gate *al*4. It gets two *h* pulses from each of the words $WP_4$, $WP_3$, $WP_2$, and $WP_1$ for a total of eight *h* pulses and the counter now reads the binary of decimal 63; i.e., all the flip-flops are set to 1. The next pulse which arrives sets all these flip-flops to 0 and the counter "spills over"—a pulse from the counter goes through gate 569 open at *h*-time, to the step counter unit via line 575. This last pulse is the *h* pulse which marks the beginning (from the standpoint of computer system operation) of the right half of word position $WP_0$. The computer system is now ready to perform whatever operation is required on the contents of this word position.

It is clear that it is possible to locate the position 000000 from any place on the track. If one had started from word $WP_6$ then only twenty-six location pulses would have been added in, but two additional *h* pulses from word $WP_5$ would just have made up the difference and position 000000 would have been located as above.

Suppose it is desired to find the left half of word $WP_{30}$ (111100) and we start at word $WP_5$. The location counter is set to binary 60 (111100) by the parallel transfer circuits 555. Twenty-seven location pulses (fifty-four counting each pulse twice) are now added into the counter. The counter should therefore read binary 114 which it is not able to do. It actually reads binary: 114−64=50. The counter spilled over after two location pulses had entered, but this signal does not go to the step counter unit since gate 569 is open only at *h*-time. The fact that gate 569 opens on every *h* pulse means that no location pulses may be put on the location track 22 at *h*-time or the step counter unit may be advanced prematurely.

The *r* pulse goes into the counter to make it read binary 51. Next two pulses each from word positions $WP_4$, $WP_3$, $WP_2$, $WP_1$, $WP_0$, and $WP_{31}$ are added into the counter and it reads binary 63. The *h* pulses in the middle of word $WP_{30}$ spills the counter and the left half of word $WP_{30}$ has been located.

If it had been desired to locate the right half of word $WP_{30}$, the counter would have been set initially to binary 61 (111101) and the procedure would have been the same as above except that the *h* pulse which separates the left half of word $WP_{31}$ from the right half of word $WP_{30}$ would have spilled the counter. If the next step lasts for a half word time, then the right half of word $WP_{30}$ is used. If it lasts for a full word time, the whole word is used.

A type of parallel transfer circuit PT such as used in the address location unit is shown in FIG. 30. The circuit consists essentially of a cathode follower tube which transfers information from one flip-flop circuit to another. The output terminal 280 of one flip-flop 586 is connected to grid 581 of tube 580 and the cathode of tube 580 is connected to output terminal 280 of another flip-flop 587 to which information is to be transferred. The plate supply voltage is obtained via line 582 from the parallel transfer control circuit (PTC) 583. A twofold coincidence of positive voltages on plate 584 and on grid 581 is required to operate the parallel transfer circuit. In general two identical parallel transfer circuits are used for each pair of flip-flops between which information is to be transferred. Thus the output terminals 279, 280 of one flip-flop are connected to the grids of the PT tubes 579, 580 and the cathodes of the PT tubes are connected to the output terminals 279, 280 of the following flip-flop. The plate supply voltage for both plates 584 and 585 is derived from a PTC circuit 583 as shown in FIG. 30. The interconnection of the two flip-flops does not affect either flip-flop as long as no plate voltage is applied to the PT circuits because the isolating resistors 588, 589 in series with grids 581, 590 provide sufficient decoupling.

When plate voltage is applied to the parallel transfer circuits from a parallel transfer control circuit (PTC) 583, one of the grids 581, 590 is positive and the corresponding output of the second flip-flop 587 is forced positive. Referring to FIG. 24 each cathode follower tube 282 and 283 in a flip-flop circuit is inside a feedback loop so that the flip-flop can be set by applying a positive voltage to output terminal 279 or 280. For example, if the PT circuit applies a positive voltage to terminal 279, grid 290 of tube 288 becomes positive. This causes plate 286 to become negative. Grid 270 and cathode 281 of tube 283 become negative also. Then grid 291 of tube 289 becomes negative and plate 287 becomes positive. Grid 265 of tube 282 becomes positive which holds cathode 298 positive. The flip-flop may be set in a similar manner by applying a positive voltage to terminal 280.

In FIG. 30 is shown the parallel transfer control circuit (PTC) which provides a suitable plate voltage supply. The plate voltage may be applied to parallel transfer circuits, set circuits, and magnet actuator circuits. The PTC circuit includes three tubes 591, 592, and 593. The grid of tube 591 is connected to input terminal 594 via capacitor 595. Tube 591 is an inverting amplifier which controls the two cascaded cathode follower tubes 592 and 593. The low impedance switched plate voltage supply is taken from cathode 596 of tube 593.

Input pulses to the PTC circuit may be obtained from a univibrator circuit (U) as shown in FIG. 42. The univibrator provides two output pulses of about 10 milliseconds' duration, one positive going and the other negative going. The switch tube 593 is turned on when a negative signal is applied to the input of the PTC circuit. If it is desired that the tube 593 cease conducting for 10 milliseconds the negative output of the univibrator is directly connected across input terminal 594 and grid resistor terminal 597 of the PTC circuit. If the switch tube 593 is to cease conducting after a ten millisecond delay on a pulse from the univibrator or gate decoder, the positive going output of the univibrator or gate decoder may be coupled via a capacitor 600 to input terminal 594, and the grid 598 will be returned via resistor 599 to DC+ connected to terminal 597. The switch tube 593 then closes on the negative step of the pulses applied to terminal 594 and stays closed until the capacitor 595 discharges. If a six microsecond negative pulse is to be applied from another source to the PTC circuit, it should be capacitor coupled to terminal 594 and terminal 597 should be connected to ground.

In FIG. 33 is shown a diagram of the head decoder (*hd*). This unit is a triode-diode selection matrix. The head decoder is composed of a two bit input, four line output triode selection matrix $M_1$ and a three bit input, eight line output selection matrix $M_2$, driving a twelve line input, 32 line output diode matrix. The input is double ended. Both zero and one inputs are directly connected via lines 550 from the five flip-flops of the head storage 551 in the address location unit to the grids of the thirty-two triode amplifiers 623. All triode cathodes 601 are connected to ground. All triode plate outputs are connected via lines 622 to the selection circuits of the diode matrix. The desired output of the head decoder is a selection of one of the thirty-two available memory channels. The selection is taken via a line 107 which is directly connected to a read-write head unit in the memory as shown in FIG. 16. A neon lamp 610 which may be physically located at the control panel indicates the selected channel. The selection circuit for each channel includes a resistor 613 connected to the DC+ voltage source 624, a decoupling network consisting of resistor 614 and capacitor 615, and a final resistor 616. All of the resistors 616 are connected via resistor 617 to a suitable DC− voltage source 625. A diode 611 is connected between each selection circuit and ground. Diodes 620 and 621 are connected between the triode outputs 622 and the several selection circuits. The binary and sexadecimal designations for each memory channel selected by the matrix and the binary coding for the calling flip-flops are indicated in FIG. 33 at the right side and top of the drawing respectively. The sexademical digits also represent the first two sexadecimal digits in the address of the first word in each memory channel.

The output on all unselected lines 107 is a negative DC voltage of −40 volts. On the selected line the output tries to go positive but is clamped to ground via diode 611. To make the output of a selected line go to ground all triodes 623 associated with the chosen selection circuit must be cut-off by application of suitable voltages to their grids. If one or more of the triodes associated with any selection circuit is conducting, the output of the selection circuit will remain negative. Suitable tubes for use in the head decoder are type 6AL5 for the diodes and type 5963 for the triodes.

In FIG. 34 is shown a diagram of the step counter unit (*st*). This unit includes the step counter 630 which consists of four flip-flops 629 interconnected as shown in FIG. 27. The step counter unit also includes a plurality of gates which control the step counter 630. Gates *st2*, *st3*, and *st4* receive *h*, *s*, and *r* pulses respectively via lines 367, 348, and 339. Gates *st5* and *st6* receive pulses from the *a*-register via line 187. Gate *st6* is connected to the overflow check box 636 which consists of a one digit delay circuit 637 and two normally open coincident gates 638, 639 connected in an anti-coincidence arrangement between input and output of the delay circuit. The overflow check box is required to supply a pulse at *s*-time if the two sign digits in a word arriving from *a*-register are not the same. The number arrives from the *a*-register delayed one digit time, so the two sign pulses are at *r* and *s*-time. The pulse that goes into the delay circuit at *r*-time comes out at *s*-time and closes the gate that would otherwise pass the pulse that is going in at *s*-time. The pulse that is going in at *s*-time closes the gate that would otherwise pass the pulse that is coming out at *s*-time and went in at *r*-time.

Gate *st1* is connected to the control panel via line 641 and receives a start pulse therefrom. Line 575 conducts pulses from gate 569 in the address location unit to the step counter unit. The gates *st2*, *st3*, *st4* and line 575 are connected via a common line 645 to the step counter 630 via an input shaper circuit 642. Gate *st5* and the box 636 are connected via gate 643 and a one digit delay circuit 644 to the common line 645.

In the present computer system orders are carried out in steps. While an order is being carried out, appropriate gates are opened and closed. Which gates are opened and which gates are closed depends on which order is being carried out and at which step the computer system is operating. The gate decoder which controls gates in the several units of the system is operated by the step counter 630 and by the order shift register 501 of the order storage unit. The step counter consists of four flip-flops 629 which counts from step 0 to step 15 since there may be sixteen steps in each order. On some steps no gate configurations are changed, i.e., those gates which are open remain open and those gates which are closed remain closed. On such steps, the step counter is advanced by an *s* pulse through gate *st*3 which is normally open. The step counter actually changes the gate configuration after the trailing edge of the *s* pulse so that the *s* pulse which advances the counter is part of the step which has just been finished. The same statement may be made about other pulses which advance the step counter.

If a step is to last for only a half word time, then gate *st*2 is opened and an *h* pulse advances the step counter 630. For such steps as address location which last for a variable time, depending on the address sought or other factors, the advance is made on a pulse from the address location unit (spill-over from the location counter).

If gate *st*3 is closed and gate *st*1 is opened, with all other gates in the computer system in their normal configuration, the computer system is said to be stopped or idled. Nothing happens in the computer system until a start pulse from the control panel is received via line 641, advancing the computer system to the next step.

Gates *st*4, *st*5 and *st*6 are used in the transfer control orders explained in detail below.

FIGS. 35A–F taken together show the arrangement of the gate decoder which is part of the control unit of the computer system. The gate decoder controls gates located in the *a*-register, *b*-register, *q*-register, sign unit, step counter unit, order storage unit, address location unit, memory unit and transfer unit. The gate decoder consists of a gate section which is shown in FIGS. 35A–D taken together and a buffer section shown in FIGS. 35E–F taken together. The gate section has a six bit input of which five bits are double ended and one bit is single ended, and a fifty-six line output. The gate section is a diode-triode matrix which provides logical ANDS and the buffer section is a fifty-six line input, forty-five line output triode-diode mixer or buffer providing logical OR's.

Figure 35C:
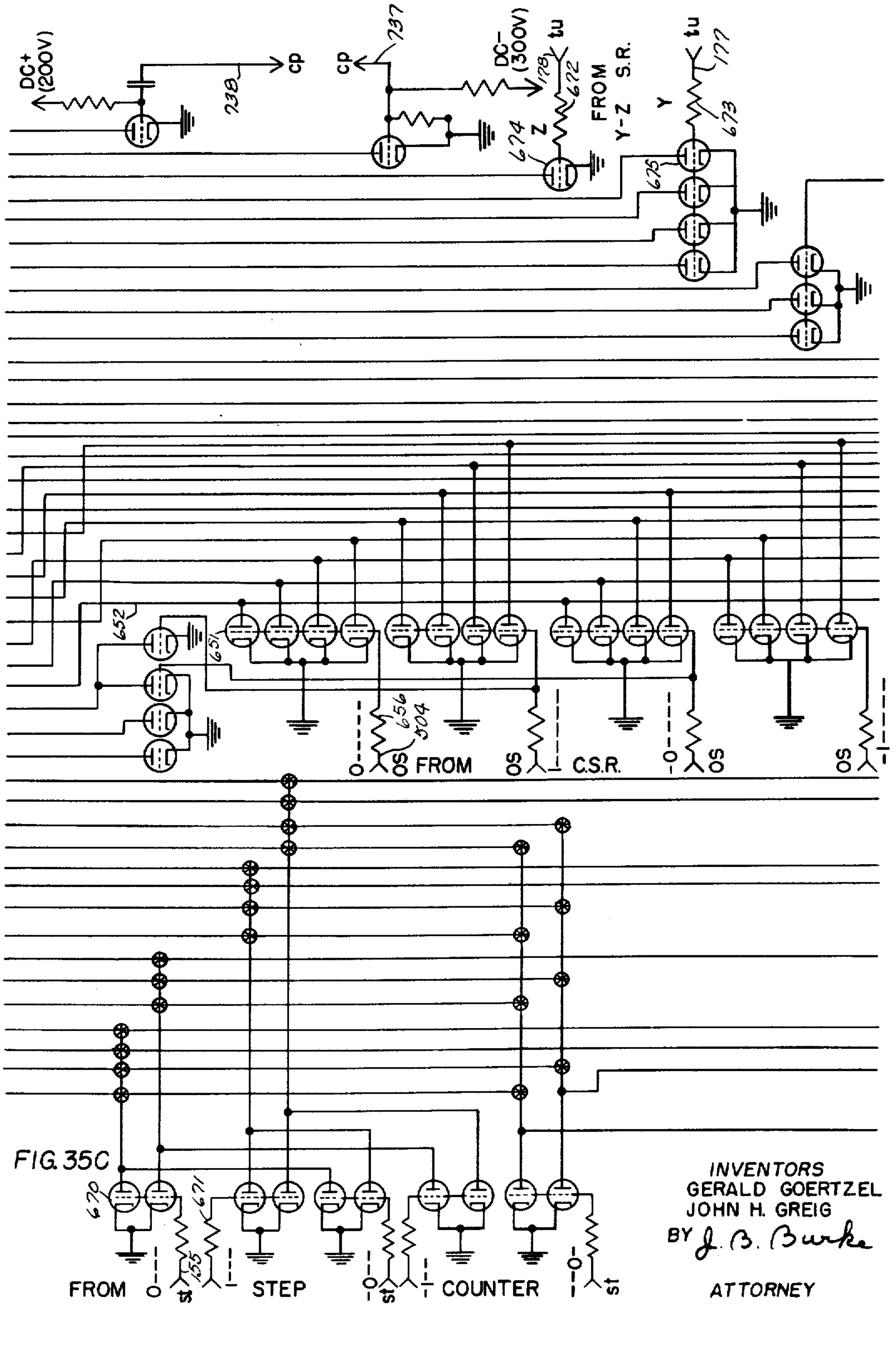
Figure 35D:
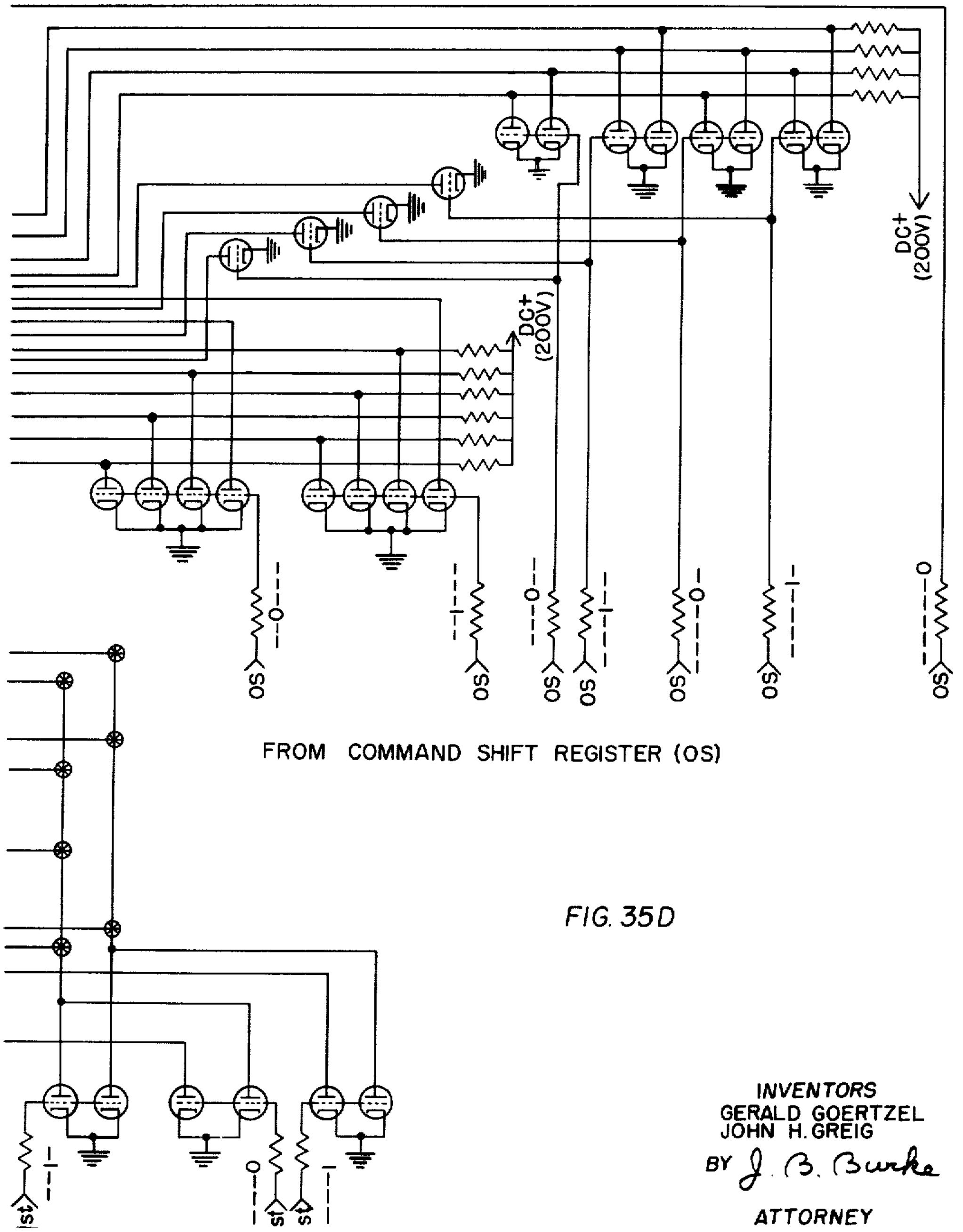
Figure 35E:
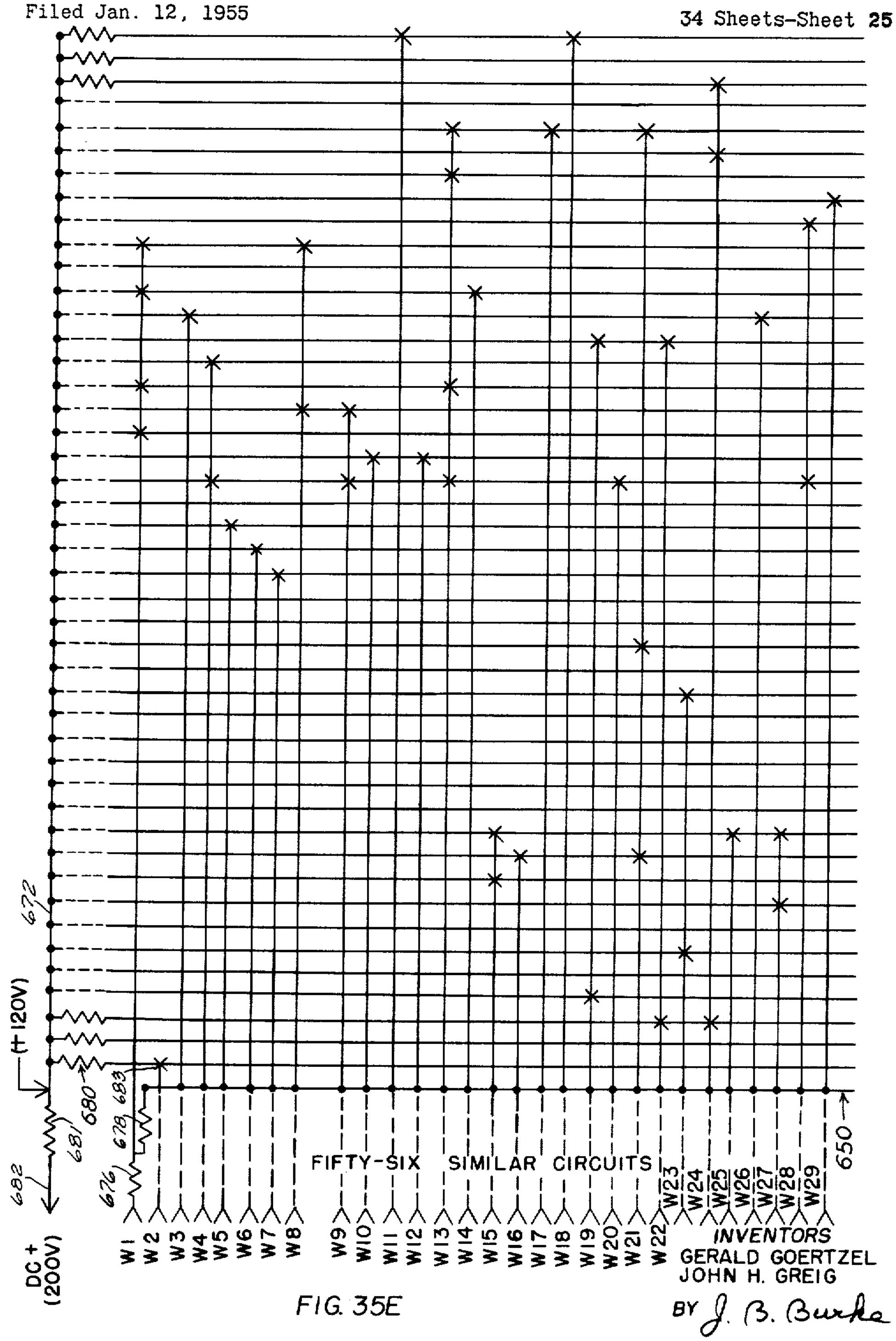
Figure 35F:
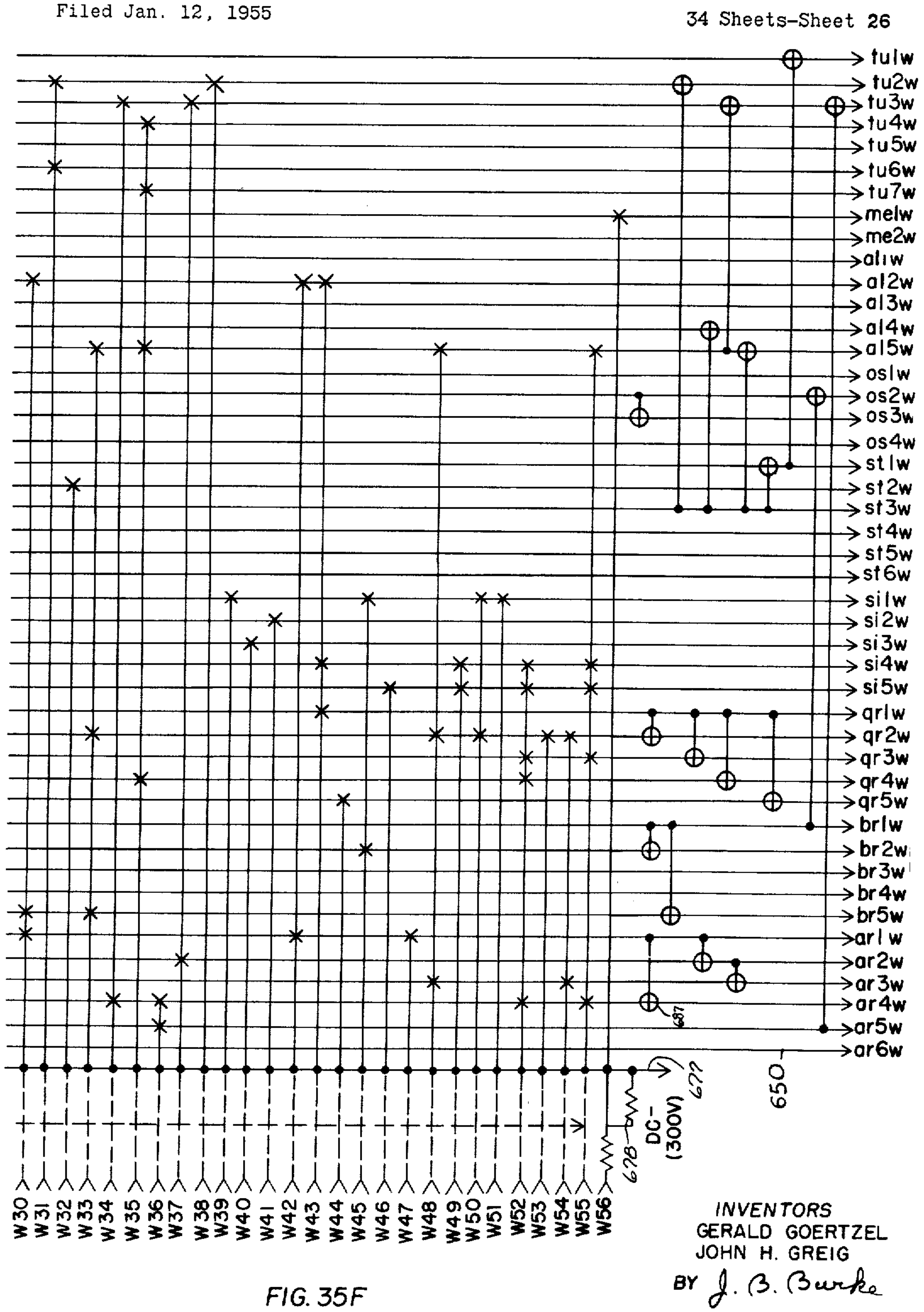

The several inputs to the gate section are found in FIGS. 35C and 35D. The inputs are double ended providing binary zeros and ones. Five and one-half bits are supplied by the command shift register 501 via lines 504. Six full bit inputs are not shown in FIGS. 35C, 35D because the one half bit command input – – – – – 1 is omitted. In the logical design of this system, the zero in the first command position represents a direction to perform the command set forth in code in the remaining five command positions while a one in the first position represents a direction not to perform the command. A direction not to perform a command requires no gate decoder input since there will be no output. If the omitted half bit were required to provide for some other command not now contemplated, an input line connected from the appropriate flip-flop in the order shift register to the gate decoder may readily be supplied. Each line 504 is connected to the interconnected grids of groups of triode amplifiers 651 via resistors 656.

Two full bit inputs are supplied from the Y—Z shift register in the transfer unit via lines 177, 178. These lines are connected via resistors 672, 673 to triodes 674, 675.

Four full bit inputs are supplied from the step counter 630 via lines 155 to triodes 670 via resistors 671. The outputs of triodes 651, 670, 674, 675 are taken off plates thereof which are connected to input wires 652 of the matrix. Each wire 652 is connected to one or more gate wire selection circuits 654 via one or more diodes 653. Each circuit 654 is connected via a resistor 655 to a DC+ voltage source 656. Each circuit 654 has a gate wire designated W1 through W56 which extends through the gate section and the buffer section. In the buffer section the selection circuits each include a resistor 676. The circuits are connected to a DC— voltage source 677 via a resistor 678. One or more triode amplifiers 683 are included in each gate selection circuit. The cathode 684 of each triode is returned to a negative DC voltage of −100 volts as indicated in the legend of FIGS. 35A–F. The plate 685 of each triode goes to a positive voltage source 682 via a plate load resistor 680. The resistor 681 drops the +200 volt supply 682 to +120 volts required for the triode plates. The signals appearing at the buffer input terminals are applied to the grids 686 of the appropriate triodes. As the input to the grids varies between −145 and −60 volts, the plate voltages vary between +100 volts and −40 volts. The pulse signals supplied to the inputs of the gate section are negative voltages. Upon coincidence of the proper inputs the output of one selection circuit 654 will become less negative going from −145 to about −60 volts. In order to call a gate, a voltage of −40 volts must be applied to the gate. To uncall the gate a positive voltage of +100 volts is applied. Although fifty-six wires W1–W56 are specified, the matrix may readily be arranged to provide for more or less wires as required depending on the order procedure of the system.

The output wires (W1–W56) 650 of the buffer section are connected to gates in the various units either directly or via diode gates 687. The various gate decoder output wires are each designated by a symbol associated with the gates which are called in the various units. Thus wires *ar*1*w*–*ar*6*w*, *br*1*w*–*br*4*w*, *qr*1*w*–*qr*5*w*, *si*1*w*–*si*5*w*, *st*1*w*–*st*6*w*, *os*1*w*–*os*4*w*, *al*3*w*–*al*5*w*, *me*1*w*–*me*2*w*, and *tu*3*w*–*tu*7*w* are connected to similarly numbered gates *ar*1–*ar*6, *br*1–*br*5, etc. in *ar, br, qr, si, st, os, al, me,* and *tu*. Wires *tu*1*w* and *tu*2*w* call the transfer unit via appropriate diode gates 753, 754 located in that unit. Wires *al*1*w* and *al*2*w* call PTC circuits 556, 559 in the address location unit. Some wires may be connected to call more than one gate. For example wire *qr*2*w* calls gates *qr*2*a, qr*2*b, qr*2*c*; wire *os*1*w* calls gates *os*1*a, os*1*b, os*1*c*; wire *al*3*w* calls gates *al*3*a, al*3*b*; and wire *tu*5*w* calls gates *tu*5, *tu*5*b*. Wire *si*3*w* calls gate *si*3*a* located in the sign unit and gate *si*3*b* located in the transfer unit. Wire *st*1*w* calls gate *st*1 and also calls the transfer unit via a diode gate 756. The gate wires W1–W56 call one or more gates or units via one or more of gate decoder output wires 650 depending on the order code and step number at which the gate decoder is operating. In the following Table I are listed the calling gate wires, the gates called, the corresponding command code and the order step numbers.

A typical condition for operation of the gate decoder is shown in FIG. 36. Only those diodes and triodes which actually transmit signals are shown. The gate decoder configuration for command 01100– on step S8 is shown in FIG. 36. The step counter supplies 1 – – –, – 0 – –, – – 0 –, and – – – 0 pulse inputs to input terminals 155 of the gate section. These signals are applied via resistors 671 and triodes 670 which become cut-off. The order shift register supplies pulses 0 – – – – –, – 1 – – – –, – – 1 – – –, – – – 0 – –, and – – – – 0 – to input terminals 504. These signals are applied via resistors 656 to triodes 651 which become cut-off. The plates of the gate section triodes are connected via diodes 653 and wire W21 to the buffer section. The grids 686 of three triodes 683 receive pulses via a resistor 676. The outputs of the triodes appear on gate wires 650. In the particular arrangement shown in FIG. 36, the gate wires are directly connected to gates *si*3*a* in the sign unit and gate *si*3*b* in the transfer unit via wire *si*3*w*, to gates *br*1 and *br*2 in the *b*-register via wires *br*1*w* and *br*2*w*, and to gates *tu*5*a* and *tu*5*b* in the transfer unit via wire *tu*5*w*. The gate decoder configuration for each step in each order may similarly be determined from FIGS. 35A–F.

*Table I*

| Gate wire | Command code | Step No. | Gates called |
|---|---|---|---|
| W1 | ------ | S0 | *al*1*w*, 3*a*, 3*b*; *br*1; *os*2*a*, 2*b*, 4. |
| W2 | 100000 | S0 | *ar*6. |
| W3 | ------ | S1 | *al* 4; *st* 3. |
| W4 | ------ | S2 | *os*1*a*, 1*b*, 1*c*; *st*2, 3. |
| W5 | -11010 | S3 | *st*4. |
| W6 | 01110- | S3 | *st*5. |
| W7 | 01111- | S3 | *st*6. |
| W8 | ------ | S4 | *al*1*w*; *br*1; *os*2*a*, 2*b*, 3. |
| W9 | 00000- | S5 | *br*1; *os*2*a*, 2*b*, 3; *st*2, 3. |
| W10 | Stop | S6 | *st*1, 3. |
| W11 | 110--- | S6 | *st*1, 3; *tu*1*w*. |
| W12 | 1110-- | S6 | *st*1, 3. |
| W13 | Y | S6 | *br*1; *os*2*a*, 2*b*; *st*2, 3; *tu*5*a*, 5*b*, 7. |
| W14 | -0---- | S8 | *al*3*a*, 3*b*. |
| W15 | 00001- | S8 | *br*1, 3. |
| W16 | 0001-- | S8 | *br*1, 2. |
| W17 | 01010- | S8 | *tu*5*a*, 5*b*. |
| W18 | 01011- | S8 | *st*1, 3; *tu*1*w*. |
| W19 | 01000- | S8 | *al*5; *ar*1, 2, 3; *st*5. |
| W20 | Y | S8 | *st*2, 3. |
| W21 | 01100- | S8 | *br*1, 2; *si*3*a*, 3*b*; *tu*5*a*, 5*b*. |
| W22 | 01001- | S8 | *al*5; *ar*1, 4; *st*3. |
| W23 | 01100- | S9 | *ar*1; *si*5. |
| W24 | 01010- | S9 | *al*5; *ar*4, 5; *st*3; *tu*3, 6. |
| W25 | 10---- | S9 | *br*1. |
| W26 | -0---- | S9 | *al*4; *st*3. |
| W27 | 10---- | S10 | *br*1, 4. |
| W28 | 000-0- | S10 | *me*2; *st*2, 3. |
| W29 | 000-1- | S10 | *me*1. |
| W30 | 001--- | S10 | *al*2*w*; *ar*1; *br*1, 5. |
| W31 | 01010- | S10 | *st*3; *tu*2, 6. |
| W32 | Y | S10 | *st*2, 3. |
| W33 | 001--- | S11 | *al*5; *br*1, 5; *qr*1, 2*a*, 2*b*, 2*c*. |
| W34 | Z | S11 | *al*5; *ar*1, 4; *st*3; *tu*3. |
| W35 | 01011- | S10 | *al*5; *qr*1, 4; *st*3; *tu*4, 7. |
| W36 | 01100- | S10 | *ar*1, 4, 5. |
| W37 | Y --00- | S11 | *al*5; *ar*1, 2; *st*3; *tu*3. |
| W38 | 01100- | S11 | *st*3; *tu*2. |
| W39 | 10101- | S12 | *si*1. |
| W40 | 10110- | S12 | *si*3*a*, 3*b*. |
| W41 | 10111- | S12 | *si*2. |
| W42 | 10000- | S12 | *al*2*w*; *ar*1. |
| W43 | 10010- | S12 | *al*2*w*; *qr*1; *si*4. |
| W44 | 10001- | S12 | *qr*1, 5. |
| W45 | 001--- | S12 | *br*1, 2; *si*1. |
| W46 | 101--- | S13 | *si*5. |
| W47 | 101--0 | S13 | *ar*1. |
| W48 | 10000- | S13 | *al*5; *ar*1, 2, 3; *qr*1, 2*a*, 2*b*, 2*c*; *st*3. |
| W49 | 10010- | S13 | *si*4, 5. |
| W50 | 001--- | S13 | *qr*1, 2*a*, 2*b*, 2*c*; *si*1. |
| W51 | 10000- | S14 | *si*1. |
| W52 | 10010- | S14 | *ar*1, 4; *qr*1, 3, 4; *si*4, 5. |
| W53 | 001--- | S14 | *qr*1, 2*a*, 2*b*, 2*c*. |
| W54 | 10000- | S15 | *ar*1, 2, 3; *qr*1, 2*a*, 2*b*, 2*c*. |
| W55 | 10010- | S15 | *al*5; *ar*1, 4; *qr*1, 3; *si*4; *st*3. |
| W56 | Base code | Correct | *me*1. |

The computer system requires an input device which can supply information in the form of electrical pulses coded in a predetermined manner. A suitable input device may have information to be fed to the computer system stored on magnetic tape or punched tape, and will include a reproducer or reader which translates the stored information into electrical pulses suitable for processing in the computer system. Another suitable input device may be an electric typewriter which provides electric pulses upon actuation of the letter and number keys, such as shown in Patents 2,172,749 and 2,288,846. Regardless of the type of input device used, it will be necessary that it supply information in electrical pulse form encoded according to the requirements of the computer system.

Information is obtained from the computer system in coded pulse form. These pulses may be recorded by an oscillograph or may be used to actuate magnets which in turn operate an electric typewriter or other information recording device. If desired, the electrical pulse output may be stored in any known manner such as in magnetic form on magnetic tape or in the form of holes in perforated paper tape.

The present system will be described with reference to use of an input device in the form of a tape reader which serves to feed information to the computer system and of an output device in the form of a tape perforator or punch which records the information put out by the system.

In FIG. 37 is shown one arrangement for an input device (*id*) which may be used in the present computer system in the form of a tape or card reader. It must be emphasized that other types of input devices may be used if arranged according to the principles of operation to be discussed. A tape or card 910 is advanced in the direction of arrow 911 by sprocket wheel 912 which has teeth to engage holes 913 in the tape. Sprocket wheel 912 is connected by a suitable linkage 914 to the shaft 915 of an insulated bar 916 disposed transversely across the tape. Bar 916 carries a plurality of conductive fingers or feelers 917 each having contact 918. All fingers 917 are coplanar. Another finger 919 is bent upwardly at a small angle from the plane of the other fingers 917 and is disposed on bar 916 beyond the edge of the tape. This finger is arranged to contact stationary element 920 after bar 916 is tilted clockwise to press fingers 917 down on tape 910. Bar 916 is tilted against the bias in spring 925 which bears on armature 926 attached to shaft 915. The armature is actuated by an electromagnet 927 energized via line 928 connected to the transfer unit. Terminal 929 is connected to a DC+ voltage source. Each of fingers 917, 918 is also connected via a line 930 to a DC+ voltage source. Underneath each contact 918 is a stationary contact 931 connected to a wire 932 which goes to the transfer unit. Wire 947 is connected to the transfer unit from contact 920 via switch 962 and wire 961. Switch 962 may be located at the control panel. A plunger 934 carried by a spring contact 935 is depressed against the bias in spring 936 when tape 910 is passing under fingers 917 so that the contact 935 meets the fixed contact 937. Switch 938 is disposed in series in line 940, 948 connected between contact 937 and the transfer unit. This switch may be located at the control panel. When switch 938 is closed and tape 910 is disposed beneath fingers 917, a Can Read signal is sent to the transfer unit to indicate the input device is in condition to read information into the computer system. The computer system sends back a Read signal which is a request for information via line 928 to actuate electromagnet 927. This causes the fingers 917 to contact the tape at the same time the sprocket 912 moves the tape a distance sufficient to bring a line of perforations 941 under the contacts 918. Those contacts 918 which meet contacts 931 permit passage of input signals to the transfer unit. The bar 916 continues to tilt until contacts 919, 920 are closed which sends a Have Read signal via line 961 to the computer system to indicate the information requested has been sent. Then the computer system stops the Read signal which causes the fingers 917 to be raised to await the next Read signal from the transfer unit.

In FIG. 38 is shown an arrangement for an output device (*od*) which may be used in the present computer system. This device punches tape in accordance with a prearranged code. Punches 950 are aligned across the tape. Each punch is actuated by an electromagnet 951 connected by a line 952 to the transfer unit. The other leads 953 are connected in common to a fixed contact 954 held normally open from contact 955. Contact 955 is attached to plunger 956 of electromagnet 957. A hook 958 attached to the plunger is disposed to engage the teeth of sprocket 959. The sprocket in rotating causes advance of the tape as the sprocket teeth engage holes 913 in the tape. Contact 955 and one lead of electromagnet 957 are connected to a DC+ source. Lead 960 is connected to the transfer unit. A plunger 964 carries spring contact 970 which is connected to a DC+ voltage source and is biased by spring 939. This contact meets contact 966 when the tape is disposed for punching beneath the punches 950. When switch 968 is closed, a Can Punch signal is sent to the transfer unit via wires 949, 969 to indicate the output device is ready to receive information. The computer system sends an Advance and Punch signal via a line 960 to electromagnet 957 which causes advancement of the tape, and contacts 954, 955 close. The computer system then sends signals via lines 952 to each electromagnet which is to actuate a punch 950. When the punches have perforated the tape, they are lifted by the springs 967 and spring 971 lowers plunger 956 to separate contacts 954, 955 and to open the circuits to electromagnets 951. The output signals should be applied for a predetermined time duration to insure that each punch 950 which is selected to punch the tape has sufficient time to perform this function. In the present system the transfer unit is provided with means for controlling the duration of the applied signal.

The tape or card used for reading orders and numbers into the computer system and recording information put out by the system may be punched with holes as above mentioned, or it may be marked in any other desired manner for which the tape or card is adapted to be marked. Such marking may be by passage of an electric current through an electrosensitive tape, by magnetizing a magnetic tape, by application of ink marks, and so on. Regardless of the type of marking used, the marks must be encoded according to some prearranged code. In FIG. 39 is shown a seven position code for a tape which may be used in the present computer system. Code positions P–1 through P–6 include the encoding of numbers, letters and punctuation. Code positions P–1, P–2, P–3, P–4, P–5 and P–7 count one if there is a hole or mark at any of these positions. Code position P–6 counts zero if there is a hole or mark in this position. Each X in FIG. 39 indicates a hole or mark 900 on the encoded tape, card or other coded medium. The marks 900 appearing transversely across the tape in any row 901 represent an order and/or number according to a code used in the computer system. The marked tape may be used to read information into the computer system or it may be used to actuate an electric typewriter of a known type if desired. Orders for functions to be performed by the typewriter which do not produce a mark on paper are provided for in the code shown in FIG. 39. Each of these orders has a hole or mark in the seventh code position P–7 to indicate a typewriter function such as space, carriage return, etc.

In FIG. 40 is shown a diagram of the transfer unit (*tu*). This unit is a buffer member between the comparatively fast pulses employed in the computer system and the pulses of longer duration employed in operating the input and output devices. The unit includes six flip-flops which make up the transfer shift register. This register has one group of four flip-flops 700 and a group of two flip-flops 701. Line 186 is connected from the *a*-register to gate 711. Gate 712 is connected between gate 711 and the flip-flops 700. Lines 334 and 353 serve to apply address pulses (*ap*) and $s+t$ pulses to the unit. The address pulses are applied to gate *tu5a* and the $s+t$ pulses are applied to both gate *tu3* and the one digit delay circuit 718. A one bit delay circuit 719 follows gate *tu3*. The output of delay circuit 718 is connected to both gates 711 and *tu4*. Shift pulses are applied to all flip-flops in the shift register via a common line 720. An input shaper circuit 721 may be inserted if desired in this line to shape the shift pulses. Gates *tu4*, *tu5a* and delay circuit 719 are connected in common via line 722 to gate 712 and the shift pulses line 720. A gate *tu6* is connected between the flip-flop groups 700, 701.

Pulses from the shift register are transmitted to the order storage unit via line 723, gate *tu5b* and line 152. Pulses from gate *tu6* pass via line 724 and gate *si3b* to gate 712 and the shift pulse line 720. Pulses from the shift register are transmitted to the *q*-register via lines 723 and 209. Signals from the sign unit are applied via line 239 and a PTC circuit 778 to the parallel transfer circuits 770, one PT circuit 770 being provided for each flip-flop in the shift register to which the PT circuits are connected. A gate *tu7* is connected between one output of the shift register section 701 and an input of shift register section 700.

The six flip-flops of the actuator shift register can be loaded with information serially by the computer system and they will retain the information while appropriate magnets in the output device are being actuated. The flip-flops can be loaded in parallel with information from appropriate points of the input device so that input information can be shifted serially into the computer system in synchronism with other pulses in the system.

To load the transfer shift register from the computer system, the register must first be cleared. This is accomplished by opening gate *tu5a* which allows eleven address pulses to pass via wires 722 and 720 to the register to shift out of the flip-flops any information which may have been left in the shift register. The information from the *a*-register appears as pulses on line 186 in bursts of two bits, one digit time later than *s* and *t*-times. These pulses from *ar* are shifted into the shift register by passing $s+t$ pulses through gate *tu3*, delaying the $s+t$ pulses one binary digit time in delay circuit 719 and applying them via the shift pulses line 720 to the shift register. At the same time the *ar* pulses pass through coincidence gate 711 when $s+t$ pulses delayed one binary digit time in delay circuit 718 are applied to gate 711. The *ar* pulses are then applied to the shift register via coincidence gate 712 which is being triggered by the delayed $s+t$ pulses appearing on the shift pulse line 720. Since the two bits which are shifted from the *a*-register to the actuator unit were produced in *ar* during the previous word time, gate *tu3* must open and close slowly. For example, if two bits are shifted out of the *a*-register on step S9 of a particular order, gate *tu3* would be called during step S9 and would pass the *s* pulse at the end of step S9 and the *t* pulse at the beginning of step S9.

These two pulses come from the *a*-register least significant bit first. Consider the two pulses $a_{-1}$ and $a_0$ of the *a*-register. If the digit content of *ar* is multiplied by four (delayed to binary digit times) and then delayed another binary digit time, pulse $a_0$ will be at *t*-time and pulse $a_{-1}$ will be one digit time later than *t*-time. These two pulses are shifted into the first two stages of the transfer shift register. The first stage of the shift register now contains digit $a_{-1}$ and the second stage now contains digit $a_0$. Thus the first stage corresponds to a P–2 hole in the tape code shown in FIG. 39, and the second flip-flop corresponds to a P–1 hole in the tape code. Similarly, if four bits are shifted into the shift register (two groups of two bits each), the bits corresponding to tape code positions P–3 and P–4 come first in that order, followed by bits corresponding to tape code positions P–1 and P–2. Six bits arrive in the time sequence P–5, P–6; P–3, P–4; P–1, P–2. Gate *tu6* is used during an output order so that the correct two bits are received by the flip-flops 701 corresponding to the P–5 and P–6 holes in the tape code.

The input device (*id*) which supplies digital information to the system applies the Can Read signal via line 940, wave shaper 745 and diode gate 761 to the Read magnet actuator circuit 765. The actuator circuit 765 applies Read signals to the input device via line 928 which instructs the input device to supply information pulses to the computer system. The input device supplies the information from six positions of the coded tape via six lines 932 connected to the set circuits 731 and then sends the Have Read signal via line 961, wave shaper 748, and diode gate 759 to the univibrator 707. A signal from the seventh position on the coded tape is applied via a line 932 through wave shaper 747 to gate 743.

The output device (*od*) applies a Can Punch signal to notify the system it is ready to receive output information. This signal is applied via line 969, wave shaper 746, and diode gates 768, 769 to the univibrator 706. The signal ordering the output device to advance the tape or other recording medium and punch the tape is applied from univibrator 706 via magnet actuator circuit 772 to line 960. The six output signals which actuate the punches for code positions P–1 to P–6 in the output device are applied from magnet actuator circuits 730 to lines 952. A magnet actuator 774 applies signals to operate the seventh code position punch to another line 952. Control pulses to operate the *tu* unit are obtained from the gate decoder on wires *tu*1*w*, *tu*2*w*, and *st*1*w*. The pulses on wire *tu*1*w* are applied via diode gate 753 to the actuator circuit 765. Pulses on wire *tu*2*w* are applied via diode gate 756 to univibrator 707. The sign unit applies pulses to flip-flops 700, 701 via line 239, PTC circuit 778, PT circuits 770 and wires 736. One PT circuit 770 is provided for each flip-flop in the shift register to which the PT circuits are connected. The fixed control or timing pulses *h* are applied via line 364 to gate 704, and *s* pulses are applied via line 358 to gate 705 and the flip-flops in the Y—Z shift register 702. The Y—Z shift register consists of two flip-flops which apply Y and Z pulses to the gate decoder via lines 177, 178. Y and Z pulses as will be explained later indicate the performance of sub-steps in an order.

The magnet actuator circuits 730 are connected to the six flip-flops in the transfer shift register 700, 701 via wires 726. Six set circuits 731 are connected to the flip-flops in the shift register via wires 727. Parallel transfer control circuits 728 and 729 apply switched plate voltages to the magnet actuator and set circuits via wires 733 and 732. The PTC circuit 729 is connected to univibrator 706 and PTC circuit 728 is connected to univibrator 707. A flip-flop 734 is connected to gate 705 and to gate 704. The output of gate 743 is connected to gate 747 which in turn is connected to flip-flop 734. A gate 744 is connected between univibrator 706 and flip-flop 734. A diode gate 771 is connected between univibrator 706 and the actuator circuit 765. The magnet actuator circuit 774 is supplied with coded pulses from a selected four of the six flip-flops in the shift register sections 700, 701.

When the Can Read signal appears at actuator circuit 765 in coincidence with the application of a signal via line *tu*1*w* from the gate decoder, then the actuator circuit sends out a Read signal to the input device. But if a signal is at this time also being applied from output univibrator 706, the Read signal is not sent to the input device. The signals read into the transfer unit from the input device are applied to the set circuits 731 which set the selected ones of the six flip-flops in the transfer shift register. Each of these flip-flops 700, 701 corresponds to a single code position P–1 to P–6 on the coded tape. While the signals are applied to the set circuits the Have Read signal appears on line 961 to start univibrator 707. The gate decoder calls *tu* at this time on wire *st*1*w* and the coincidence of this signal with the Have Read signal starts univibrator 707 which sends a ten millisecond pulse to the set circuits via PTC circuit 728. During the ten millisecond pulse the set circuits pass the information read into the transfer unit to set the flip-flops of the shift register 700, 701. After this pulse a 0.1 second pulse is produced by the univibrator 707. This pulse must occur before the univibrator can be reset. During the ten millisecond pulse a pulse passes through gates 743 and 747 to flip-flop 734 to set the flip-flop to 1. This causes the Y—Z shift register to supply a Y signal to the gate decoder for one word time following the next *s* pulse after the flip-flop 734 is set, and to supply a Z signal for the next word time following the Y signal word time. If a seventh position or P–7 signal is obtained on line 932, gate 743 is closed which prevents the univibrator 707 from sending the ten millisecond signal to the set circuits so the shift register 700, 701 is not loaded and the Y—Z signals are not produced in the Y—Z shift register. Thus when a seventh position or P–7 signal is obtained the computer ignores the character being read by the input device and goes on to the next character. The information read into the shift register 700, 701 is passed to the *q*-register and order storage unit via lines 209, 152.

The gate decoder calls wire *tu*2*w* after the transfer shift register has been loaded for output. A coincidence between this signal and the Can Punch signal on line 969 starts univibrator 706 which provides a ten millisecond pulse to the magnet actuator circuits 730 to permit them to pass the signals from the shift register 700, 701 to the punch actuating circuit in the output device via lines 952. The ten millisecond pulse applied to magnet actuator 772 causes application of the Advance and Punch signal via line 960 to the output device and application of the pulse to MA 774 may cause punching of the tape in hole position P–7 which is part of a *carriage return, back space,* or *tabulate* coded signal if such signal is obtained from the shift register 700, 701. If the output device is a typewriter, the output signals on line 952 from MA 774 will cause the typewriter to perform the appropriate typewriter function ordered. The back edge of the ten millisecond pulse is shaped into a sharp pulse by gate 744 and sets flip-flop 734 which causes gate 705 to pass *s* pulses to the Y—Z shift register to produce Y—Z pulses if required for the next two complete word times. After the ten millisecond pulse, the univibrator 706 produces a pulse for about 0.1 of a second during which further input and output is prevented. During this pulse the univibrator cannot be reset, and gate 747 remains closed. Also the Read signal cannot be sent from actuator circuit 765.

In FIG. 41 is shown a magnet actuator circuit (MA) as used in the transfer unit. This circuit actuates appropriate magnets in an input or output device employed by the computer system. The circuit consists of an amplifier tube 780, a cathode follower tube 781, and a current amplifier tube 782 connected in cascade. A DC+ plate supply voltage is obtained from a parallel transfer control circuit via resistor 783. Grid 784 of tube 781 is connected to the plate output of tube 780 via a resistor 785. The output of both tubes 781 and 782 flows through coil 786 of an electromagnet 792 located in an input or output device. The cathodes of tubes 780 and 782 are grounded. Cathode 787 of tube 781 is connected to a DC— power supply via resistors 788, and 789. In operation a DC signal is applied from a flip-flop in the transfer unit to grid 791 of tube 780. A DC+ voltage is also applied by a PTC circuit to provide a twofold coincidence between plate 790 and grid 784. The cathode follower 781 and current amplifier 782 provide a maximum current flow in coil 786 to actuate electromagnet 792.

In FIG. 42 is shown a diagram of a univibrator circuit (U) as used in the transfer unit. The circuit includes a multivibrator which has an input terminal 800. This terminal to grid 801 of tube 802 via resistor 803. The plate 816 is connected to grid 804 of tube 805 via resistor 806. Plate 815 is connected to grid 810 of tube 809 via capacitor 811. The cathodes of tubes 802, 805 and 809 are connected in common to ground. The plates of the tubes are connected via resistors 826, 817, and 818 to a DC+ voltage source 819. Grid 810 is connected to the DC+ source via resistor 820. Output terminal 807 is connected to grid 804 via capacitor 808 and to plate 822. Output wire 812 is connected between resistors 813 and 814. Resistors 814 and 824 are connected to a DC— voltage source 821. An output terminal 830 is connected to input terminal 800 via resistor 831. Tubes 832, 833 and 834 constitute a three-stage amplifier. Grid 835 is connected to the output 807 via capacitor 836. Grid 838 of tube 833 is connected to the plate 851 of tube 834 via resistor 837. Plate 839 is connected to grid 852 via capacitor 853. Plate 840 is connected to output terminal 830 via the R-C circuit consisting of capacitor 848 and resistor 847. The cathodes of tubes 832, 833 and 834 are connected in common to ground. The plates 839, 840, 851 are connected to a DC+ voltage source 845 via resistors 841, 843 and 844. Grid 838 is connected to a DC− voltage source 854 via resistor 849. Terminal 830 is connected via resistor 846 to the DC− voltage source 854. Grid 835 is connected to ground via resistor 850. Grid 852 is connected to the DC+ source 845 via resistor 842.

In operation of the circuit of FIG. 42, terminal 800 is normally held positive. When negative pulses are applied thereto grid 801 becomes negative which cuts off tube 802 making plate 816 more positive. The positive potential is applied to grid 804 rendering tube 805 conductive. Plate 815 conducts, capacitor 811 charges, and tube grid 810 becomes more negative to cut off tube 809. Plate 822 becomes more positive to provide a positive output at terminal 807. Capacitor 811 then charges through resistor 820 until tube 809 is rendered conductive again. While terminal 807 is positive, capacitor 836 charges by means of the current through grid 835. When tube 809 again conducts the positive output 807 returns negative and grids 804 and 835 are driven negative through capacitors 808 and 836, rendering tubes 805 and 834 cut off. The output of tube 834 is then successively amplified by tubes 833 and 832 to produce a positive output at terminal 830. The time constant of the R-C network 842, 853 is selected so that the positive pulse output at terminal 830 is ninety milliseconds in duration. This pulse begins at the end of the positive and negative pulses at terminals 807 and 812 which pulses are each ten milliseconds in duration. At the end of the ten millisecond pulses, the input 800 to the univibrator is disabled by application of a positive voltage via resistor 831 for a succeeding period of ninety milliseconds as fixed by the R-C network.

A set circuit is shown in FIG. 43 as employed in the transfer unit. This circuit sets a flip-flop upon receiving signals from an input device when enabled by a parallel transfer control circuit. Input terminal 878 is connected to the cathode of rectifier tube 861 and the plate of rectifier 860 via capacitor 877. The rectifiers are connected to inverting amplifier tube 862 via resistor 874. The output of tube 862 is applied to the grid of switch tube 865 via resistor 866 and to the grid of the inverting amplifier tube 863 via resistor 871. The output of tube 863 is applied to the grid of switch tube 864 via resistor 869. The cathodes of tubes 864 and 865 are connected to terminals 880 and 881 which are to be connected to the two output terminals 279 and 280 respectively of a flip-flop circuit as shown in FIG. 24. A DC− voltage source 879 is connected to the grid of tubes 863, 864, and 865 via resistors 870, 868 and 867. The plates of tubes 864, 865 are connected to terminal 882 to which a PTC circuit applies a switched plate voltage. A DC+ voltage is applied to the plates of tubes 862 and 863 via resistors 872 and 873. A DC+ voltage source 883 is connected to the plate of tube 861 via resistor 876. The grid of tube 862 is bypassed to ground via capacitor 875.

In the set circuit (S) as shown in FIG. 43, tubes 860 and 861 are peak-to-peak rectifiers. The input signal to terminal 878 may be a 120 c.p.s. ripple R riding on a DC voltage from the input device. The ripple is rectified by tubes 860, 861 to produce a negative signal. This signal is amplified by the overdriven amplifiers 862, 863 to supply a push-pull signal on the grids of output tubes 864, 865. When plate voltage is applied to the output tubes from a PTC circuit, one cathode applies a positive voltage and the other cathode applies a negative voltage to a flip-flop's output terminals via terminals 880, 881. Since the flip-flop outputs are connected to grids of the flip-flop tubes as shown in FIG. 24, the flip-flop is set accordingly. When a signal is present at terminal 878, the switch tube 864 is turned on and the tube 865 is turned off. This sets the associated flip-flop to 1. When there is no signal applied to terminal 878, the flip-flop is set to 0. The parallel transfer control circuit which provides plate voltage to the output tubes controls the transfer of information through the set circuit.

A wave shaper circuit as used in the transfer unit, address location unit (*al*) and order storage unit (*os*) is shown in FIG. 44. This circuit is a peak-to-peak rectifier circuit used to detect 120 c.p.s. modulation on signals obtained from an input device. Input terminal 892 is connected to the cathode of tube 891 and the plate of tube 890. At output terminals 896 and 897 will appear either a negative DC voltage sufficient to operate the grid of a tube in a gate circuit or a wide positive pulse to be applied to a diode gate. Resistor 894 and capacitor 895 are connected as a filter circuit across the outputs of the rectifier tubes.

The diode gates above mentioned are simple diodes such as shown in FIGS. 40 and 45. Each diode consists of a cathode 888 and anode 889. When a positive voltage is applied to anode terminal 898 the diode conducts. When a negative potential is applied, no output is obtained at cathode terminal 887. The diode gate is employed when a gating function is to be performed and neither amplification nor high input impedance is required.

In FIG. 46 is shown a circuit for a diode clamp unit. The circuit includes a diode 855 having its plate connected to the output terminal 856. This terminal will be normally connected to the cathode of normally open gate circuit in the present system. The cathode 857 of the diode is grounded. A resistor 858, is connected across the diode, and a series capacitor 859 is provided at the input terminal 823. When a negative pulse is applied to input terminal 823, the capacitor 859 charges. The diode conducts and holds the output terminal 856 at ground potential between pulses.

The control panel (*cp*) of the computer system shown in FIG. 47 contains basic controls which may be used to operate the computer system. Several groups of neon lamps or lights 299 are located in the panel to allow the operator to monitor the operation of the computer system. Each lamp is connected into a flip-flop circuit as shown in FIG. 24. A group of eleven lamps designated Address Shift Register are connected to the eleven flip-flop circuits in the address shift register 500 of the display the configuration of the address shift register. When the computer system is stopped during performance of an order the address at which the next order is to be found is displayed by these lights. A group of order storage unit via wires 648. These eleven lights eleven lamps designated Address are connected via wires 649 to the five flip-flops in the head storage 551 and to the six flip-flops 552, 553 in the location counter of the address location unit. The HS lights display the contents of the head storage and the LC lights display the contents of the location counter. The configuration displayed by the Address lights is the address associated with an order about to be executed. In certain orders designated "transfer orders" a transfer of information is accomplished without locating an address, so that the configuration of Address lights during performance of this type of order has no useful significance. A group of six lamps designated Operation are connected to flip-flops in the command shift register 501 of the order storage unit via wire 647. These lights display the contents of the command shift register which contains the command code for the order which is to be executed. These lights make it possible to determine visually what the computer system is doing during operation.

A number of switches are provided at the control panel for convenience in operating various units of the system. These switches are connected to the appropriate units. Switches 938 and 962 designated Input which may be a double pole switch are connected to an input device as shown in FIG. 37. Switch 938 is connected in the Can Read line 940 and switch 962 is connected in the Have Read line 961. Operation of these switches connects the input device with the transfer unit. An Input On lamp 963 is connected to switch 962 via capacitor 965. This lamp lights when switches 938, 962 are closed. A switch 968 is connected in the Can Punch line 969 from an output device to the transfer unit. The Output On lamp 944 is connected to this switch via capacitor 945 and indicates when the switch is closed. Lamps 689, 690, and 691 are designated Input Called, Output Called and Stop. These lamps are connected across resistors 680 which may be located in the gate decoder to a DC+ voltage. One terminal of lamp 689 is connected to gate decoder wire *tu*1*w* which terminates at the transfer unit. When this lamp lights it indicates the computer system is waiting for input information. Lamp 690 is connected to gate decoder wire *tu*2*w* which terminates at the transfer unit. When this lamp lights it indicates the computer system is ready to put out information. Switch 968 must be closed to connect the output device to the transfer unit to receive this information. Lamp 691 is connected to the gate wire *st*1*w* which terminates at gate *st*1 of the step counter unit and at the transfer unit. When the operation of the computer system stops while power is applied, the lamp 691 is lighted.

A push-button switch 972, designated Base Code, or R–0 is located at the control panel and is connected by wires 312 and 338 to the gates 300 and 301 in the memory unit and by wire 738 to the gate decoder. When the push button 972 is depressed the negative DC voltage normally applied to gate 300 is removed and applied to gate 301. This operation opens gate 301 and closes gate 300 to cause the base code routine to be read into the memory. When the button 972 is depressed the negative DC voltage is also applied to the gate *me*1 in the memory through lead 738 and the gate decoder gate wire *me*1*w*. This opens gate *me*1 for slightly more than one revolution of the memory drum, to write the whole recording on whatever channel is selected by the head decoder at that time.

Switch 139 designated Memory is connected between the DC+ power source 138 and the plates of the writing tubes 99, 100 in the read-write circuits in the memory. When this switch is opened the writing circuits are off but information can be read into the memory. This prevents altering the contents of the memory due to a "store" order which might appear in the flip-flops of the order storage unit and step counter unit when they are first turned on. Switch 973 designated Power applies DC power when closed to light the tube filaments via line 985 and furnishes power to the computer system via lines 137 and 138.

A double pole switch 693 designated Compute has one terminal connected to line 737 from the gate decoder and another terminal connected to line 159 from the order storage unit. When the Compute switch is thrown to Automatic position to ground lead 737 and open lead 159, the computer system operates automatically. When the Compute switch is in the Manual position shown in FIG. 47, the switch 694 is connected via lead 159 to the flip-flop 519 so that the flip-flop can be set to zero manually by manual operation of switch 694.

A pair of switches 695 and 696 designated BP1 and BP2 and a push button switch 694 designated BP Manual are provided for use in breakpoint operation. Lead 698 is connected from switch 695 to the breakpoint gate 516. Push button switch 694 is connected to the Compute switch. When switch BP1 is thrown gate 515 is opened and when switch BP2 is thrown gate 516 is opened. A lamp 697 designated BP is connected in the circuit of flip-flop 519 via wire 658 and the lamp lights when this flip-flop is set to zero. The flip-flop 519 may be set to zero manually if the computer operation is stopped by pushing the switch 694 so as to cause a breakpoint operation of the system. The breakpoint operation is discussed below.

A push-button switch 980 designated Start is provided to send a start pulse to the step counter unit via wire 641. The switch is normally grounded and is provided with a grounding capacitor 981. Stationary contact 982 is connected via resistor 983 in series with contact 982 and line 641. When the start button is depressed capacitors 981 and 984 charge slowly through resistor 983 providing no pulse to gate ST1. When the start button is released capacitor 981 discharges rapidly through the switch contacts providing a single negative pulse to ST1 through wire 641. Resistor 984' serves to adjust the amplitude of the pulse.

ORDER PROCEDURE

The command code for the present computer system appears below in Table II. The code is given in both the binary and sexadecimal number systems. The computer system uses the binary number system but the sexadecimal system (numbers to radix sixteen) are used for convenience in designation and coding. The several sexadecimal digits and their equivalent binary numbers are as follows:

| Sexadecimal | Binary | Decimal | Sexadecimal | Binary | Decimal |
|---|---|---|---|---|---|
| 0 | 0000 | 0 | 8 | 1000 | 8 |
| 1 | 0001 | 1 | 9 | 1001 | 9 |
| 2 | 0010 | 2 | *a* | 1010 | 10 |
| 3 | 0011 | 3 | *b* | 1011 | 11 |
| 4 | 0100 | 4 | *c* | 1100 | 12 |
| 5 | 0101 | 5 | *d* | 1101 | 13 |
| 6 | 0110 | 6 | *e* | 1110 | 14 |
| 7 | 0111 | 7 | *f* | 1111 | 15 |

The command shift register stores only six of the eight binary digits which are represented by the two sexadecimal digits which comprise the command. The last of these binary digits is irrelevant but the first one is the right-most digit of the address which is associated with the command, corresponding to the right or left half of the word indicated in the address. For example, the unconditional transfer order (*x b*4 and *x*34 in sexadecimal notation or *x* 1011 010– and *x* 0011 010– in binary notation) may be to transfer control to the left half of memory position *x*(*x* 0011 010–) or to the right half of that position (x 1011 010–).

With a particular command in the command shift register the step counter goes through steps S0 to S15. On each step the gate decoder picks out a certain gate decoder wire which, in turn, operates the correct gates for that order and that step. Table I gives the gate decoder output, i.e., the gates called by each gate decoder wire and the command and step number for which each wire is picked out by the gate decoder. In the command code column a dash indicates that the particular digit is irrelevant.

Since the operation of the computer system is cyclic the step which is labeled zero is arbitrary. It is found to be convenient to take as step S0 the step in which the computer system begins to look for the next order. At the beginning of this step the address at which the next order is to be found is stored in the address shift register of the order storage unit. The command code for the order which has just been completed is still stored in the command shift register.

The orders are discussed separately below. A shortened gate decoder output table is included with each order to make the system's operation in the order more easily understood. In the discussion of the orders (*ar*), (*br*) and (*qr*) are to be read as *contents of the a-register*, *contents of the b-register* and *contents of the q-register* respectively. The order procedure for each order ends on the last step given in the order procedure tables. The maximum number of full steps in any order is sixteen S0 to S15). Where provision is made for performance of substeps Y and Z in an order procedure the last substep must be completed before the next step is performed. Steps not listed in the several order procedures are not performed in the present system.

*Table II*

| Command | Binary | Sexadecimal |
|---|---|---|
| Clear *ar*, add | 1101 000_ | *d*0. |
| Clear, subtract | 1101 010_ | *d*4. |
| Clear, add magnitude | 1101 100_ | *d*8. |
| Clear, subtract magnitude | 1101 110_ | *dc*. |
| Add | 1101 0010 | *d*2. |
| Subtract | 1101 0110 | *d*6. |
| Add magnitude | 1101 101_ | *da*. |
| Subtract magnitude | 1101 1110 | *de*. |
| Multiply, no round-off | 1100 001_ | *c*2. |
| Multiply, round-off | 1100 000_ | *c*0. |
| Divide | 1100 10__ | *c*8. |
| Memory to *q*-register | 1100 0100 | *c*4. |
| Store from *qr* | 1000 0100 | 84. |
| Store from *ar* | 1000 1100 | 8*c*. |
| Substitute right/left address | 1/0000 10__ | 88/08. |
| Right shift | 1/0010 00__ | *a*0/20. |
| Left shift | 1/0010 01__ | *a*4/24. |
| Convert, decimal to binary | 1001 ____ | 00090. |
| Print decimal | 0011 00__ | 30. |
| Read one character | 1/0010 1100 | *ad*/2*d*. |
| Print one character | 1/0010 10__ | *a*8/28. |
| Unconditional transfer right/left | 1/0011 010_ | *b*4/34. |
| Conditional transfer right/left | 1/0011 10__ | *b*8/38. |
| Overflow transfer right/left | 1/0011 1100 | *bc*/3*c*. |
| Subroutine transfer right/left | 1/0000 00__ | 80/00. |
| Transfer to address on tape | _110 ____ | *e*0. |
| Ignore | _100 11__ | *cc*/4*c*. |
| Do | _011 011_ | *b*6/36. |
| Do | _111 1___ | *f*8/78. |
| Stop | _111 0___ | *f*0/70. |

CLEAR AR, ADD

| Gate wire | Step No. | Gates called |
|---|---|---|
| W1 | S0 | *al*1*w*, *al*3; *br*1; *os*2*a*, 2*b*, 4. |
| W3 | S1 | *st*3; *al*4. |
| W4 | S2 | *os*1*a*, 1*b*, 1*c*; *st*2, 3. |
| | S3 | |
| W8 | S4 | *al*1*w*; *br*1; *os*2*a*, 2*b*, 3. |
| | S5 | |
| | S6 | |
| | S7 | |
| W14 | S8 | *al*3. |
| W25, W26 | S9 | *al*4; *br*1; *st*3. |
| W27 | S10 | *br*1, 4. |
| | S11 | |
| | S12 | |
| W46, W47 | S13 | *ar*1; *si*5. |
| | S14 | |
| | S15 | |

Order: *xd*0 or *x* 1101 000_

Clear the accumulator register (*ar*) and add the number at memory position *x* into it.

*Step S0.*—Starts on the *s* pulse (step S15 of all orders ends on an *s* pulse). When it is stated that a step starts on a particular pulse, it is meant that the step counter 630 advances during this pulse time. The pulse which advances the step counter belongs to the step out of which the counter is advanced. The first pulse which goes through the gates in the computer system on step S0 is therefore at *t*-time or later. The last pulse is the pulse which advances the step counter, in this case an *s* pulse.

On step S0 then the gate decoder output *al*1*w* operates the parallel transfer circuit 556 which sets the location counter 552, 553 and the head decoder 25 to the same configuration as that stored in the address shift register 500 (the floating address at which this order is to be found). The configuration of the address shift register is not disturbed by this action. This transfer is completed within the first three digit times. The left-most five digits in the address shift register set up the head storage flip-flops 551 and the head decoder enables the correct head 26 at the desired memory track 18. The other six digits place the desired floating address in the location counter. The location pulses, along with the necessary *r* pulse, are next admitted through gates *al*3*a* and *al*3*b*.

The floating address (still in the address shift register) is shifted out of this register and into the *b*-register. Since it is desired to place these digits in the *b*-register at the correct times, address pulses are used as shift pulses. These shift pulses come in through gate *os*2*a* and the output from the shift register to the *b*-register goes through gate *os*2*b*. Gate *br*1 is closed to prevent whatever may have been in the *b*-register prior to this step from being re-written. The address which is shifted out of the shift register also goes back into it through gate *os*4.

Since no step counter gates are called on this step, it lasts for one word time. The next *s* pulse through gate *st*3 (normally open) advances the computer system to step S1. Since the step lasts for a full word time and the address occupies less than one-half a word space, it has been shifted out of the address shift register twice and is written in both the right half and the left half of the *b*-register.

Note that wire W1 of the computer system is called on step S0 regardless of the order code (i.e., all order code digits are irrelevant, see Table I). This means that when the counter configuration is all 0's, the above operations are carried out regardless of what is in the command shift register. As a matter of fact, the command code for this order has not yet been placed in the command shift register, which still contains the command code for the order which has just been carried out.

In the special case of multiplication with round-off (100 000), the round-off operation is actually carried out on step S0 of the next order after the multiplication. In this case both wire W1 and wire W2 are called on step S0.

At the end of step S0 the address shift register 500 contains the floating address of the order being sought. The command shift register 501 contains the command code for the last order carried out. The address location unit contains the difference between the address sought and the present address at which the memory drum is positioned with respect to the called head 26, or 64 plus this difference. The floating address of this order is in both the right half and the left half of the *b*-register.

*Step S1.*—Begins on an *s* pulse. Gate *al*4 allows *h* pulses into the location counter to count to the desired location. Gate *st*3 is closed so the step counter 630 does not advance until the spill-over from the location counter indicates that the address sought has been found. At the end of step S1 the computer has located the floating address and is ready to read its contents into the order storage unit.

*Step S2.*—Starts on the *h*-pulse. Gate *st*2 is opened so that the step ends on the next *h* pulse. On this step it is desired to shift a complete order (command and address) from the located address into the order storage unit. For this reason address and command pulses are used as shift pulses. These pulses open coincidence gates 523, and 529 of the order storage unit at the proper times to allow input from the located address with memory to be shifted into the proper registers. The shift pulses come into the order storage unit through gates *os*1*b* and *os*1*c* while the input from the memory comes through gate *os*1*a*. This step ends on an *h* pulse.

At the end of step S2 the order storage unit contains the address and command code configuration for the present order. The *b*-register still contains in both halves the address at which this order was found.

*Step S3.*—Nothing happens on step S3 for this order. It is necessary however that a blank step be placed at this point in the order procedure. Step S2 ends on an *h* pulse which may or may not coincide with an *s* pulse. To assure that this happens step S3, which ends on an *s* pulse, is used as a buffer step between steps S2 and S4.

*Step S4.*—Wire *al*1*w* transfers or impresses the address from the address shift register 500 to the location counter 552, 553. This transferred address designated memory position *x* is the address which is associated with the present order making up the word contained at the floating address. Gate *os*2*b* shifts the contents of the address shift register into the right half of the *b*-register (see step S0 above). The floating address is shifted from the right half of the *b*-register to the *add ½ to address* box 509. This box adds ½ word to the floating address which was written in the *b*-register, the address at which this order was found. Gate *os*3 then allows the output of the *add ½ to address* box to be shifted into the address shift register. In normal operation of the system this output represents the new floating address at which the next order in the routine is stored. At the end of one half word of this step (which lasts for a full word time) the address shift register contains the new floating address at which the next order is to be found and the right half of the *b*-register contains the address (memory position *x*) associated with the order which is presently being carried out. The left half of the *b*-register contains the first floating address at which the present order was found.

During the next half word of this step the new floating address at which the next order is to be found is shifted out of the address shift register into the left half of the *b*-register and is replaced in the address shift register from the *add ½ to address* box which receives the first floating address from the left half of the *b*-register and adds ½ word to establish a new floating address in the address shift register at the end of this step S4, the address shift register then contains the floating address at which the next order is to be found. This address remains here until step S0 of the next order. The right half of (*br*) contains the address (memory position *x*) associated with this order and left half contains the new floating address at which the next order is to be found. The location counter contains the configuration of memory position *x*. The computer is advanced to step S5 on an *s* pulse through gate *st*3.

*Steps S5, S6 and S7.*—The computer idles during these steps for this order. Each step requires one word time and the step counter is advanced on an *s* pulse through gate ***st*3**.

*Step S8.*—Location pulses are added into the location counter through gate *al*3*a* along with the necessary *r* pulse which passes gate *al*3*b*.

*Step S9.*—Gate *al*4 allows *h* pulses to enter the counter to count to the address required. Gate *st*3 is closed to prevent the advance of the step counter until the location counter spills over. The step ends on an *h* pulse (coincident with an *s* pulse for full word operation). Gate *br*1 is closed to erase (*br*).

*Step S10.*—Gate *br*1 is closed to prevent the contents of *br* from being re-written and gate *br*4 opens to allow the contents of memory position *x* to be written in (*br*). This step ends on an *s* pulse.

*Steps S11 and S12.*—Not used on this order.

*Step S13.*—Gate *ar*1 is closed to prevent the contents of *ar* from being re-written. Gate *si*5 sends a pulse at *t*-time which sets the *add-don't add* box 220 to add. The *complement-don't complement* box 221 is not set to complement. The number from *br* is then added into the accumulator register without any change. The order has been carried out.

*Steps S14 and S15.*—Not used in this order.

CLEAR, SUBTRACT

| Gate wire | Step No. | Gates called |
|---|---|---|
| W39 | S12 | *si*1. |
| W46, W47 | S13 | *ar*1; *si*5. |

Order: *xd*4 or *x* 1101 010.

Clear the accumulator register and subtract the number at memory position *x* from it.

This order procedure is the same as the Clear *ar*, Add up to step S12. At this point the number from memory position *x* has been placed in the *b*-register and is ready to be put into the *a*-register.

*Step S12.*—Gate *si*1 allows the *s* pulse to set the complement box 221 to complement at *t*-time of the next step. The complement digit is also sent to (*ar*).

*Step S13.*—Gate *ar*1 prevents the contents of *ar* from being re-written. Gate *si*5 sets the add box 220 to add and the complement of the contents of *br* is added into (*ar*).

CLEAR, ADD MAGNITUDE

| Gate wire | Step No. | Gates called |
|---|---|---|
| W40 | S12 | *si*3*a*, 3*b*. |
| W46, W47 | S13 | *ar*1, *si*5. |

Order: *xd*8 or *x* 1101 100.

This order is the same as the Clear *ar*, Add order up to step S12. At this point the contents of memory position *x* are in (*br*).

*Step S12.*—Gates *si*3*a* opened. A pulse comes through this gate at *s*-time if $(br)<0$, i.e., if it is desired to add the absolute value of a negative number to the accumulator. This pulse passes through the 1-digit delay 218 and sets the complement box 221 to complement at *t*-time. It also goes to the carry output 185 of the add unit 180 where it is delayed one digit more to $a_{40}$ time and is added to (*ar*). Thus the correction pulse for the complement is added into the *a*-register. Note that each *s*-time the complement box is set to *don't complement*. This makes it necessary to delay the *s* pulse which comes through *si*3 to *t*-time. The complement box is thus set to complement for a single word time.

*Step S13.*—Gate *ar*1 clears the accumulator and gate *si*5 sets the "add" box 220 to add. Thus, if $(br)<0$, the complement of (*br*) is placed in the accumulator. In either case, the absolute value of (*x*) has been placed in *ar*.

CLEAR, SUBTRACT MAGNITUDE

| Gate wire | Step No. | Gates called |
|---|---|---|
| W41 | S12 | *si*2. |
| W46, W47 | S13 | *ar*1; *si*5. |

Order: *xdc* or *x* 1101 110.

Add the negative of the absolute value of the contents of memory position *x* into the cleared accumulator.

This order is carried out in the same manner as order Clear *ar*, Add up to step S12. At this point the contents of memory position *x* have been placed in (*br*) and are ready to be written into (*ar*).

*Step S12.*—Gate *si*2 allows an *s* pulse to set the complement box 221 to *complement* if the contents of *br* are zero or positive. No complement pulse is available if the contents of *br* are negative. The complement of a positive number is the negative of its absolute value. If a negative number is just written in as it stands, this will be the negative of its absolute value.

*Step S13.*—Gate *ar*1 clears the accumulator. Gate *ar*5 allows a *t* pulse to set the add unit 180 to add and the number in (*br*), or its complement, is added into (*ar*).

ADD

| Gate wire | Step No. | Gate called |
|---|---|---|
| W46 | S13 | *si*5. |

Order: *xd*2 or *x* 1101 001.

Add the number at memory position *x* into the accumulator without first clearing it.

This order is the same as the Clear *ar*, Add order up to step S13. At this point the number at memory position *x* is in the *b*-register, the address of the next order is in the address shift register, the command code for this order is in the command shift register.

*Step 13.*—Gate *si*5 sets the sign unit to add the number in (*br*) to the accumulator. Gate *ar*1 is not called so the contents of *ar* and those of *br* are added and written into (*ar*).

SUBTRACT

| Gate wire | Step No. | Gate called |
|---|---|---|
| W46 | S13 | *si*5. |

Order: *xd*6 or *x* 1101 011_

Clear the accumulator and subtract the number at memory position *x* from it.

This order is carried out in the same way as order Clear, Subtract *xd*4 (*x* 1101 010–)except that on step S13 gate *ar*1 is not closed and the complement of the contents of *br* is added to the contents of *ar*.

ADD MAGNITUDE

| Gate wire | Step No. | Gate called |
|---|---|---|
| W46 | S13 | *si*5. |

Order: *xda* or *x* 1101 101_

Add the absolute value of the number at memory position *x* into the accumulator without first clearing it.

This order is the same as the Clear, Add Magnitude order up to step S13. On step S13 gate *ar*1 is not closed so the absolute value of the contents of *br* is added to the number present in (*ar*) and their sum re-written in (*ar*).

SUBTRACT MAGNITUDE

| Gate wire | Step No. | Gate called |
|---|---|---|
| W46 | S13 | *si*5. |

Order: *xde* or *x* 1101 111_

Subtract the absolute value of the contents of memory position *x* from the contents of the accumulator.

This order is carried out in the same way as order Clear, Subtract Magnitude up to step S13. On step S13 gate *ar*1 is not closed and the accumulator is not cleared. The complement of the number in memory position *x* is added to the contents of the *a*-register.

MULTIPLY, NO ROUND OFF; MULTIPLY, ROUND OFF

[See Appendix for theory of multiplication on which these order procedures are based]

| Gate wire | Step No. | Gate called |
|---|---|---|
| W42 | S12 | *al2w*, *ar*1. |
| W48 | S13 | *al*5; *ar*1, 2, 3; *qr*1, 2*a*, 2*b*, 2*c*; *st*3. |
| W51 | S14 | *si*1. |
| W54 | S15 | *ar*1, 2, 3; *qr*1, 2*a*, 2*b*, 2*c*. |

Orders: *xc*2 or *x* 1100 001_ (multiply, no round off)
*xc*0 or *x* 1110 000_ (multiply, round off)

Multiply the number at memory position *x* by the number in (*qr*). The most significant half of the product appears in (*ar*), the least significant half in (*qr*).

These orders proceed in the same way as Clear *ar*, Add up to step S12. At this point the contents of memory position *x* (the multiplicand) is in (*br*). The multiplier has been placed in (*qr*) by a previous order.

*Step S12.*—Gate *ar*1 is closed and the accumulator register is cleared. Gate output wire *al*2*w* sets the location counter to twenty-four. This provides a counter for the forty add and shift steps necessary in multiplication.

*Step S13.*—Gate *st*3 is closed so that the only input to the step counter 630 comes from the location counter 552, 553. Gate *al*5 allows *s* pulses to advance the step counter by one for each word time. This step, therefore, lasts 40 word times. Gates *ar*1 and *ar*2 provide a right shift of one digit in the (*ar*) for each word time. Gate *ar*3 allows the sign digit of the word in (*ar*) to be repeated so that the sign of the contents of *ar* remains constant. Gate *qr*1 and *qr*2*a* provide a right shift of one digit in (*qr*) for each word time. Gate *qr*2*c* allows the least significant digit just shifted out of (*qr*) to set the sign unit to add if it is a 1. Thus (*br*) is added to (*ar*) if the relevant digit in the contents of *qr* (the multiplier) is 1. Otherwise no addition occurs. Gate *qr*2*b* allows the least significant digit in (*ar*) to be written in (*qr*) at *r*-time after a 42 digit delay. The contents of *ar* and *qr* at the end of step S13 are as follows:

(*a*) If the multiplier was positive
(*ar*) = twice (the most significant part of product).
(*qr*) = least significant 39 digits ($a_{-1}$ to $a_{37}$) and sign digits of multiplier ($a_{39}$ and $a_{40}$); $a_{38}=0$.
(*b*) If multiplier was negative
(*ar*) = twice (most significant part of product) plus multiplicand.
(*qr*) = same as part *a* above.

*Step S14.*—Gate *si*1 is opened so that at *t*-time of next word the *complement-don't complement* box 221 is set to complement.

*Step S15.*—Same as step S13 except that it lasts only one word time. If the sign digits of the multiplier were 1's (i.e., if the multiplier was negative), then (*br*) is subtracted from (*ar*) after right shifting (*ar*) once. The contents of *ar* and *qr* are now the same as above for positive multiplier. The most significant sign digit of the multiplier remains in (*qr*) in the least significant place, $a_{40}$.

If the order is to multiply, with round-off *xc*0 (*x* 1100 000–), then on step S0 of the next order (which step is used to start locating the order) gate *ar*6 is also opened by gate wire W2. Gate *ar*6 allows the $a_{-1}$ pulse from (*qr*) which reached the wire to (*ar*) at *t*-time (after a two digit delay) to enter the add unit 180 on the carry wire. It then is delayed one digit more to $a_{40}$ time and is added to (*ar*). The round-off is thus achieved since the most significant digit of the least significant half of the product in (*qr*) appears at $a_{-1}$ time. Here it is to be noted that this round-off pulse goes into the 42 bit delay 201 in the *q*-register at *t*-time of step S15. It is therefore written down in (*qr*) at *r*-time of step S15 and is not available on the *qr-ar* line 208 until 46 digit times following *r*-time of step S15. This is *t*-time of step S1. Gate *ar*6 is accordingly slowed down in its operation so that it does not open until some time after *t*-time on step S0 and does not close until some time later than *t*-time of step S1.

DIVIDE

[See Appendix for theory of division on which this order procedure is based]

| Gate wire | Step No. | Gates called |
|---|---|---|
| | S11 | |
| W43 | S12 | *qr*1; *si*4; *al*2*w*. |
| W49 | S13 | *si*4, 5. |
| W52 | S14 | *ar*1, 4; *qr*1, 3, 4; *si*4, 5. |
| W55 | S15 | *al*5; *ar*1, 4; *qr*1, 3; *si*4, 5; *st*3. |

Order: *xc*8 or *x* 1100 10_ _

Divide the number in the *a*-register by the number in memory position *x* and store the quotient in the *q*-register.

This order is carried out in the same way as the Clear *ar*, Add order up to step S11. At this point the address *x* has been located and the contents of address *x* has been place in (*br*). Thus the divisor is in (*br*), and the dividend is in the contents of *ar* (placed thereby a previous order).

*Step S11.*—The computer does nothing on this step.

*Step S12.*—Gate decoder output wire *al*2*w* is called to set the location counter to twenty-four. Gate *qr*1 is closed and the previous contents of *qr* are erased. Gate *si*4 sends a pulse to the *complement box* 221 to set it to complement if the sign of (*ar*) is the same as that of (*br*), i.e., if $u_0=a_0$ (see Appendix).

*Step S13.*—Gate *si*5 sets the add box 220 to add either (*br*) or negative of (*br*) to (*ar*) depending on $e_0$; i.e., this step computes $Z''_1=Z''_0-(2e_0-1)x'$.

$e_0$ is not written in (*qr*). $u_1$ and $a_0$ are compared and a complement signal is sent to the complement box 221 if they are equal.

*Step S14.*—The combination of gates *ar*1 and *ar*4 cause a left shift of (*ar*) by 1 binary digit; i.e., (*ar*) is multiplied by two. Gates *qr*1, *qr*3, cause $e_1$ to be written in (*qr*). Since the pulse representing *e* (0 if $u_1 \neq a_0$ and 1 if $u_1 = a_0$) comes from the sign unit to (*qr*) at *t*-time, it goes through the 1 bit delay 218 and is placed in (*qr*) at $a_{40}$ time. Since $e_1$ is the sign digit in the quotient and since proper words in the computer system have two sign digits the same, it is necessary to write $e_1$ twice. Gate *qr*4 is therefore also opened and $e_1$ is also written at $a_{39}$ time through another 1 bit delay 202. Gates *si*4 and *si*5 operate in the same way as in step S13 above. $Z''_2$ is now in (*ar*).

*Step S15.*—This step lasts 40 word times, since gate *st*3 is closed and the location counter was set to twenty-four in step S12. $Z''_3$ through $Z''_{42}$ thus calculated are in (*ar*), $e_2$ through $e_{41}$ are placed in (*qr*) through gate *qr*3. The previous contents of (*qr*) are left shifted once each time to make room for $e_n$ at $a_{40}$ time. Gate *qr*4 is not open, so each $e_n$ is written only once. At the end of this step the quotient is in (*qr*) and $Z''_{42}$ is in (*ar*).

MEMORY TO Q-REGISTER

| Gate wire | Step No. | Gate called |
|---|---|---|
| W44 | S12 | *qr*1, 5. |

Order: *x*c4 or *x* 1101 01--

Transfer the contents of memory position *x* to the *q*-register.

This order is carried out in the same way as order Clear *ar*, Add up to step S12. At this point the number at memory position *x* has been placed in the *b*-register and is ready to be transferred to the *q*-register.

*Step S12.*—Gate *qr*5 is opened to allow the contents of *br* to be written into (*qr*). Gate *qr*1 is closed to prevent whatever was in (*qr*) from being re-written.

*Step S13.*—Not used in this order.

STORE FROM Q-REGISTER

| Gate wire | Step No. | Gates called |
|---|---|---|
| W14, W15 | S8 | *al*3; *br*1, 3. |
| W26 | S9 | *al*4; *st*3. |
| W29 | S10 | *me*1. |

Order: *x*84 or *x* 1000 01--

Transfer the contents of the *q*-register to memory position *x*.

This order is carried out in the same manner as order Clear *ar*, Add up to step S8. At this point the address of the next order is in the address shift register 500, the address associated with this order (the address at which the contents of the *q*-register are to be stored) is in the right half of (*br*) and in the head store 551 and location counter 552, 553. The address of the next order is in the left half of (*br*) and the address shift register. The command shift register 501 contains the command code for this order.

*Step S8.*—Gate *al*3 allows the location pulses to be added into the location counter. Gate *br*1 erases the contents of *br* and gate *br*3 is opened to allow the contents of *qr* to be written into (*br*).

*Step S9.*—Gate *st*3 is closed to prevent the step counter 630 from advancing until the address location counter spills over. Gate *al*4 allows *h* pulses into the location counter to count to memory position *x*. At the end of this step the computer is ready to write the contents of *br* into this memory position.

*Step S10.*—Gate *me*1 is opened to allow the α pulses into the write 1, write 0 unit 313. This unit consists essentially of three-way coincidence circuits which write a 1 at E-time when a pulse comes in from the α track and a 1 comes from (*br*) through gate 300. A 0 is written if only α and E pulses are present. No writing is done at all if the α pulses do not come in. The number in (*br*) is therefore written into memory position *x*.

*Steps S11, S15.*—Not used in this order.

STORE FROM AR

| Gate wire | Step No. | Gates called |
|---|---|---|
| W14, W16 | S8 | *al*3; *br*1, 2. |
| W26 | S9 | *al*4; *st*3. |
| W29 | S10 | *me*1. |

Order *x*8c or *x* 1000 11--

Transfer the contents of the accumulator register to memory position *x*.

This order is the same as Store From *qr* except that on step 8, gate *br*2 is called instead of gate *br*3. Gate *br*2 allows the contents of the accumulator register to be read into the *b*-register. From there the information goes to the memory.

SUBSTITUTE LEFT ADDRESS; SUBSTITUTE RIGHT ADDRESS

| Gate wire | Step No. | Gate called |
|---|---|---|
| W28 | S10 | *me*2; *st*2, 3. |

Orders: *x*08 or *x* 0000 10-- (substitute left address)
*x*88 or *x* 1000 10-- (substitute right address)

Transfer the address digits in the left (0000 10--) or right (1000 10--) half of the accumulator to the left or right half of memory position *x*. Do not alter other digits of memory position *x*.

This order is the same as the *x*8*c* order Store From *ar*, step S10.

*Step S10.*—Gate *me*2 is opened to allow address pulses to actuate the write unit 313. Writing is therefore done only at times which correspond to address times (the address pulses are one digit early for reasons heretofore explained. Gate *st*2 is open, so this step lasts only one-half a word time. Therefore the address in the relevant *half* of the accumulator is transferred to the memory.

RIGHT SHIFT

| Gate wire | Step No. | Gates called |
|---|---|---|
| W19 | S5, S6, S7<br>S8<br>S9–S15 | *al*5; *ar*1, 2, 3; *st*3. |

Orders: *xa*0 or *x* 1010 00--
*x*20 or *x* 0010 00--

Right shift, i.e., halve the contents of *ar* N times. The value of N depends on *x* and whether the order is *xa*0 or *x*20.

This order is the same as order Clear *ar*, Add (*xd*0) up through step S4. At this point the address associated with the order is in the location counter and the address at which the next order is to be found is in the address shift register.

*Steps S5, S6, and S7.*—These steps are not used in this order.

*Step S8.*—Gate *st*3 is closed, so this step lasts until the location counter 552, 553 spills over. Gate *al*5 allows *s* pulses to advance the location counter. Since location pulses have not been added to the counter, its configuration is still that indicated by the address associated with this order. Therefore, if it is filled up with ones (corresponding to address *fff* and the order *ao*) the first *s* pulse will spill it over. If the right-most digit is 0, and the rest are ones, (corresponding to address *fff* and order 20), two *s* pulses are required to cause a spill-over. If the order is *ffeao*, three *s* pulses are required, etc.

For each word time the contents of *ar* are shifted right one place, i.e., the number in the *a*-register has been halved. This is accomplished by gates *ar*1, *ar*2 and *ar*3. Gate *ar*3 is opened so that the sign digit is repeated. Otherwise a negative number would become positive after two right shifts.

*Steps S9 through S15.*—These steps are not used in this order.

LEFT SHIFT

| Gate wire | Step No. | Gate called |
|---|---|---|
| W22 | S8 | *al*5; *ar*1, 4; *st*3. |

Orders: *x*24 or *x* 1010 01..
*x*24 or *x* 0010 01..

Left shift, i.e., double the contents of the *a*-register N times, where N depends on the address and whether the order is *xa*4 or *x*24.

This order is the same as the order Right Shift (*xa*0 up to step S8.

*Step S8.*—Gate *st*3 and *al*5 have the same function as in step *S8* of the *xa*0 order. A left shift of one place is obtained each word time through gates *ar*1 and *ar*5. The contents of *ar* are delayed one extra digit each time they are rewritten through gate *ar*4.

CONVERT, DECIMAL TO BINARY

| Gate wire | Step No. | Gates called |
|---|---|---|
| W26 | S9 | *al*4; *st*3. |
| W30 | S10 | *al*2*w*; *ar*1; *br*1, 5. |
| W33 | S11 | *al*5; *br*1, 5; *qr*1, 2*a*, 2*b*, 2*c*; *st*3. |
| W45 | S12 | *br*1, 2; *si*1. |
| W50 | S13 | *qr*1, 2*a*, 2*b*, 2*c*; *si*1. |
| W53 | S14 | *qr*1, 2*a*, 2*b*, 2*c*. |

Order: 00090 or ..00 0000 0000 1001 ....

Convert the binary coded decimal number in (*qr*) to a binary number and store the binary number in (*ar*).

Numbers are entered into the computer system in a binary coded decimal form as the sign of the number plus its absolute value. The problem is therefore to change from this form to the binary equivalent. An example of the way this is done:

Suppose the number —.98723157 is to be put in the computer. Note that this number has only eight decimal digits plus sign, while the capacity of the present system is more than twelve decimal digits plus sign. The reason for this will be seen below. The number will be in the *q*-register in the form:

| | | | | | | | | | | |
|---|---|---|---|---|---|---|---|---|---|---|
| 11 | 1001 | 1000 | 0111 | 0010 | 0011 | 0001 | 0101 | 0111 | 0000 | 0000 |
| - | 9 | 8 | 7 | 2 | 3 | 1 | 5 | 7 | 0 | 0 |

Let us examine what this means. The right-most decimal digit 7 in the number has the value $7\times10^{-8}$. If we look at the 4 bit binary representation the right-most digit 1 has the value $1\times10^{-8}$, the next digit 1 to the left has a value $2\times10^{-8}$, the next value of $4\times10^{-8}$, and finally if a 1 digit were present in the next position, its value would be $8\times10^{-8}$. The decimal digit 5 has a value of $5\times10^{-7}$. Therefore the right-most digit 1 in the binary representation for the decimal digit 5 has a value of $1\times10^{-7}$, etc.

The conversion procedure is thus to store on one fixed pulse track (the decimal-binary conversion track) the binary equivalents of $1\times10^{-8}$, $2\times10^{-8}$, $4\times10^{-8}$, $8\times10^{-8}$, $1\times10^{-7}$, $2\times10^{-7}$, $4\times10^{-7}$, $8\times10^{-7}$, $1\times10^{-6}$, etc. up to $8\times10^{-1}$. The number in the *q*-registers is now examined, digit by digit. If a 1 digit appears in the space represented by the $1\times10^{-8}$, the binary equivalent of this number is added into the accumulator register from the decimal-binary conversion track. The next digit in (*qr*) is then examined and the binary equivalent added if this digit is a one, or not added if it is a zero. This process is continued until thirty-two digits have been examined. Thirty-two is the limit because of the present thirty-two word limit on a single track in the memory.

If the number in the *q*-register was positive, the *a*-register now contains the binary equivalent of the number. However, if the number in (*qr*) was negative, the *a*-register contains the binary equivalent of the absolute value of the number. In order to convert this number to the standard form used in the present system for negative numbers, it is necessary to take the one's complement of this number. The way in which the computer performs this operation will be described below.

This order is carried out in the same manner as order Clear *ar* Add (*xd*0) up to step S10 except that on step S9 wire W25 does not call gate *br*1. At this point the address associated with the order (in this case address 000) has been located.

*Step S10.*—Gate decoder wire *al*2*w* sets the address location counter to count 24. Gate *ar*1 is closed to clear the accumulator. Gate *br*1 clears the *b*-register and gate *br*5 is opened to allow the word on the decimal-binary conversion track at address 000 to be written in (*br*). This step lasts for one word time.

*Step S11.*—Gate *st*3 is closed so this step lasts for 40 word times. Gates *br*1, *br*5 allow the contents of the next word from the decimal-binary conversion track to replace the one now in (*br*). Gates *qr*1, *qr*2*a*, 2*b*, 2*c*, right shift the *q*-register once for each word time and send the digit which spills out the right end to the sign unit. This digit sets the sign unit to add the contents of the *b*-register to the contents of the *a*-register if it is a one. If it is a zero, no addition occurs (see discussion of decimal-binary conversion above). It should be noted that the first eight digits spilled from the *q*-register are always zeros. The first significant digit in the *q*-register is thus the ninth digit. Therefore, the number in the ninth position after 000 (word WP 24) on the decimal-binary conversion track must contain the binary equivalent of $1\times10^{-8}$, word WP 23 the binary equivalent of $2\times10^{-8}$, etc. At the end of this step the binary equivalent of the absolute value of the number is in the *a*-register, and the sign digits of the number in the *q*-register occupy positions $a_{39}$ and $a_{40}$.

*Step S12.*—This step lasts one word time. Gate *br*1 erases the contents of *br* and gate *br*2 allows the contents of *ar* to be written in (*br*). Gate *si*1 sets the sign unit so the contents of the *b*-register will be complemented as it goes to (*ar*) during the next word time.

*Step S13.*—If digit $a_{40}$ of the *q*-register (least significant sign digit) is a 1, then the complement of (*br*) is added to (*ar*) and the sum (=0) is placed in (*ar*). If digit $a_{40}$ of the *q*-register is zero, the contents of *ar* are unaltered. Gates *qr*1, *qr*2*a*, 2*b*, 2*c* shift the contents of the *q*-register once more to the right. Gate *si*1 sets the sign unit to complement again on the next step.

*Step S14.*—If digit $a_{40}$ of the *q*-register is a 1 (most significant sign digit) the complement of (*br*) is added to (*ar*) and the sum is stored in the *a*-register. If both sign digits are 1, i.e., if the number in (*qr*) was negative, then at the end of this step the complement of the absolute value of the binary equivalent of the number which was in (*qr*) is now in (*ar*). The binary equivalent of the binary coded decimal number in (*qr*) has been placed in (*ar*). It should be pointed out that:

(1) The contents of *qr* have been destroyed in this operation.

(2) The address of this order must be 000. Any address other than 000 is equivalent to a binary shift of the contents of *qr* before performing the order.

(3) The last two decimal digits in *qr* must be zero. Otherwise, decimal digit No. 9 will be added to decimal digit No. 1 and decimal digit No. 10 will be added to decimal digit No. 2.

(4) The two sign digits in (*qr*) before performing this order must be the same. Otherwise the result of this order will be zero in both (*ar*) and (*qr*).

PRINT DECIMAL

| Gate wire | Step No. | Gates called |
|---|---|---|
| W21 | S8 | *br*1, 2; *si*3*a*, 3*b*; *tu*5. |
| W23 | S9 | *ar*1; *si*5. |
| W36 | S10 | *ar*1, 4, 5. |
| W38 | S11 | *st*3, *tu*2*w*. |
| W37, W38 | S11Y | *al*5; *ar*1, 2, 5; *st*3; *tu*2*w*, 3. |
| W34, W38 | S11Z | *al*5; *st*3; *tu*2*w*, 3. |

Order: *x*30 or *x* 0011 00__

Convert the binary number in (*ar*) to binary coded decimal form and print N decimal characters (N depends on *x*).

This order is carried out in the same way as the order Clear *ar*, Add through step S7. At this point the address at which the next order is to be found is in the address shift register, and the address associated with this order is in the address location counter.

The process of converting a binary number to decimal is two-fold. First, it is desired to print the decimal number as a sign plus absolute value instead of the complement form in which binary numbers are stored in the computer. It is therefore necessary to replace the number in (*ar*) by its absolute value after having set up the transfer shift register 700, 701 to print the sign of the number. Second, it is necessary to convert the binary representation of the absolute value to its binary coded decimal representation and use four digits at a time to operate the output device such as punch, typewriter, etc. This step is accomplished by multiplying the number in (*ar*) by 10 and using the four digits which spill from the *a*-register to operate the output device. The manner in which these steps are accomplished is described in detail below.

*Step S8.*—The four-digit shift register 700 in the transfer unit is cleared by the address digits through gate *tu*5. The two-digit shift register 701 is filled with 1's through gate *si*3*b*. Gate *br*2 is opened and (*ar*) is written in the contents of *br* (gate *br*1 is closed to erase the former contents of *br*). The sign digit (digit at *r*-time) also goes from (*br*) to the sign unit. If this digit is one (i.e., if $(ar)<0$), the complement box 221 is set to complement through gate *si*3*a*. Thus the absolute value of (*br*) will be written in (*ar*) on the next step (see discussion of *xd*8 order). Also a pulse at *t*-time of the next word time will be sent to the transfer unit to set the four-digit shift register to 15 (if $(ar)<0$). Thus after this *t*-pulse (actually the *t*-pulse belonging to step *S*9) the configuration of the transfer shift register will be:

$$000011 \text{ if } (ar)>0$$
$$111111 \text{ if } (ar)<0$$

These configurations are just those necessary to print + and − respectively.

*Step S9.*—Gate *ar*1 clears *ar* of its former contents and gate *si*5 allows the absolute value of (*br*) to replace them. (See discussion of the order Clear, Add, Magnitude, *xd*8.)

*Step S10.*—Gates *ar*1, *ar*4, and *ar*5, provide a left shift of two places in the contents of *ar* (see description of order Print One Digit, *xa*8). The two digits shifted out are the sign digits and they are by now both zero. The sign has already been set up in step S8.

*Step S11.*—The contents of the transfer shift register are printed and the YZ register 702 is set to Y as described in the discussion of the transfer unit.

*Step S11Y.*—Gates *ar*1, *ar*2, and *ar*5 provide a multiplication of (*ar*) by 2.5. This may be seen as follows: Gates *ar*1 and *ar*2 provide a right shift of (*ar*) of 1 digit place. Gate *ar*3 is not called because this number has no sign digits to be repeated. The result, i.e., ½(*ar*), enters the add unit input 182. The output of gate *ar*5, i.e., 2(*ar*), enters add unit input 183. The sum, $2(ar)+\frac{1}{2}(ar)=2.5(ar)$ then comes out of the add unit, the digits at *s*-time and *t*-time (i.e., those digits which have spilled over) going into the transfer shift register 700, 701 after a one-digit delay. Gate *tu*3 is open and *s* and *t* pulses shift the spill-over from (*ar*) into the 1 and 2 positions in the tranfer shift register. Gate *st*3 is closed and the step counter is not stepped to count 12 until the location counter spills over. Gate *al*5 is open and one *s* pulse is added into the location counter. At the end of one word time the YZ shift register is shifted to Z.

*Step S11Z.*—On this step the contents of *ar* are multiplied by 4 and the two digits which overflow are shifted into the $P_1$ and $P_2$ flip-flop positions of the six available positions in the transfer shift register. The two digits which were in the $P_1$ and $P_2$ positions are shifted to the $P_3$ and $P_4$ positions. The *s* pulse which ends this word time clears the YZ shift register, and the computer system reverts to step S11 where the contents of the transfer shift register are punched or printed. The cycle then repeats steps S11Y, S11Z, S11, etc. until a spill-over from the location counter steps the computer system to step S12.

*Steps S12 through S15.*—These steps are not used on this order.

READ ONE CHARACTER

| Gate wire | Step No. | Gates called |
|---|---|---|
| W18 | S8 | *st*1, 3; *tu*1*w*. |
| W18, W20 | S8Y | *st*1, 2, 3; *tu*1*w*. |
| W35 | S10 | *al*5; *qr*1, 4; *st*3; *tu*4, 7. |

Order: *xad* or *x* 1010 110_ or *x*2*d* or *x* 0010 110_

Place next character from tape or typewriter in the *q*-register; shift the contents of *qr* right N places to make room for this digit. (N depends on *x*.) If $N>6$, six bits come from the input device and the rest are 0's.

In an *x*2*d* order gate *tu*7 is called but the shifting pulses come through gate *tu*4. This gate unlike gate *tu*3 opens fast enough to pass shifting pulses at *t*-time and $a_{40}$ time. The first two pulses shifted out correspond to tape code holes P–3 and P–4 in that order. These two pulses are then delayed one more digit time and put into the *q*-register, the pulse representing hole P–3 becomes $a_{40}$ and the pulse representing hole P–4 becomes $a_{39}$. If these pulses are then shifted to the left two digits and two more shift pulses come through gate *tu*4, tape code bits No. 1 and No. 2 come out of transfer unit shift register. Bit No. 1 becomes $a_{40}$, bit No. 2 becomes $a_{39}$, bit No. 3 becomes $a_{38}$ and bit No. 4 becomes $a_{37}$. Thus one sexadecimal digit is placed correctly into the right-hand end of the *q*-register.

This order is carried out in the same manner as a Clear *ar*, Add order up through step S7. At this point the address shift register contains the address at which the next order is to be found and the address location unit contains the address *x* associated with this order.

*Step S8.*—Gate decoder wire *tu*1*w* calls for the tape reader. Gate *st*1 allows the input device to set the YZ shift register to Y during the reading cycle. Gate *st*3 is closed to prevent the computer system from stepping on to step S9.

*Step S8Y.*—Gate *st*2 is opened and this step ends on the next *h* pulse. NOTE.—Since gate *st*1 is open on step S8 and since step S8Y is a sub-step in the order procedure depressing the Start button on the control panel at this point will put whatever is in the transfer shift register 700, 701 into the *q*-register.

*Step S9.*—This step is not used in this order.

*Step S10.*—Gate *st*3 is closed. This step ends when the address location counter spills over; gate *al*5 allows *s* pulses to advance the location counter. This step therefore lasts for a number of word times which is dependent on the address associated with the order; see discussion of the *xa*0 order, Right Shift.

Gate *tu*4 allows *s* and *t* pulses to shift the contents of the four-digit shift register out at $a_{40}$ time and *t*-time (after passing through the one-digit delay). These two digits go into *qr* at $a_{39}$ and $a_{40}$ times through gate *qr*4 and a one-digit delay 718. Gate *qr*1 is closed and the previous contents of *qr* are shifted left two digits to make room for the incoming two digits. Note that digit No. 3 from position $P_3$ is shifted out of the shift register first and goes into $a_{40}$; digit No. 4 from position $P_4$ goes into position $a_{39}$.

Gate *tu*7 is open and digits Nos. 5 and 6 occupy the positions $P_1$ and $P_2$ previously occupied by digits Nos. 1 and 2. Digits Nos. 1 and 2 are shifted into the positions $P_3$ and $P_4$ formerly occupied by digits Nos. 3 and 4. After one word time the configuration of the transfer shift register 700, 701 is as shown in FIG. 48 and *qr* contains:

$a_{39}$—digit No. 4
$a_{40}$—digit No. 3

At the end of the next word time (if this step lasts two word times) the transfer shift register contains:

| | | | | | | |
|---|---|---|---|---|---|---|
| | 0 | 0 | 6 | 5 | 0 | 0 |
| in positions: | $P_2$ | $P_1$ | $P_4$ | $P_3$ | $P_6$ | $P_5$ |

and *qr* contains:

$a_{37}$—digit No. 4
$a_{38}$—digit No. 3
$a_{39}$—digit No. 2
$a_{40}$—digit No. 1

If the input character was a number—sexadecimal (0–*f*) or decimal (0–9) the content of the *q*-register is in the correct order, i.e., the most significant digit is on the left and the least significant on the right. Digits Nos. 5 and 6 are both zero for these characters. If the input is an alphabetic character the fifth and sixth digits appear to the right of digits Nos. 4, 3, 2 and 1, i.e., after three word times the transfer shift register contains all zeros, and *qr* contains:

$a_{35}$—digit No. 4
$a_{36}$—digit No. 3
$a_{37}$—digit No. 2
$a_{38}$—digit No. 1
$a_{39}$—digit No. 6
$a_{40}$—digit No. 5

For each word time after three the contents of *qr* are left shifted twice. Therefore the final position of the character in (*qr*) is determined by the number of word times employed in this step and this number in turn depends on the address associated with this order.

PRINT ONE CHARACTER

| Gate wire | Step No. | Gates called |
|---|---|---|
| W17 | S8 | *tu*5*a*, 5*b*. |
| W24 | S9 | *al*5; *ar*1, 4, 5; *st*3; *tu*3, 6. |
| W31 | S10 | *st*3; *tu*2*w*, 6. |
| W31, W32 | S10Y | *st*2, 3; *tu*2*w*, 6. |

Orders: *xa*8 or *x* 1010 10__; *x*28 or *x* 0010 10__

Left shift the contents of *ar* N times (n depends on *x*) into the transfer shift register and print the character which is determined by the last six digits to be shifted out.

This order is carried out in the same manner as order *xd*0 up to step *S*8. At this point the address at which the next order is to be found is in the address shift register and the address associated with this order is in the location counter.

*Step S8.*—Gate *st*3 is closed and gate *al*5 is open. This step therefore lasts until the locations counter spills over—the number of word times depending on the address (see order *xa*0 above). For each word time the contents of *ar* are left shifted twice. Gate *ar*4 provides one left shift through the one digit delay. This is equivalent to multiplication by two, and this signal enters add unit input 182. Another multiplication by two is provided by the same signal through gate *ar*5. This signal enters add unit 182 and is added to the above signal. The addition then provides a multiplication by four which is equivalent to two left shifts. The two most significant digits in (*ar*) at *r*-time and $a_0$-time, are thus shifted to *t*-time and *s*-time respectively. These digits go through a further delay of one digit and arrive at coincidence gate 711 in the transfer unit at $a_{40}$ time and *t*-time. Gate 711 is opened at these times by *s* and *t* pulses which go through a one digit delay 718. Gate 712 is opened by these *s* and *t* pulses through gate *tu*3 and a one digit delay 719. The contents of the shift register are shifted two places to the right to leave space for the two input pulses. Note that the $a_0$ pulse from (*ar*) is the first pulse which enters the shift register and the *r* pulse is second. These pulses are again reversed in pairs and the flip-flops in the shift register 700, 701 are connected to the magnet actuators MA accordingly.

Thus for each word time which this step lasts two digits are shifted from (*ar*) into the transfer shift register. The last six digits which are shifted out are left in the shift register.

*Step S10.*—Gate *st*3 is closed to prevent stepping the computer system on until the character has been printed. Gate decoder wire *tu*2*w* operates the magnet actuators 730 and sets the Y—Z shift register 702 to Y as described in the discussion of the transfer unit.

*Step S10Y.*—Gate *st*2 is opened and the step counter is stepped on to step S11 by the next *h*-pulse.

UNCONDITIONAL TRANSFER LEFT; UNCONDITIONAL TRANSFER RIGHT

| Gate wire | Step No. | Gates called |
|---|---|---|
| W5 | S3 | *st*4. |
| W8 | S4 | *al*1*w*; *os*2, 3; *br*1. |

Orders: *x*34 or *x* 0011 010_ (Transfer Left)
*xb*4 or *x* 1011 010_ (Transfer Right)

Find the next order to be carried out in the left half (34) of **word position *x* or in the right half (*b*4) of** word position *x*.

This order proceeds in the same manner as the *xd*0 order up to step S3. At the end of step S2 the order has been located and the order storage unit contains the address *x* in the address shift register and the order code 34 in the command shift register. The *b*-register contains in both the right and left halves the address at which this order was found.

*Step S3.*—Gate *st*4 is opened. This allows an *r* pulse to advance the step counter to step S4.

*Step S4.*—Step S4 normally lasts one word time since gate *st*3 is open on this step. But in this case since the step counter 630 has advanced to step 4 on an *r* pulse the *s* pulse which follows this *r* pulse immediately advances the step counter to step S5. Thus step S4, which normally sets the address shift register to an address which is the half-word immediately following the address of the present order (see description of order *xd*0, above), is in effect by-passed, and the address left in the address shift register is the address associated with the transfer order. The transfer of control has thus been accomplished.

CONDITIONAL TRANSFER LEFT; CONDITIONAL TRANSFER RIGHT

| Gate wire | Step No. | Gates called |
|---|---|---|
| W6 | S3 | *st*5. |
| W8 | S4 | *al*1*w*; *br*1; *os*2*a*, 2*b*, 3. |

Orders: *x*38 or *x* 0011 10__ (Transfer Left)
*xb*8 or *x* 1011 10__ (Transfer Right)

If the number in the *a*-register is negative carry out the *x*34 or *xb*4 order.

This order proceeds in the same manner as all others up to step S3. At the end of step S2 the order has been located and the order storage unit contains the address $x$ in the address shift register and the command code 34 in the command shift register. The $b$-register contains in both the right and left halves the address at which this order was found.

*Step S3.*—Gate *st*5 is opened. If the number in the $a$-register is negative (i.e., $a_{-1}$ is a 1) the pulse at $a_{-1}$ time is delayed to $s$-time in *ar*, passes through gate *st*5, and coincidence gate 643, and is delayed again to $t$-time of step S4 when it advances the step counter 630 to step S5.

*Step S4.*—Starts at $s$-time and ends at $t$-time, if the number in the $a$-register is negative. Thus if the number in the $a$-register is negative step S4 is in effect bypassed and the transfer of control has been accomplished as in the $x34$ order.

OVERFLOW TRANSFER LEFT; OVERFLOW TRANSFER RIGHT

| Gate wire | Step No. | Gates called |
|---|---|---|
| W7 | S3 | *st*6. |
| W8 | S4 | *al*1*w*; *os*2*a*, 2*b*, 3; *br*1. |

Orders: $x3c$ or $x$ 0011 1100 (Transfer Left)
$xbc$ or $x$ 1011 1100 (Transfer Right)

If $1 \leqslant (ar) < 2$ or $-2 \leqslant (ar) < -1$ then perform the order $x34$ or $xb4$. If not go on to next order.

This order is carried out in the same manner as the $x38$ order except that in step S3 the contents of the $a$-register now goes through gate *st*6 to the overflow check box 636. A pulse comes out of this box at $s$-time if the sign digits are different, i.e., if $(ar)$ is an improper number. The pulse from the overflow check box now acts in the same fashion as the sign digit does in order $x38$ above.

SUBROUTINE TRANSFER LEFT; SUBROUTINE TRANSFER RIGHT

| Gate wire | Step No. | Gates called |
|---|---|---|
| W9 | S5 | *os*2*a*, 2*b*, 3; *st*2, 3; *br*1. |
| | S6, S7 | |
| W14 | S8 | *al*3. |
| W26 | S9 | *al*4; *st*3. |
| W28 | S10 | *me*2; *st*2, 3. |

Orders: $x00$ or $x$ 0000 00__ (Transfer Left)
$x80$ or $x$ 10000 00__ (Transfer Right)

Store the address at which the next order would normally be found in the left half ($x00$) or right half ($x80$) of memory position $x$ and transfer control to the halfword next after the storage location.

This order is the subroutine transfer order which allows the computer system to re-enter the main routine after going through a sub-routine. The order automatically does an address substitution in the first order of the subroutine, which is usually an unconditional transfer order. The address to be substituted is the address at which the next order would normally be found in the main routine (i.e., the address at which this order was found plus one-half). If all subroutines have as their last order an unconditional transfer to the first order in the subroutine, a transfer back to the main routine take place.

This order is carried out in the same way as order $xd0$ up to step S5. At this point the address shift register 500 contains the address at which the next order would normally be found, the shift register 501 contains the command code for this order, i.e., 00, and the $b$-register has the address $x$ in the right half and the address at which the next order would normally be found in the left half. The head storage 551 and location counter 552, 553 also contain the address $x$.

*Step S5.*—This step starts on an $s$ pulse and ends on the next $h$ pulse (gate *st*2 is open). Gate *br*1 erases the contents of the right half of $(br)$. These are replaced through gates *os*2*a* and 2*b* by the address at which the next order would normally be found. The address $x+\frac{1}{2}$ is placed in the address shift register through the *add ½ to address* box 509 and gate *os*3. At the end of this step the address shift register is set to $x+\frac{1}{2}$ and $(br)$ contains the address at which the next order in the main routine is to be found.

*Steps S6 and S7.*—These steps are not used on this order.

*Step S8.*—Location pulses are added to the location counter 552, 553 through gate *al*3.

*Step S9.*—The address $x$ is located on this step (see order $xd0$).

*Step 10.*—The address digits in the relevant half of $(br)$ are written in memory position $x$ (see order $x88$).

TRANSFER TO ADDRESS ON TAPE

| Gate wire | Step No. | Gates called |
|---|---|---|
| W11 | S6 | *st*1, 3; *tu*1*w*. |
| W11, W13 | S6Y | *br*1, *st*1, 2, 3; *os*2*a*, 2*b*; *tu*1*w*, 5*a*, 5*b*, 7. |

Order: $e0$ or – –110 ____

Transfer the next digit from tape or typewriter to the address shift register 500. Obtain the next order from the address which is represented by these digits. The address of this order is irrelevant.

This order is carried out in the same way as order $xd0$ through step S5. In the $e0$ order, six bits in the transfer shift register are shifted into the address shift register by means of eleven shift pulses from gates *tu*5*a*. Gate *tu*7 connects the shift register so that the two bits corresponding to tape code holes P–5 and P–6 shift through the four bit shift register 700 and are the last two bits out of the shift register. Thus the bits come out of the transfer shift register in the time sequence $P_3$, $P_4$, $P_1$, $P_2$, $P_5$, $P_6$.

At the end of step S5 the address at which the next order would normally be found is in the address shift register and the address associated with the order (irrelevant) is in the head storage and the location counter.

*Step S6.*—Gate decoder wire *tu*1*w* calls for information from the input device. Wire *st*1*w* allows the input device to set the YZ shift register to Y during the reading cycle. Gate *st*3 is closed to prevent the computer system from stepping on to step S7.

*Step S6Y.*—Gate *st*2 is opened so this step lasts one half word time. Gate *tu*5 allows address digits to shift the contents of the transfer shift register out in the digital order $P_3$, $P_4$, $P_1$, $P_2$, $P_5$, $P_6$. Digits $P_5$ and $P_6$ pass to the four digit shift register 700 through gate *tu*7. Gate *os*2 allows the output from the transfer shift register to be shifted into the address shift register and the former contents of the address shift register to be written in $(br)$. The six bits from the transfer unit shift register are shifted into the right most six places in the address shift register. The left most five positions are filled up with zeros. Since these five digits are the ones which operate the head decoder, head 00 is always chosen by this order. The address shift register configuration is:

| | | | | | | | | | |
|---|---|---|---|---|---|---|---|---|---|
| 0 | 0 | 0 | 0 | 6 | 5 | 2 | 1 | 4 | 3 |

For example, the tape configuration for the character M is 011010. This configuration would go into the address shift register as 00,0000,1100 1 which is equivalent to the right half of word 00$c$ (the 1 in the right most place denotes the right half—the rest of the sexadecimal address is obtained by forming groups of four to the left of this digit).

NOTE.—If a tape reader is connected as computer input, and the Compute switch on the control panel is thrown to Manual, the computer system operation will not stop on an *xe*0 order. It will first obtain the order at the position called for by the next tape character and then stop on step S6. If an automatic typewriter is connected as input without a tape reader, *xe*0 and *xf*0 orders are equivalent.

STOP

| Gate wire | Step No. | Gates Called |
|---|---|---|
| W8 | S4 | *al*1*w*; *os*2*a*, 2*b*, 3. |
| | S5 | |
| W12 | S6 | *st*1, 3. |

Orders: –*f*0 or – 1111 0_ _ _
–70 or – 0111 0_ _

Computer stops on step S6.

The order procedure is the same as for order *xd*0 through step S3. Orders –*f*0 and –70 are stop orders. These orders stop the computer system on step S6, by opening gate *st*3 and *st*1. The computer system may be started again by pushing the Start button on the control panel or by executing the *Tie Point* operation described below.

The computer system may be stopped by throwing the Compute switch on the control panel to Manual. The computer system then stops on step S6 of the next order. In this case the order code for the order being carried out is in the order storage unit. If the Compute switch is left on Manual and the Start button is pushed, the computer carries out this order and finds the next one, stopping again on step S6. In this manner orders may be carried out one at a time. This feature is convenient for code checking. Step S7 is used in this case merely because step S6 ends when the Start button is released and step S7 ends on the next *s* pulse starting step S8 on time. It should be noted that when any transfer order is given to the system the transfer is accomplished by step S6.

In FIG. 49 is a chart showing the contents of various units of the system at the end of each step in a typical order procedure (the *xd*0 order) as explained above. The units concerned are the address shift register, command shift register, location counter, *b*-register, step counter and memory. The floating address, *fa*1 is the address of the present order to be performed which is to be located in the memory. Floating address *fa*2 is the floating address of the next order to be performed. Address $A_m$ is the present address being scanned in the memory at the beginning of step S0. The address *x* is the address associated with the command included in the present order to be performed consists of a command (the present command) and an associated address (address *x*). The command shift register contains the last command performed until step S2 of the present order procedure when the present command is transferred to the command shift register.

The order procedure diagrammed in FIG. 49 covers the entire *xd*0 order (Clear *ar*, Add). It will be noted that portions of the order procedure are common to more than one order. The following table lists the several orders which have portions of their order procedure in common with the *sc*0 order.

| Steps | Orders |
|---|---|
| S0–S2 | *xb*4, *x*34, *sb*8, *s*38, *sbc*, *x*3*c*. |
| S0–S4 | *xa*0, *x*20, *xa*4, *x*24, *x*80, *x*00, –*cc*, –4*c*. |
| S0–S5 | *xe*0, *xf*0, *x*70. |
| S0–S8 | *x*84, *x*8*c*, *x*88, *x*08, *x*30, *x*0*d*, *x*2*d*. |
| S0–S9 | 000090. |
| S0–S10 | *xc*2, *xc*0, *xc*8. |

TIE-POINT OPERATION

On a stop order or on any order (except –*e*0) when the Compute switch is set on Manual, the computer system stops on steps S6. Gates *st*1 and *st*3 are called. On a –*e*0 order, on step S6 gate decoder wire *tu*1*w* is also called and causes operation of the tape reader or other input device. When stopped on a –*e*0 order, the computer system either reads tape or accepts a typewriter keyboard input, and transfers control to the address represented by this input. It is thus possible to enter any routine which is stored on memory track No. 00. If input pulses are applied to set the circuits 731, operation of the system is stopped on step S6 of *any order*; and while the Compute switch is set to Manual, the system will go through step S6Y before it goes on to step S7 of the order. Thus the system will transfer control as in a –*e*0 order, but will also complete the present order which may include calling for input or output.

THE BASE CODE

The base code in the present system, also designated *bc* and R–0 code, is stored on one of the permanently magnetized tracks 22 on the drum 19. This code serves three main purposes:

(1) Reading data and coding into the computer system.
(2) Viewing the contents of the memory, *a*-register and *q*-register.
(3) Changing the contents of any particular address in the system.

There are eight basic routines provided in the whole base code routine any one of which basic routines may be used at the operator's discretion. The entire base code routine provides an adequate facility for operation of the computer system. If more elaborate input routines are required they may be read into the system with the aid of the base code. The base code routine operations are described below. Base code routines (2) to (8) below may be read into the operation of the system by reading or typing in the routine symbols *c*, 5, *e*. *s*, *w*, *t*, and — respectively. The Breakpoint Operation (1) is considered part of the case code routine.

(1) *Breakpoint operation*

When checking out a routine, it is convenient to be able to stop the problem at key points and check the results of the calculation to that point. When the routine has been checked out, the automatic stops are no longer desired and it should be possible to delete them without changing the order code. This feature in the computer system is known as the *breakpoint operation*. The entry into the breakpoint routine is a subroutine transfer to address 000. The code is 00000 sexadecimally. It is thus necessary only to fill up the address and command shift registers with 0's.

The breakpoint operation is coded into routine by assigning sign digits (usually irrelevant) to order pairs in the code. Four possibilities exist.

| | $a_{-1}$ | $a_0$ | Breakpoint |
|---|---|---|---|
| (1) | 0 | 0 | No breakpoint. |
| (2) | 0 | 1 | Breakpoint 1. |
| (3) | 1 | 0 | Breakpoint 2. |
| (4) | 1 | 1 | Breakpoints 1 and 2. |

Suppose that a breakpoint 2 is coded into a routine and the breakpoint 2 gate 516 of the *os* unit is opened by closing the switch BP2 at the control panel. Then as the order which is stored in the left half of the word for which the breakpoint is written is read into the order storage unit, the sign digit $a_{-1}$ (at *r*-time) comes through gate *os*1*a* but does not go into the address shift register since it is not in coincidence with address pulses. This pulse goes through the breakpoint 2 gate 516 and through coincidence gate 518 which is open at *r*-time and sets the breakpoint flip-flop 519 to 0. This flip-flop was set to one when gates *os*1*a*, 1*b* and 1*c* were called (by the shifting pulses used in the command shift register). The flip-flop 519 is set on step S2 and remains set to 0 until gates *os*1*a*, 1*b*, 1*c* are called again—on step S2 of the next order. On step S0 of the next order this information is transferred to the breakpoint flip-flop 554 of the address location unit by the parallel transfer circuit 555 in *al*. When this flip-flop is set to 0, the breakpoint gate 516 of the order storage unit operated by this flip-flop is closed and the next order read in is all 0's, i.e., a subroutine transfer to 000.

Note that if a breakpoint 1 had been coded in the routine and breakpoint 2 gate 516 opened, the breakpoint operation would not have occurred, since coincidence gate 518 is not open at $a_0$-time. If, however, the breakpoint 1 gate 515 is opened by closing switch BP1 at the control panel the pulse at $a_0$-time is delayed one digit time and goes through coincidence gate 518 at *r*-time.

Besides the two breakpoint switches BP1 and BP2 on the control panel there is a breakpoint push-button BP Manual. This push-button is interlocked with the Compute switch so that when the computer system operation is stopped on step S6 of any order (Compute switch thrown to Manual), this push-button will set the *os* breakpoint flip-flop 519 to 0 and the breakpoint light (BP) 697 at the control panel will light. Depressing the Start button will now complete this order and read in a subroutine transfer to position 000 as described above.

The breakpoint operation coding in sexadecimal notation is:

| Word | Sign | Left half | Right half |
|---|---|---|---|
| 0 | 0 | 0007*f* | 0208*c* |
| 1 | 1 | 02185 | 000f1 |

(2) *Base code idle routine c*

The computer system idles awaiting the next order. This is coded as:

| Word | Sign | Left half | Right half |
|---|---|---|---|
| 1 | 0 | ------------ | 000f1 |

(3) *Base code routine 5*

The contents of memory address 020 are transferred to the *a*-register, the contents of memory address 021 are transferred to the *q*-register, and the address shift register contains the floating address of the next order normally to be executed. This is coded as:

| Word | Sign | Left half | Right half |
|---|---|---|---|
| 2 | 0 | 000*ff* | 00255 |
| 3 | 0 | 000*d*3 | 00509 |
| 4 | 0 | 020*d*0 | 021c4 |
| 5 | 0 | 00035 | ------------ |

(4) *Base code routine e*

The computer system calls for four binary digits as marked on tape, or otherwise supplied from the input device which digits the system interprets as an address. Then the system transfers control of operation to that address. This is coded as:

| Word | Sign | Left half | Right half |
|---|---|---|---|
| 5 | 0 | ------------ | *fff*2*d* |
| 6 | 0 | *fff*2*d* | *fff*2*d* |
| 7 | 0 | *ff*92*d* | 02285 |
| 8 | 0 | 022*d*0 | 00909 |
| 9 | 0 | 00035 | ------------ |

(5) *Base code routine s*

The system calls for the next three binary digits indicating an address from the input device and actuates the output device to print or punch the contents of that address. The system then idles awaiting the next order. This is coded as:

| Word | Sign | Left half | Right half |
|---|---|---|---|
| 9 | 0 | ------------ | *fff*2*d* |
| *a* | 0 | *fff*2*d* | *ff*82*d* |
| *b* | 0 | 02285 | 022*d*0 |
| *c* | 0 | 00253 | 00*d*09 |
| *d* | 0 | 000*d*0 | *fffa*8 |
| e | 0 | *fff*28 | *fff*28 |
| *f* | 0 | *fff*28 | *fff*28 |
| 10 | 0 | *fff*28 | *fff*28 |
| 11 | 0 | *fff*28 | *fff*28 |
| 12 | 0 | *fff*28 | *fff*28 |
| 13 | 0 | 000*f*1 | ------------ |

(6) *Base code routine w*

The system stores an address in the memory as given by the next three digits read in by the input device.

| Word | Sign | Left half | Right half |
|---|---|---|---|
| 14 | 0 | *fff*2*d* | *fff*2*d* |
| 15 | 0 | *ff*82*d* | 02285 |
| 16 | 0 | 022*d*0 | 00253 |
| 17 | 0 | 01209 | 000*e*0 |

(7) *Base code routine + (plus sign)*

The system stores at a particular memory position *n* indicated by the input device, the next eleven digits read in by the input device, then adds 1 to *n* and restores the eleven digits in the new memory position $n+1$. This is coded:

| Word | Sign | Left half | Right half |
|---|---|---|---|
| 18 | 0 | *fff*2*d* | *fff*2*d* |
| 19 | 0 | *fff*2*d* | *fff*2*d* |
| 1*a* | 0 | *fff*2*d* | *fff*2*d* |
| 1*b* | 0 | *fff*2*d* | *fff*2*d* |
| 1*c* | 0 | *fff*2*d* | *fff*2*d* |
| 1*d* | .0 | *fff*2*d* | 01*e*50 |
| 1*e* | 0 | 00085 | 00253 |
| 1*f* | 0 | 01*e*09 | 000*e*0 |

(8) *Base code UTA routine — (minus sign)*

The system performs an unconditional transfer of an order to the address indicated by the input device. This is coded as:

| Word | Sign | Left half | Right half |
|---|---|---|---|
| 1*f* | 0 | ------------ | 000*e*0 |

The entire base code routine in use occupies the 00 track in the memory. In addition on track 02 positions 020, 021, and 022 are used for temporary storage. By pushing the R–0 button at the control panel at any time gates *me*1 and coincidence gate 301 in the memory unit are opened to permit writing the R–0 coding on whatever channels may be then selected. Thus to properly store R–0 the address must be 00–. To reach track 00, the Compute switch may be set to Manual and either the breakpoint Manual button may be depressed or the input device may apply any input signal.

Use of this base code with the tie-point operation allows the operator to read routines into the computer system and to perform various operations for code debugging, servicing and other functions.

APPENDIX

*Theory of multiplication and division in the computer system*

MULTIPLICATION

Let the binary representation of a number be:

$$-a_0+\sum_{i=1}^{40}2^{-i}a_i$$

let $y'$ be a proper number and let $$Z'=x'y'$$

The computer calculates Z' as follows:

(1) $$Z'_0=0$$

(2) $Z'_n=(\frac{1}{2}Z'_{n-1}+a_{41-n}y'$ for $n=1, 2, 3, \ldots 40$ (3) $$Z'=(\tfrac{1}{2})Z'_{40}-a_0y'$$

We now assert that a proper expression for $Z'_n$ is (4) $Z'_n=\sum_{i=41-n}^{40} a_i 2^{41-n-i}y'$ for $n=1, 2, 3, \ldots 40$ The validity of (4) is demonstrated by induction as follows: (4) holds for $n=1$, i.e., $Z'_1=a_{40}2^0y'=a_{40}y'$ If (4) holds for $n=1$, we show that it holds for $n=N$; i.e., from (2)

$$Z'_{n+1}=(1/2)Z'_n+a_{40-n}y'$$

$$=(1/2)\sum_{i=41-n}^{40} a_i 2^{40-n-i}y'+a_{40-n}y'$$

$$=\sum_{i=41-n}^{40} a_i 2^{41-(n+1)-i}y'+a_{41-(n+1)}2^{\{41-n(+1)-[41-(n+1)]\}}y'$$

$$=\sum_{i=41-(n+1)}^{40} a_i 2^{41-(n+1)-i}y'$$

which is the same as (4) if N is replaced by $n+1$. The validity of (4) has thus been demonstrated.

Now use (3) and (4) to write $$Z'=-a_0y'+\sum_{i=1}^{40}a_i2^{-i}y'=\left(-a_0+\sum_{i=1}^{40}a_i2^{-i}\right)y'=x'y'$$

DIVISION

Let $Z''=y'/x'$, where the condition $x'>y'$ must hold if Z'' is to be a proper number. Define:

$u_n\equiv$ sign digit of $Z''_n$ $a_0\equiv$ sign digit of $x'$ and $$(2e_n-1)\equiv(2u_n=1)(2a_0-1)$$

i.e. $e_n=1$ if $a_0=u_n$, and $e_n=0$ if $a_0\neq u_n$ since $u_n$ and $a_0$ are either one or zero.

The computer calculates Z'' as follows (5) $$Z''_0=y'$$

(6) $$Z''_1=Z''_0-(2e_0-1)x'$$

(7) $Z''_{n+1}=2Z''_n-(2e_n-1)x'$ for $n=1, 2, 3, \ldots 41$

We now multiply each side of Equation 5 and Equation 6 by $2^{-n}$ and sum all these equations:

(8)

$$\sum_{n=0}^{41}2^{-n}Z''_{n+1}=Z''_0-(2e_0-1)x'+\sum_{n=1}^{41}2^{-n}[2Z''_n-(2e_n-1)x']$$

The left side of (8) may be rewritten as $$\sum_{n=0}^{40}2^{-n}Z''_{n+1}+2^{-41}Z''_{42}=\sum_{j=1}^{40}2^{-(j-1)}Z''_j+2^{-41}Z''_{42}$$

where the substitution $j=n+1$ has been made. Now substitute this expression in (8), changing the index on the summation on the right to $j$.

$$\sum_{j=1}^{41}2^{-j}(2Z_j)+2^{-41}Z''_{42}=Z''_0-(2e_0-1)x'+\sum_{j=1}^{41}2^{-j}(2Z''_j)-\sum_{j=1}^{41}(2e_j-1)2^{-j}x'$$

The summations on $Z''_j$ cancel on each side of the equation. Therefore (9)

$$Z''_0=(2e_0-1)x'+2^{-41}Z''_{42}+\sum_{j=1}^{41}2^{-j}\cdot2e_jx'-\left(\sum_{j=1}^{41}2^{-j}\right)x'$$

$$=(2e_0-1)x'+2^{-41}Z''_{42}+2^{-1}\cdot2e_1x'+\sum_{j=2}^{41}2^{-j}2e_jx'-\left(\sum_{j=1}^{40}2^{-j}\right)x'$$

$$=(2e_0+e_1-1)x'+2^{-41}Z''_{42}+\sum_{j=1}^{40}e_{j+1}2^{-j}x'-(1-2^{-41})x'$$

$$=(2e_0+e_1-2)x'+\sum_{j=1}^{40}e_{j+1}2^{-j}x'+2^{-41}(x'+Z''_{42})$$

But the relation $e_0=1-e_1$ holds as may be seen by the following argument:

Suppose $u_0=a_0$, i.e. $e_0=1$. Then $Z''_1=Z''_0-x'=y'-x'$ from (5) and (6) above. But $x'|>|y'|$, therefore $Z''_1$ must have opposite sign to $x'$. Thus, $$u_1\neq a_0 \text{ and } e_1=0$$

If $u_0\neq a_0$, i.e. $e_0=0$, then $Z''_1=Z''_0+x'=y'+x'$ and since $|x'|>y'|$, $Z''_1$ will now have the same sign as $x'$ and $u_1=a_0$, i.e. $e_1=1$.

It is thus seen that the relation $e_0=1-e_1$ holds. Substituting this relation in (9) we obtain $$Z''_0=y'=\left(-e_1+\sum_{j=1}^{40}e_{j+1}2^{-j}\right)x'+2^{-41}(x'+Z''_{42})$$

This is in the form $$y'=Z''x'+\text{remainder}$$

The binary representation of the quotient is therefore:

$$-e_1+\sum_{j=1}^{40}e_{j+1}2^{-j}$$

$$\text{Remainder}=(x'+Z''_{42})\cdot2^{-41}$$

EXPLANATION OF MULTIPLICATION

The mathematical appendix asserts that the computer calculates Z' as given by Equations 1, 2 and 3, column 63. Z' is calculated in the *ar* with $y'$ in the *br* as follows:

Equation 1 is calculated in step S12. See column 47. (The *ar* is cleared satisfying Equation 1, $Z''=0$.) Step 13 satisfies Equation 2. The gates *ar*1 and *ar*2 and *ar*3 provide a right shift with the sign digit repeated. This is a division by two. Thus ½ $Z'_{n-1}$ enters the add unit on wire 182 (FIG. 20). The least significant digit just shifted out of *qr* through *qr*2c is $(a_{41-n})$. Since this is a binary digit it is either 0 or 1. If it is 1 it sets the sign unit to add supplying $a_{(n-1)}y'=y'$ to the add unit through wire 183, FIG. 23 and FIG. 20. If $a$ is 0 it does not set the sign unit to add supplying $a_{(n-1)}y'=0$ (i.e., no pulses) to the add unit. Thus throughout step 13 which lasts for 40 word times, the output of the add unit is $$Z'_n=\tfrac{1}{2}Z_{(n-1)}+a_{(41-n)}y'$$

Equation 3 is calculated during steps 14 and 15. The gate configuration on step 15 is the same as on step 13 so the input to the add unit on wire 182 is ½$Z'_{40}$ and wire 183 carries $-a_0y'$ because the *complement—don't complement box* 221 was set to complement by *si*1 in step 14. Thus the output of the add unit during step 15 is $Z'=\frac{1}{2}Z'_{40}-a_0y'$ as in Equation 3. This value of Z' is the product of $x'$ and $y'$ as proved above in the Appendix.

EXPLANATION OF DIVISION (SEE COLUMNS 48 AND 63)

At the start of step 12 the divisor is in *br* and the dividend is in *ar*. During step 12 *qr* is cleared. The gate *si*4 receives a pulse if and only if the most significant sign digit in *br*, $a_0$, is equal to the most significant sign digit in *ar*, $u_n$. In the notation of the appendix therefore $Z''_0=y'$ is in *ar*, $x'$ is in *br*, and $e_0$ goes through *si*4. Throughout the calculation $Z''_n$ is in *ar*, and $e_n$ comes through *si*4. Thus on step 12, Equation 5 is satisfied.

During step 13, $Z''_0$ enters the add unit on wire 182 and $-(2e_0-1)x'$ enters the add unit on wire 183 from the *complement—don't complement box*. This satisfies Equation 6. Gate *si*4 is still open at the end of step 13 and it passes $e_1$ to the *complement—don't complement box* and to *qr* over wire 230, FIGS. 22 and 23.

On step 14 *ar*1 and *ar*4 cause a left shift in *ar* so $27'_1$ enters the add unit on wire 182. Gate *si*5 causes $x'$ to enter the *complement—don't complement box* so $-(2e_1-1)x'$ enters the add unit on wire 183. This satisfies Equation 7 for $n=1$. Gates *qr*1, or *qr*3 and *qr*4 insert $e_1$ into both positions 40 and 39 in *qr* through delay units 203 and 202, FIG. 22.

Step 15 continues for another 40 word times in a manner similar to step 14 except that *qr*4 is not open and $e_n$ is put into *qr* at position 40 of each word time. There is of course no pulse at this time because gates *qr*1 and *qr*3 cause a left shift of the word in *qr*. Note that due to the 40 left shifts during step 15, $e_1$ is now in the the two sign digit positions of *qr*, and the quotient as given at the end of the Appendix is in the *q* register.

Step 15 obviously satisfies Equation 7 for each value of $n$ from $n=2$ to $n=41$ inclusive.

EXAMPLE OF DIVISION INVOLVING NEGATIVE NUMBERS

Let us take the numbers $X'=\frac{1}{4}=00.0100$ and $Y'=\frac{1}{8}=11.1110$. To explain the division operation $$\frac{Y'}{X'}$$

it is necessary to carry only the six bits shown. Step 15 will last for only four word times (15.1, 15.2, 15.3, 15.4). To illustrate the process we represent below by numbers the pulses on wires 182, 183, 184, 230, and 142 in FIGS. 20, 22, and 23 at each word time, on steps 12, 13, 14, and 15. The result obtained is $-\frac{1}{2}=11.1000$.

*Wire*

| Step | 182 | 183 | 184 | 230 | 142 |
|---|---|---|---|---|---|
| 12 | 11.1110 | 00.0000 | 11.1110 | 0 | 00.0000 |
| 13 | 11.1110 | 00.0100 | 00.0010 | 1 | 00.0000 |
| 14 | 00.0100 | 11.1100 | 00.0000 | 1 | 00.0011 |
| 15.1 | 00.0000 | 11.1100 | 11.1100 | 0 | 00.0111 |
| 15.2 | 11.1000 | 00.0100 | 11.1100 | 0 | 00.1110 |
| 15.3 | 11.1000 | 00.0100 | 11.1100 | 0 | 01.1100 |
| 15.4 | 11.1000 | 00.0100 | 11.1100 | 1 | 11.1000 |

What is claimed is:

1. In an electronic computer, a memory unit having a plurality of data storage tracks, each of said tracks providing a plurality of word locations serially disposed thereon, each word location consisting of a group of data receiving and reproducing pulse positions, each of said word locations being capable of assuming a selected physical configuration representative of a binary number, each of said word locations having an address representable by another binary number, the physical configuration of a first group of said word locations being changed in response to receipt of a succession of orders to be performed in the memory unit, said orders being stored at a second group of said word locations on said tracks, an address shift register capable of assuming a configuration representative of a binary number denoting an address position of any of the orders stored in the memory unit, scanning means disposed for scanning said second group of word locations on said tracks to locate one of the orders stored in the memory unit, a location counter connected via gating means to said scanning means and having a changing configuration instantaneously representing a binary number equal to the difference of binary numbers denoting the address of said one order on said tracks and the address instantaneously being scanned on said tracks by said scanning means, a step counter connected to the location counter, a pulse source connected to the location counter and applying pulses to the location counter, coordinating means connected between said pulse source and said scanning means so that said pulses spill over to the step counter to advance the step counter one step when said numerical difference equals zero simultaneously with the scanning by said means of the word location where said one order is stored, output means connected to the step counter to indicate stepping of the step counter whereby said one order is scanned in the memory unit, a command shift register capable of assuming a configuration representative of binary number denoting a command position of any of the orders stored in the memory unit, and means connected between the address and command shift registers for shifting pulses from the word location of said one order to the address shift register and the command shift register, whereby said registers respectively assume configurations representative of address and command portions of said one order.

2. In an electronic computer, a memory unit having a plurality of data storage tracks, each of said tracks providing a plurality of word locations serially disposed thereon, each word location consisting of a group of data receiving and reproducing pulse positions, each word location being capable of assuming a selected physical configuration representative of a binary number, each of said word locations having an address representable by another binary number, the physical configurations of a first group of said word locations being changed in response to receipt of a succession of orders to be performed in the memory unit, said orders being stored at a second group of said word locations on said tracks, scanning means disposed for scanning said second group of word locations on said tracks to locate one of said orders on one of said tracks, a location counter connected via gating means to said scanning means and having a changing configuration instantaneously representing a binary number equal to the difference of binary numbers denoting the address of said one order and the address instantaneously being scanned by said scanning means, a step counter connected to the location counter, a pulse source connected to the location counter and applying pulses to the location counter, coordinating means connected between said pulse source and scanning means so that said pulses spill over to the step counter to advance the step counter one step when said numerical difference equal zero simultaneously with the scanning by scanning said means of the word location where said one order is stored, output means connected to the step counter to indicate stepping of the step counter whereby said one order is located on said one track in the memory unit, an address shift register, a command shift register, and means connected between said scanning means and the address and command shift registers for shifting pulses from the word location of said one order on said one track to the address and command shift registers, whereby said registers respectively assume configurations representative of address and command portions of said one order.

3. In an electronic computer, a memory unit having a plurality of memory positions providing a plurality of word locations serially disposed thereon, each word location consisting of a group of data receiving and reproducing pulse positions, each of said word locations being capable of assuming a selected physical configuration representative of a binary number, each of said word locations having an address representative of another binary number, the physical configuration of a first group of said word locations being changed in response to receipt of a succession of orders to be performed in the memory unit, said orders being stored at a second group of word locations, means in said unit, scanning means disposed for scanning said second group of word locations to said unit to locate one of the orders stored in the memory unit, a location counter connected via gating means to said scanning means and having a changing configuration instantaneously representing a binary number equal to the difference of binary numbers denoting the address of said one order and the address instantaneously being scanned by said scanning means, a step counter connected to the location counter, a pulse source connected to the location counter and applying pulses to the location counter, said pulses spilling over to the step counter to advance the step counter one step when said numerical difference equals zero simultaneously with the scanning by said scanning means of the word location where said one order is stored, output means connected to the step counter to indicate stepping of the step counter whereby said one order is located in the memory unit, an address shift register, a command shift register, means connected between said scanning means and the address and command shift registers for shifting pulses from the word location of said one order to the address and command shift registers so that said registers respectively assume configurations representative of address and command portions of said one order, a keyboard register, control means connected to said scanning means for changing the configuration of the address shift register to the address of the next one in said succession of orders, and means for impressing on the keyboard register a configuration representative of one of said first word locations.

4. In an electronic computer, in combination: a memory unit having a plurality of memory positions providing a plurality of word locations serially disposed thereon, each word location consisting of a group of data receiving and reproducing pulse positions, each of said word locations being capable of assuming a selected physical configuration representative of a binary number, each of said word locations having an address representative of another binary number, the physical configuration of a first group of said word locations being changed in response to receipt of a succession of orders to be performed in the memory unit, said orders being stored at a second group of word locations in said unit, scanning means disposed for scanning said second group of word locations in said unit to locate one of the orders stored in the memory unit, a location counter connected via gating means to said scanning means and having a changing configuration instantaneously representing a binary number equal to the difference of binary numbers denoting the address of said one order and the address instantaneously being scanned by said scanning means, a step counter connected to the location counter, a pulse source connected to said location counter and applying pulses to the location counter coordinating means connected between said pulse source and scanning means so that said pulses spill over to the step counter to advance the step counter one step when said numerical difference equals zero simultaneously with the scanning by said scanning means of the word location where said one order is stored, output means connected to the step counter to indicate stepping of the step counter whereby said one order is located in the memory unit, an address shift register, a command shift register, means connected between said scanning means and the address and command shift registers for shifting pulses from the word location of said one order to the address and command shift registers so that said registers respectively assume configurations representative of address and command portions of said one order, a keyboard register, control means connected to said scanning means for changing the configuration of the address shift register to the address of the next one in said succession of orders, means for impressing on the keyboard register a configuration representative of a certain memory position associated with said one order, another pulse source connected to the location counter and applying counting pulses to the location counter, further scanning means disposed scanning said first group of word locations in said unit to locate said certain memory position, and means to clear the configuration of the keyboard register when said memory position is scanned by said further scanning means while the location counter again spills over to advance the step counter another step.

5. In an electronic computer, the combination according to claim 4, and further comprising means for impressing on the cleared keyboard register the configuration of said certain memory position, the last named configuration denoting a certain binary number.

6. In an electronic computer, the combination according to claim 4, further comprising means for impressing on the cleared keyboard register the configuration of said certain memory position, the last named configuration denoting a certain binary number, and an accumulator register for receiving from the keyboard register a form of the configuration impressed thereon.

7. In an electronic computer, the combination according to claim 4, further comprising means for impressing on the cleared keyboard register the configuration of said certain memory position, the last named configuration denoting a certain binary number, an accumulator register capable of assuming a configuration denoting a selected binary number, and means for transferring from the keyboard register a form of the configuration impressed thereon and adding said form to the configuration of the accumulator register.

8. In an electronic computer, the combination according to claim 4, further comprising means for impressing on the cleared keyboard register the configuration of said certain memory position, the last named configuration denoting a certain binary number, an accumulator register capable of assuming a configuration denoting a selected binary number, means for clearing the accumulator register of said selected binary number, and means for transferring from the keyboard register the configuration impressed thereon and adding the transferred configuration to the cleared accumulator register.

9. In an electronic computer, the combination according to claim 4, further comprising means for impressing on the cleared keyboard register the configuration of said certain memory position, the last named configuration denoting a certain binary number, an accumulator register capable of assuming a configuration denoting a selected binary number, means for clearing the accumulator register of said selected binary number, and means for transferring from the keyboard register to the cleared accumulator register the complement of the binary number impressed on the keyboard register.

10. In an electronic computer, the combination according to claim 4, further comprising means for impressing on the cleared keyboard register the configuration of said certain memory position, the last named configuration denoting a certain binary number, an accumulator register capable of assuming a configuration denoting a selected binary number, means for clearing the accumulator register of said selected binary number, and means for transferring from the keyboard register to the cleared accumulator register a configuration denoting the absolute magnitude of the number impressed on the keyboard register.

11. In an electronic computer, the combination according to claim 4, further comprising means for impressing on the cleared keyboard register the configuration of said certain memory position, the last named configuration denoting a certain binary number, an accumulator register capable of assuming a configuration denoting a selected binary number, means for clearing the accumulator register of said selected binary number, and means for transferring from the keyboard register to the cleared accumulator register a configuration denoting the complement of the absolute magnitude of the number impressed upon the keyboard register.

12. In an electronic computer, the combination according to claim 4, further comprising means for impressing on the cleared keyboard register the configuration of said certain memory position, the last named configuration denoting a certain binary number, an accumulator register capable of assuming a configuration denoting a selected binary number, and means for transferring from the keyboard register to the accumulator register the complement of the number impressed on the keyboard register, whereby the transferred number is subtracted from the number already in the accumulator register.

13. In an electronic computer, the combination according to claim 4, further comprising means for impressing on the cleared keyboard register the configuration of said certain memory position, the last named configuration denoting a certain binary number, an accumulator register capable of assuming a configuration denoting a selected binary number, and means for transferring from the keyboard register to the accumulator register the absolute magnitude of the number impressed on the keyboard register, whereby the transferred number is added to the number already in the accumulator register.

14. In an electronic computer, the combination according to claim 4, further comprising means for impressing on the cleared keyboard register the configuration of said certain memory position, the last named configuration denoting a certain binary number, an accumulator register capable of assuming a configuration denoting a selected binary number, and means for transferring from the keyboard register to the accumulator register the complement of the absolute magnitude of the number impressed on the keyboard register, whereby the absolute magnitude of the number impressed on the keyboard register is subtracted from the number already in the accumulator register.

15. In an electronic computer, the combination according to claim 4, further comprising means for impressing on the cleared keyboard register the configuration of said certain memory position, the last named configuration denoting a multiplicand binary number, a quotient register, means for storing in the quotient register a multiplier number for the number in the keyboard register, an accumulator register capable of assuming a configuration denoting a selected binary number, means for clearing the accumulator register, and means for impressing on the accumulator a number equal to the most significant part of the product of the multiplier number in the quotient register and the multiplicand number in the keyboard register.

16. In an electronic computer, the combination according to claim 15, further comprising means for impressing on the quotient register a number equal to the least significant part of the product of the multiplier number in the quotient register and the multiplicand number in the keyboard register.

17. In an electronic computer, the combination according to claim 4, further comprising means for impressing on the cleared keyboard register the configuration of said certain memory position, the last named configuration denoting a divisor binary number, an accumulator register capable of assuming a configuration denoting a selected binary number, means for impressing on the accumulator register a dividend binary number, a quotient register, and means for storing in the quotient register a number representing the quotient of the divisor and dividend binary numbers.

18. In an electronic computer according to claim 1, a quotient register, means for storing in the quotient register a physical configuration representing a binary coded decimal number, one of said tracks being a decimal-binary track for storing a plurality of physical configurations representing binary numbers equivalent to certain decimal numbers, means for comparing digit by digit the binary coded decimal number in the quotient register with the binary numbers stored on the decimal-binary track, an accumulator register for binary numbers, and means for impressing on the accumulator register physical configurations corresponding to said binary coded decimal number when the second named means locates a binary number on said track corresponding to said binary coded decimal number.

References Cited in the file of this patent

UNITED STATES PATENTS

| | | |
|---|---|---|
| 2,411,540 | Haigh | Nov. 26, 1946 |
| 2,540,654 | Cohen et al. | Feb. 6, 1951 |
| 2,604,262 | Phelps et al. | July 22, 1952 |
| 2,651,458 | Bennett | Sept. 8, 1953 |
| 2,680,239 | Daniels | June 1, 1954 |
| 2,739,299 | Burkhart | Mar. 20, 1956 |
| 2,749,037 | Stibitz | June 5, 1956 |
| 2,787,416 | Hansen | Apr. 2, 1957 |
| 2,792,987 | Stibitz | May 21, 1957 |
| 2,800,277 | Williams et al. | July 23, 1957 |
| 2,815,168 | Zukin | Dec. 3, 1957 |
| 2,954,166 | Eckdahl et al. | Sept. 27, 1960 |

FOREIGN PATENTS

| | | |
|---|---|---|
| 745,907 | Great Britain | Mar. 7, 1956 |
| 770,952 | Great Britain | Mar. 27, 1957 |
| 526,058 | Belgium | Feb. 15, 1954 |
| 1,090,208 | France | Oct. 31, 1954 |

OTHER REFERENCES

Auerbach et al.: "The Binac," Proc. IRE, January 1952, pages 15 and 16 relied on. Abstract in Div. 23. 235–61EPB Pub.

Beard et al.: "An Electronic Computer," J. of Scientific Instruments," vol. 29, No. 10, October 1952, pages 305 to 311 relied on. Abstract in Div. 23. 235–61EPB Pub.

Booth: "The Physical Realization of an Electronic Digital Computer," Electronic Engineering, October 1952, pages 444 and 445 relied on. Abstract in Div. 23. 235–61EPB Pub.

Ross, "The Arithmetic Element of the IBM Type 701 Computer," Proc. IRE, October 1953, pages 1287 to 1289 relied on. Abstract in Div. 23. 235–61EPB Pub.

"The Alwac," Logistics Research Inc. brochure, received in Div. 23 on December 2, 1953, pages 1 to 4, and 13 relied on. 235–61EPE Pub.

Jacobs: "Design Features of the Jaincomp–C and Jaincomp–D Electronic Digital Computers," IRE Convention Record, part IV, 1954, pages 98 to 100, and 104 relied on. Abstract in Div. 23. 235–61EPB Pub.

Van Der Poel: "A Simple Electronic Digital Computer," Applied Scientific Research, October 1952, pages 368, 369, 375 to 382, and 396 to 398.

Engineering Research Associates: "24-Digit Parallel Computer With Magnetic Drum Memory," report published February 15, 1949; vol. 1, pages 4, 7, 9, 10, 11, 24, 27, 28, 42, 43, 44; vol. 2, Fig. 3.2–2, 3.5–6 relied on. Copy in Div. 23.

Leiner et al.: "System Organization of the Dyseac," Transactions of the IRE—Electronic Computers, March 1954, pages 7–9 relied on. Copy in Div. 23.

Perry: "The Logical Design of the Oak Ridge Digital Computer," Proceedings of the Association for Computing Machinery, pages 24–26 relied on. Copy in Div. 23.

"Seac," NBS Technical News Bulletin, September 1950, page 3 of abstract in Div. 23 relied on.

Mullaney: "Design Features of the ERA 1101 Computer," Review of Electronic Digital Computers, Joint AIEE-IRE Computer Conference, February 1952, page 44 relied on. Copy in Div. 23.

Von Neumann et al.: "Preliminary Discussion of the Logical Design of an Electronic Computing Instrument," Report by Princeton Institute for Advanced Study. Copy received by Scientific Library on November 20, 1947, pages 7–28 relied on. Copy in Div. 23.

Electronic Engineering (British), October 1953, 235–155, "Computing Machines," by Bird (pages 407 to 409).

Cohen: "The Role of General Purpose Digital Computers in Automatic Control and Information Systems," IRE, 1954, Convention Record, pages 83–86 relied on.